United States Patent
Walker et al.

(10) Patent No.: US 8,558,921 B2
(45) Date of Patent: Oct. 15, 2013

(54) SYSTEMS AND METHODS FOR SUGGESTING META-INFORMATION TO A CAMERA USER

(75) Inventors: Jay S. Walker, Ridgefield, CT (US); James A. Jorasch, Stamford, CT (US); Russell P. Sammon, San Francisco, CA (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 12/472,149

(22) Filed: May 26, 2009

(65) Prior Publication Data

US 2009/0231441 A1 Sep. 17, 2009

Related U.S. Application Data

(63) Continuation of application No. 10/740,242, filed on Dec. 18, 2003, now abandoned.

(60) Provisional application No. 60/434,475, filed on Dec. 18, 2002.

(51) Int. Cl.
*H04N 5/76* (2006.01)
*H04N 5/222* (2006.01)

(52) U.S. Cl.
USPC ............... 348/231.3; 348/231.2; 348/333.02

(58) Field of Classification Search
USPC ............... 348/207.1, 231.99, 231.1, 333.01, 348/333.02, 333.04, 333.11
See application file for complete search history.

(56) References Cited

U.S. PATENT DOCUMENTS

| | | | |
|---|---|---|---|
| 4,951,079 A | 8/1990 | Hoshino et al. | |
| 5,266,985 A | 11/1993 | Tkagi | |
| 5,541,656 A * | 7/1996 | Kare et al. | 348/333.02 |
| 5,633,678 A | 5/1997 | Parulski et al. | |
| 5,687,408 A | 11/1997 | Park | |
| 5,831,670 A | 11/1998 | Suzuki | |
| 6,094,215 A | 7/2000 | Sundahl et al. | |
| 6,128,013 A * | 10/2000 | Prabhu et al. | 715/707 |
| 6,148,141 A | 11/2000 | Maeda et al. | |
| 6,301,440 B1 | 10/2001 | Bolle et al. | |
| 6,408,301 B1 | 6/2002 | Patton et al. | |
| 6,608,650 B1 * | 8/2003 | Torres et al. | 348/333.02 |
| 6,629,104 B1 * | 9/2003 | Parulski et al. | 382/307 |

(Continued)

OTHER PUBLICATIONS

Ananthaswamy, Anil; "Sndapshot chat creates automatic captions", NewScientist.com, Apr. 2, 2004, (http//www newscientist com/news/news jsp?id=n99994835); download date Apr. 5, 2004, 2 pp.

*Primary Examiner* — Kelly L Jerabek
(74) *Attorney, Agent, or Firm* — Fincham Downs, LLC; Magdalena M. Fincham

(57) ABSTRACT

According to one embodiment of the invention, a camera captures an image. The image is transmitted to a server for image recognition processing. The camera receives information from the server, including an indication of information to suggest to a user for meta-tagging the image. The suggested information may be based, for example, on a comparison of the image with meta-information stored by the server and/or a database of stored images. The camera asks the user if the user would like to meta-tag the image with the information. Optionally, the camera receives an indication from the user that the user would like to meta-tag the image with the suggested information, and the camera meta-tags the image with the information.

17 Claims, 21 Drawing Sheets

(56) References Cited

U.S. PATENT DOCUMENTS

| | | |
|---|---|---|
| 6,961,087 B1 | 11/2005 | Yoshida et al. |
| 7,019,778 B1 * | 3/2006 | Prabhu et al. ............ 348/333.01 |
| 7,068,309 B2 | 6/2006 | Toyama |
| 7,164,438 B2 | 1/2007 | Kindaichi |
| 7,317,485 B1 * | 1/2008 | Miyake et al. ............ 348/333.02 |
| 7,508,419 B2 | 3/2009 | Toyama |
| 7,701,490 B2 | 4/2010 | Ward |
| 7,843,495 B2 * | 11/2010 | Aas et al. ................... 348/231.3 |
| 8,102,425 B2 | 1/2012 | Hirose |
| 2001/0012062 A1 | 8/2001 | Anderson |
| 2001/0030695 A1 * | 10/2001 | Prabhu et al. ................. 348/232 |
| 2002/0028679 A1 | 3/2002 | Edwards et al. |
| 2002/0030745 A1 * | 3/2002 | Squilla et al. ................. 348/207 |
| 2002/0051074 A1 | 5/2002 | Kawaoka et al. |
| 2002/0108038 A1 | 8/2002 | Tanaka et al. |
| 2003/0083785 A1 * | 5/2003 | Funada ........................ 700/245 |
| 2003/0200229 A1 * | 10/2003 | Cazier .......................... 707/200 |
| 2011/0193994 A1 | 8/2011 | Nozawa |
| 2012/0081556 A1 | 4/2012 | Hwang et al. |

* cited by examiner

| SETTING 705 | CURRENT VALUE 710 | VALUE WHEN CAMERA IS IN FLUORESCENT LIGHT MODE 715 | VALUE WHEN CAMERA IS IN SUNNY BEACH MODE 720 | VALUE WHEN CAMERA IS IN SUNSET MODE 725 |
|---|---|---|---|---|
| APERTURE | F/2.8 | AUTO | SMALLER THAN F/5.6 | SMALLER THAN F/8 |
| SHUTTER SPEED | 1/250 SEC | 1/125 SEC | AUTO | FASTER THAN 1/60 SEC |
| FILM SPEED | 100 ASA | 200 ASA | 100 ASA | 150 ASA |
| FLASH | RED-EYE REDUCTION | NONE | NONE | ONLY IF SUBJECT IN FOREGROUND |
| RESOLUTION | SMALL (1600 X 1200) | LARGE (2560 X 1920) | MEDIUM (2048 X 1536) | MEDIUM (2048 X 1536) |
| COMPRESSION | FINE | FINE | SUPERFINE | REGULAR |
| WHITE BALANCE | 5400 K | 4200 K | 5500 K | 3600 K |
| NEUTRAL DENSITY FILTER | OFF | OFF | ON | ON |

| IMAGE IDENTIFIER 805 | IMAGE FORMAT 810 | IMAGE SIZE 815 | FILE SIZE 820 | TIME WHEN IMAGE WAS CAPTURED 825 | META-DATA ASSOCIATED WITH IMAGE 830 |
|---|---|---|---|---|---|
| WEDDING-01 | JPEG | 2560 X 1920 | 1494 KB | 1:40PM 8/3/02 | ROTATE 90 DEGREES CLOCKWISE TO DISPLAY; FLUORESCENT LIGHT MODE |
| WEDDING-02 | JPEG | 2560 X 1920 | 1512 KB | 1:47PM 8/3/02 | SUBJECTS: ALICE, BOB; FLUORESCENT LIGHT MODE |
| WEDDING-03 | TIFF | 1600 X 1200 | 897 KB | 1:55PM 8/3/02 | <ASSOCIATED SOUND RECORDING> LIGHTING: FLASH |
| BEACHTRIP-04 | RAW | 640 X 480 | 398 KB | 11:50AM 8/10/02 | CAPTURED AUTOMATICALLY BY CAMERA, MAY BE DELETED IF NECESSARY |
| BEACHTRIP-05 | JPEG | 2048 X 1536 | 1023 KB | 11:56AM 8/10/02 | LOCATION: BEACH; EXPOSURE SETTINGS: F/5.6, 1/250 SEC, 100 ASA, WHITE BALANCE 7000 K |
| BEACHTRIP-06 | JPEG | 1600 X 1200 | 951 KB | 12:24PM 8/10/02 | LOCATION: BEACH |
| YOSEMITE-07 | JPEG | 1600 X 1200 | 856 KB | 9:02AM 8/18/02 | LOCATION: N 37° 44' 53.0" - W 119° 33' 36.9" |
| YOSEMITE-08 | JPEG | 2048 X 1536 | 904 KB | 7:22PM 8/19/02 | SCENE: SUNSET |

FIG. 8

| QUESTION IDENTIFIER 905 | QUESTION TO ASK 910 | POTENTIAL RESPONSE(S) 915 |
|---|---|---|
| QUES-123478-01 | ARE YOU INDOORS OR OUTDOORS? | "INDOORS", "OUTDOORS" |
| QUES-123478-02 | WHAT KIND OF LIGHT BULBS DOES THIS ROOM HAVE? | "TUNGSTEN", "FLUORESCENT", "HALOGEN", "MULTIPLE TYPES", "I DON'T KNOW" |
| QUES-123478-03 | WHO IS IN THIS PICTURE? | <FREE ANSWER; AUDIO> |
| QUES-123478-04 | PLEASE USE THE CURSOR TO POINT TO ALICE IN THIS PICTURE. | <X,Y COORDINATES> |
| QUES-123478-05 | WHAT'S THE WEATHER LIKE TODAY? | "SUNNY", "PARTLY CLOUDY", "OVERCAST", "RAINING", "SNOWING" |
| QUES-123478-06 | TRUE OR FALSE: YOU'RE AT THE BEACH. | "TRUE", "FALSE" |
| QUES-123478-07 | HOW MANY MORE IMAGES ARE YOU PLANNING ON CAPTURING USING THIS MEMORY CARD? | <POSITIVE INTEGER> |
| QUES-123478-08 | ARE YOU TAKING A PICTURE OF A SUNSET? | "YES", "NO" |
| QUES-123478-09 | WE'RE AT A SPORTING EVENT, AREN'T WE? | "YES", "NO" |

| CAMERA MODE 1105 | QUESTION READY INDICATION 1110 | OUTPUT CONDITION FOR QUESTIONS 1115 | METHOD OF OUTPUTTING QUESTIONS 1120 | ENABLED 1130 |
|---|---|---|---|---|
| OUTPUT UPON REQUEST | BEEP | (ASK_ME_A_QUESTION_BUTTON_PRESSED) | DISPLAY QUESTION ON COLOR LCD SCREEN | NO |
| FULLY AUTOMATIC | NONE | (SHUTTER_BUTTON = "HALFWAY_PRESSED") | OUTPUT AUDIO RECORDING OF QUESTION | NO |
| DO NOT DISTURB | NONE | DO NOT OUTPUT QUESTIONS | DO NOT OUTPUT QUESTIONS | NO |
| MANUAL | BEEP | (CAMERA_VIEWFINDER.IN_USE = "TRUE") | BEEP AND DISPLAY QUESTION AS TEXT ALONG BOTTOM OF VIEWFINDER FRAME | YES |
| SPORTS | BEEP | NOT (CAMERA_MOVING) | OUTPUT AUDIO RECORDING OF QUESTION | NO |
| SILENT | BLINKING LED | (TIME_SINCE_LAST_IMAGE_CAPTURED = 30 SEC) | DISPLAY QUESTION ON COLOR LCD SCREEN | NO |
| PDA ASSISTED | NONE | IMMEDIATELY | TRANSMIT QUESTION TO USER'S PDA FOR OUTPUT BY THE PDA | NO |

| QUESTION THAT WAS OUTPUT 1205 | TIME WHEN QUESTION WAS OUTPUT 1210 | RESPONSE TO QUESTION 1215 | ACTION TAKEN BASED ON RESPONSE 1220 |
|---|---|---|---|
| QUES-123478-08 | 7:21PM 8/11/02 | <SNOOZE BUTTON PRESSED> | OUTPUT QUESTION QUES-123478-08 AGAIN IN 5 MINUTES |
| QUES-123478-08 | 7:26PM 8/11/02 | "YES" | ADJUSTED CAMERA SETTINGS TO "SUNSET MODE" |
| QUES-123478-09 | 4:10PM 8/17/02 | <NONE> | OUTPUT QUESTION QUES-123478-09 AGAIN, THIS TIME AS AUDIO |
| QUES-123478-09 | 4:11PM 8/17/02 | "YES" | ADVISED USER TO ADJUST SHUTTER SPEED TO FASTER THAN 1/250 SEC |
| QUES-123478-08 | 7:19PM 8/17/02 | "NO" | NONE |

| TIME OF EVENT 1355 | DESCRIPTION OF EVENT 1360 |
|---|---|
| 11:35AM 8/10/02 | USER TURNS ON CAMERA AND ADJUSTS SETTINGS ON CAMERA |
| 11:36AM 8/10/02 | CAMERA OUTPUTS QUES-123478-01 TO USER |
| 11:37AM 8/10/02 | USER RESPONDS "OUTDOORS" TO QUES-123478-01 |
| 11:38AM 8/10/02 | CAMERA OUTPUTS QUES-123478-05 BASED ON USER'S RESPONSE TO QUES-123478-01 |
| 11:39AM 8/10/02 | USER RESPONDS "SUNNY" TO QUES-123478-05 |
| 11:50AM 8/10/02 | CAMERA CAPTURES IMAGE BEACHTRIP-04 AUTOMATICALLY BASED ON A CAPTURE CONDITION |
| 11:51AM 8/10/02 | CAMERA OUTPUTS QUES-123478-06 BASED ON IMAGE BEACHTRIP-04 |
| 11:52AM 8/10/02 | USER RESPONDS "TRUE" TO QUES-123478-06 |
| 11:53AM 8/10/02 | CAMERA SETS ITSELF TO "SUNNY BEACH MODE" BASED ON USER'S RESPONSE TO QUES-123478-06 |
| 11:56AM 8/10/02 | IMAGE BEACHTRIP-05 IS CAPTURED BASED ON "SUNNY BEACH MODE" SETTINGS |
| 11:57AM 8/10/02 | CAMERA META-TAGS IMAGE BEACHTRIP-05 AS "SUNNY BEACH" |
| 12:18PM 8/10/02 | CAMERA OUTPUTS QUES-123478-07 TO USER |
| 12:19PM 8/10/02 | USER RESPONDS "15" TO QUES-123478-07 |
| 12:20PM 8/10/02 | CAMERA ADJUSTS IMAGE RESOLUTION AND COMPRESSION SETTINGS BASED ON USER'S RESPONSE TO QUES-123478-07 |
| 12:24PM 8/10/02 | IMAGE BEACHTRIP-06 IS CAPTURED BASED ON REVISED IMAGE RESOLUTION AND COMPRESSION SETTINGS |

SYSTEMS AND METHODS FOR SUGGESTING META-INFORMATION TO A CAMERA USER

The present application is a continuation of U.S. patent application Ser. No. 10/740,242 filed Dec. 18, 2003 now abandoned and claims the benefit of priority to U.S. Provisional Patent Application No. 60/434,475 filed Dec. 18, 2002. The entirety of these applications is incorporated by reference herein for all purposes.

BRIEF DESCRIPTION OF THE FIGURES

FIG. 7 is a table illustrating an exemplary data structure of a settings database consistent with at least one embodiment of the present invention.

FIG. 8 is a table illustrating an exemplary data structure of an image database consistent with at least one embodiment of the present invention.

FIG. 9 is a table illustrating an exemplary data structure of a question database consistent with at least one embodiment of the present invention.

FIG. 11 is a table illustrating an exemplary data structure of an output condition database consistent with at least one embodiment of the present invention.

FIGS. 12A and 12B are a table illustrating an exemplary data structure of a response database consistent with at least one embodiment of the present invention.

FIG. 13B is a table illustrating an exemplary data structure of an event log corresponding to capturing images on a sunny beach, in accordance with at least one embodiment of the present invention.

DETAILED DESCRIPTION

Figure 1:
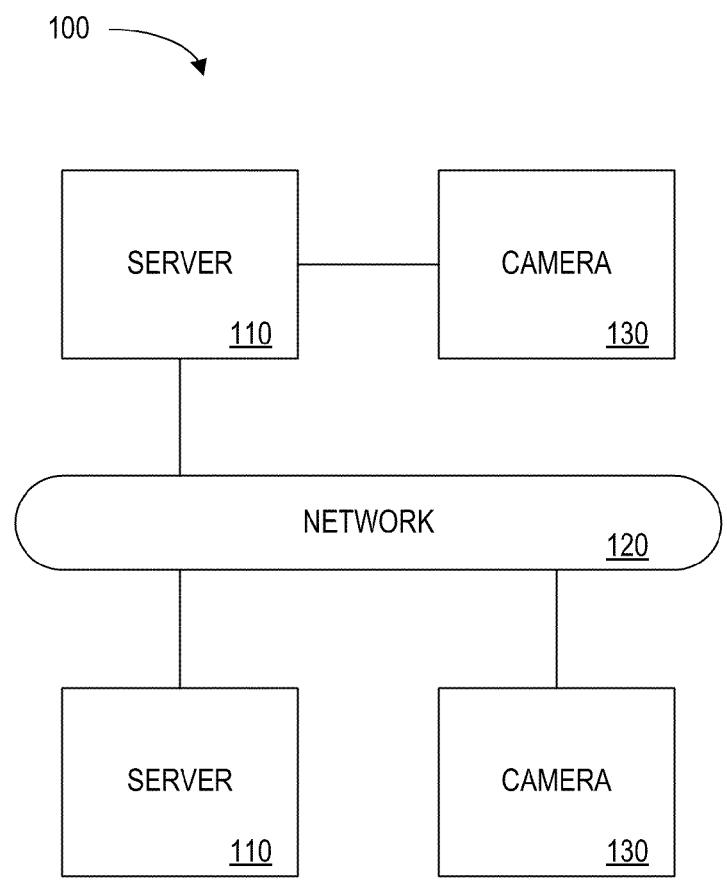
FIG. 1 shows a block diagram of a system that is consistent with at least one embodiment of the present invention.

Applicants have recognized that, in accordance with some embodiments of the present invention, some types of users of cameras and other imaging devices may find it appealing to have a camera that is able to determine a variety of different types of information that may be useful in performing a variety of functions and/or assisting a user in the performance of various actions. Also, some types of users may find it appealing to use a camera having enhanced features to facilitate information gathering (e.g., via interaction with a user, by detection of environmental conditions, by communication with other devices). In accordance with some embodiments, such information may be used, for example, in managing images (e.g., suggesting a meta-tag for an image) and in improving the quality of images (e.g., by adjusting a camera setting).

Applicants have also recognized that some types of users of cameras and other imaging devices may find it appealing to be able to receive a variety of different types of questions (e.g., open-ended questions) and/or suggestions (e.g., suggested meta-data to associate with an image) from a camera, as provided for in accordance with at least one embodiment of the present invention. Some types of users may also find it appealing to be able to provide responses to questions output by a camera.

Some users of cameras (e.g., casual users) seldom adjust their cameras to capture images in the best possible way. Also, even automatic cameras, for example, may still make mistakes in estimating what images a user wants to capture and what settings are best for capturing images. Further, even if a user knows how to adjust his camera correctly, he may occasionally forget to adjust his camera when he is capturing images. Accordingly, Applicants have recognized that some types of users may find it appealing to use a camera having an interface that is convenient and not time consuming for a user to adjust his camera and that may optionally suggest (or automatically make) settings adjustments, as provided for in some embodiments of the present invention.

At least one embodiment of the invention includes a camera that may output questions to a user. The user may respond to these questions (e.g., providing information about a scene that he is interested in photographing) and one or more settings on the camera may be adjusted based on the user's response.

For example, a camera may ask a user: "Are you at the beach?" If the user responds "Yes" to this question, then the camera may adjust one or more of its settings (e.g., aperture, shutter speed, white balance, automatic neutral density) based on the user's response. In a second example, the camera may ask a user a plurality of questions, starting with "Are you indoors?" If the user responds that he is indoors, then the camera may ask the user a second question: "What type of lights does this room have?" In addition to outputting the question, the camera may output a list of potential answers to the question (e.g., "Fluorescent," "Tungsten," "Halogen," "Skylight," and "I don't know"). The user may respond to the question by selecting one of the potential answers from the list. For example, if the user responds "Fluorescent" to this question, then the camera may adjust its settings to "Fluorescent Light" mode, in which the camera's white balance, aperture, shutter speed, image sensor sensitivity and other settings are adjusted for taking pictures in a room that is lit with fluorescent light bulbs.

Various embodiments of the present invention are described herein with reference to the accompanying drawings. The leftmost digit(s) of a reference numeral typically identifies the figure in which the reference numeral first appears.

Embodiments of the present invention will first be introduced by means of block diagrams of exemplary systems and devices that may be utilized by an entity practicing the present invention. Exemplary data structures illustrating tables that may be used when practicing various embodiments of the present invention will then be described, along with corresponding flowcharts that illustrate exemplary processes with reference to the exemplary devices, systems, and tables.

1. Systems and Devices

Referring now to FIG. 1, a block diagram of a system 100 according to at least one embodiment of the present invention includes one or more servers 110 (e.g., a personal computer, a Web server) in communication, via a communications network 120, with one or more cameras 130 (e.g., digital camera, video camera, wireless phone with integrated digital camera). Each of the servers 110 and cameras 130 may comprise one or more computing devices, such as those based on the Intel Pentium® processor, that are adapted to communicate with any number and type of devices (e.g., other cameras and/or servers) via the communications network 120. Although only two cameras 130 and two servers 110 are depicted in FIG. 1, it will be understood that any number and type of cameras 130 may communicate with any number of servers 110 and/or other cameras 130 (and vice versa).

According to one or more embodiments of the present invention, a camera 130 may communicate with a server 110 in order to determine a question to output to a user. For example, the camera 130 may transmit various information (e.g., images, GPS coordinates) to a computer server 110. The server 110 may then determine a question based on this information. The server 110 may then transmit the question to the camera 130 and the camera 130 may output the question to a user.

Communication among the cameras 130 and the servers 110 may be direct or may be indirect, and may occur via a wired or wireless medium. Some, but not all, possible communication networks that may comprise network 120 (or may otherwise be part of system 100 and/or other exemplary systems described herein) include: a local area network (LAN), a wide area network (WAN), the Internet, a telephone line, a cable line, a radio channel, an optical communications line, and a satellite communications link. In yet other embodiments, the devices of the system 100 may communicate with one another over RF, cable TV, satellite links and the like. Some possible communications protocols that may be part of system 100 include, without limitation: Ethernet (or IEEE 802.3), SAP, ATP, Bluetooth™, IEEE 802.11, CDMA, TDMA, ultra-wideband, universal serial bus (USB), and TCP/IP. Optionally, communication may be encrypted to ensure privacy and to prevent fraud in any of a variety of ways well known in the art. Of course, in lieu of or in addition to the exemplary communications means described herein, any appropriate communications means or combination of communications means may be employed in the system 100 and in other exemplary systems described herein.

For example, communication may take place over the Internet through a Web site maintained by a server 110 on a remote server, or over an on-line data network including commercial on-line service providers, bulletin board systems and the like. In another example, using the wireless capabilities of his mobile phone, a user may upload an image captured using the integrated digital camera to his personal computer, or to a personal database of images on a Web server maintained by his telecommunications company. In another example, while a user is still away from home on vacation, the user's personal computer may receive, via a cable modem, a series of vacation snapshots taken by the user, and may also transmit information about those snapshots and/or questions related to those snapshots back to the user's digital camera.

According to one or more embodiments of the present invention, a server 110 may comprise an external or internal module associated with one or more of the cameras 130 that is capable of communicating with one or more of the cameras 130 and of directing the one or more cameras 130 to perform one or more functions. For example, a server 110 may be configured to execute a program for controlling one or more functions of a camera 130 remotely. Similarly, a camera 130 may comprise a module associated with one or more servers 110 that is capable of directing one or more servers 110 to perform one or more functions. For example, a camera 130 may be configured to direct a server 110 to execute a facial recognition program on a captured image and to return an indication of the best matches to the camera 130 via the communication network 120.

A camera 130 may be operable to access one or more databases (e.g., of server 110) to provide suggestions and/or questions to a user of the camera 130 based on, for example, an image captured by the camera 130 or on information gathered by the camera 130 (e.g., information about lighting conditions). A camera 130 may also be operable to access a database (e.g., an image database) via the network 120 to determine what meta-information (e.g., information descriptive of an image) to associate with one or more images. For example, as discussed further herein, a database of images and/or image templates may be stored for a user on a server 110. Various functions of a camera 130 and/or the server 110 may be performed based on images stored in a personalized database. For instance, an image recognition program running on the server 110 (or on the camera 130) may use the user's personalized database of images for reference in identifying people, objects, and/or scenes in an image captured by the user. If, in accordance with a preferred embodiment, the user has identified the content of some of the images in the database himself (e.g., by associating a meta-tag with an image), a match determined by the image recognition software with reference to the customized database is likely to be acceptable to the user (e.g., the user is likely to agree to a suggestion to associate a meta-tag from a stored reference image with the new image also).

Information exchanged by the exemplary devices depicted in FIG. 1 may include, without limitation, images and indications of changes in settings or operation of a camera 130 (e.g., an indication that a user or the camera 130 has altered an exposure setting). Other exemplary types of information that may be determined by the camera 130 and/or the server 110 and communicated to one or more other devices are described herein. The server 110, for example, may monitor operations of a camera 130 (and/or activity of a user) via the network 120. For instance, the server 110 may identify a subject a user is recording images of and, optionally, use that information to direct the camera 130 to ask if the user would like to e-mail or otherwise transmit a copy of the captured image to the subject.

With respect to the various exemplary systems, devices, and methods discussed herein, those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

According to some embodiments, various processes may be performed by the camera 130 in conjunction with the server 110. For example, some steps of a described process may be performed by the camera 130, while other steps are performed by the server 110. As discussed herein, data useful in providing some of the described functionality may be stored on one of or both of the camera 130 and server 110 (or other devices).

In some embodiments, as discussed herein, the servers 110 may not be necessary and/or may not be preferred. For example, some embodiments of the present invention may be practiced using a camera 130 alone, as described herein. In such embodiments, one or more functions described as being performed by the server 110 may be performed by the camera 130, and some or all of the data described as being stored on a server 110 may be stored on the camera 130 or on another device in communication with the camera 130 (e.g., another camera, a personal digital assistant (PDA)).

Similarly, in some embodiments the cameras 130 may not be necessary and/or may not be preferred. Accordingly, one or more functions described herein as being performed by the camera 130 may be performed by the server 110, and some or all of the described as being stored on the camera 130 may be stored on the server 110 or on another device in communication with the server 110 (e.g., a PDA, a personal computer).

A server 110 may be embodied in a variety of different forms, including, without limitation, a mainframe computer (e.g., an SGI Origin™ server), a personal computer (e.g., a Dell Dimension™ computer), and a portable computer (e.g., an Apple iBook™ laptop, a Palm m515™ PDA, a Kyocera 7135™ cell phone). Several examples of types of cameras, servers, and other devices are discussed herein, and other types consistent with various embodiments of the present invention will be readily understood by those of skill in the art in light of the present disclosure.

Figure 2:
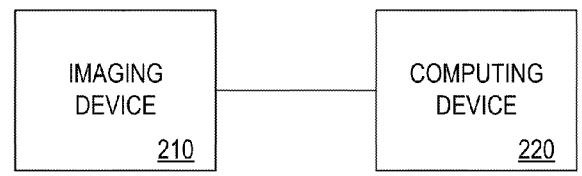
FIG. 2 shows a block diagram of a system that is consistent with at least one embodiment of the present invention.

Referring now to FIG. 2, a block diagram of a system 200 according to at least one embodiment of the present invention includes an imaging device 210 in communication (e.g., via a communications network or system bus) with a computing device 220. Various exemplary means by which devices may communicate are discussed above with respect to FIG. 1. Although only one imaging device 210 and one computing device 220 are depicted in FIG. 2, it will be understood that any number and type of imaging devices 210 may communicate with any number of computing devices 220.

Various types of imaging devices 210 and computing devices 220 are discussed herein. The imaging device 210 preferably comprises at least one device or component for recording an image, such as, without limitation, an image sensor, a camera, or a handheld device having an integrated camera. It will be understood, therefore, that a lens and an image sensor, for example, may each be referred to individually as an imaging device, or, alternatively, two or more such components may be referred to collectively as an imaging device (e.g., as embodied in a camera or PDA). Further, it will be understood, as discussed further below with respect to FIG. 3, that a device embodying any such components (e.g., a camera) may itself be referred to as an imaging device.

The imaging device 210 may further comprise one or more types of computing devices, such as those based on the Intel Pentium® processor, adapted to communicate with the computing device 220. For example, as will be readily apparent to those skilled in the art, many types of cameras include an imaging device (e.g., an image sensor for capturing images) and a computing device (e.g., a processor for executing camera functions). For example, referring now to FIG. 3, a block diagram of a system 300 according to at least one embodiment of the present invention includes a camera 310 in communication (e.g., via a communications network) with a server 340. The camera 310 itself comprises an imaging device 320 (e.g., an image sensor and/or lens) and a computing device 330 (e.g., a camera processor) that is in communication (e.g., via a communication port of the computing device 330) with the server 340 (e.g., a Web server). It will be understood that a device such as the camera 310, comprising both an imaging device and a computing device, may itself be referred to, alternatively, as an imaging device or a computing device.

Referring again to FIG. 2, a computer or computing device 220 may comprise one or more processors adapted to communicate with the imaging device 210 (or one or more computing devices of the imaging device 210). As discussed herein, a computer or computing device 220 preferably also comprises a memory (e.g., storing a program executable by the processor) and may optionally comprise a communication port (e.g., for communication with an imaging device 210). Some examples of a computer or computing device 220 include, without limitation: a camera processor, a camera, a server, a PDA, a personal computer, a computer server, personal computer, portable hard drive, digital picture frame, or other electronic device. Thus, a computing device 220 may but need not include any devices for capturing images. Some exemplary components of a computing device are discussed in further detail below with respect to FIGS. 4-6.

In some exemplary embodiments of the present invention, as discussed herein, imaging device 210 comprises a camera (e.g., a camera 130 of FIG. 1) and the computing device 220 comprises a server (e.g., a server 110 of FIG. 1). In another example consistent with at least one embodiment of the present invention, the system 200 depicts components of a camera or other device capable of recording images. For instance, the imaging device 210 may comprise an image sensor or lens in communication via a camera system bus with a computing device 220 such as a camera computer or integrated communication device (e.g., a mobile phone).

An imaging device 210 or camera 310 may communicate with one or more other devices (e.g., computing device 220, server 340) in accordance with one or more systems and methods of the invention. Examples of devices that an imaging device may communicate with include, without limitation:

(i) a personal digital assistant (PDA)
(ii) a cellular telephone
(iii) a digital wallet (e.g., the iPod™ by Apple, the MindStor™ from Minds@Work, Nixvue's Digital Album™)
(iv) a portable stereo (e.g., an MP3 music player, a Sony Discman™)
(v) a notebook computer
(vi) a tablet computer
(vii) a digital picture frame (e.g., Iomega's FotoShow™, NORDview's Portable Digital Photo Album™)
(viii) a GPS device (e.g., such as those manufactured by Garmin)
(ix) a personal computer According to various embodiments of the present invention, an imaging device 210 may transfer one or more images to a second device (e.g., computing device 220). Some examples are provided with reference to FIGS. 1-3. In one example, an imaging device 210 may include a wireless communication port that allows the camera to transmit images to a second electronic device (e.g., a computer server, personal computer, portable hard drive, digital picture frame, or other electronic device). The second electronic device may then store copies of the images. After transferring the images to this second electronic device, the imaging device 210 may optionally delete the images, since the images are now stored securely on the second electronic device.

According to another exemplary embodiment, the camera 310 may include a cellular telephone or be connected to a cellular telephone with wireless modem capabilities (e.g., a cellular telephone on a 2.5 G or 3 G wireless network). Using the cellular telephone, the camera may transmit one or more images to the computer server 340, which may store the images.

In another example, an imaging device 210 may communicate with a portable hard drive such as an Apple iPod™. To free up memory on the imaging device 210, the imaging device 210 may transfer images to the portable hard drive.

In another example, the camera 130 may have a wireless Internet connection (e.g., using the 802.11 wireless protocol) and use this connection to transmit images to a personal computer that is connected to the Internet. Note that by transferring an image from a camera to a second electronic device, the camera may effectively expand its available memory. That is, some or all of the memory on the second electronic device may be available to the camera for storing images.

According to various embodiments of the present invention, a camera 310 or other imaging device 210 may communicate with an electronic device to output a question to a user. For example, a camera may transmit a question to a user's PDA. The question may then be displayed to the user by the PDA. Using a PDA or other device with a relatively large display may make it easier for a user to view a question (e.g., a question that includes a large amount of text or a question which is based on an image).

In another example, a digital camera may queue up a plurality of questions and output these questions to a user's personal computer when the user uploads photos from the camera to the personal computer. The personal computer may run software that outputs the questions to the user and enables the user to respond to the questions. Viewing questions on a personal computer may be more convenient than viewing questions using the digital camera. Of course, a user's response to a question may be less useful to the camera (e.g., in adjusting settings on the camera) if this response is provided after the user has already finished capturing images.

According to some embodiments, a camera or other imaging device may communicate with an electronic device to receive an input to a user. For example, a user may use a PDA to indicate a response to a question and then the PDA may transmit an indication of this response to the camera using a Bluetooth communication link. For example, a user may highlight a portion of an image, select a response from a list of responses, or write a free form response using the stylus on his PDA. Providing an input to the camera using a PDA or other electronic device may be particularly convenient for a user because the PDA may include one or more input devices that are not present on the camera (e.g., a touch screen, a GPS device).

In another example, a user may carry a GPS device that is separate from the camera but that communicates with the camera using a USB cable. In order to indicate his location, the user may transmit an indication of his latitude and longitude from the GPS device to the camera. In yet another example, all user control of a camera may be implemented through a user's cellular telephone. For example, the user may use his cellular telephone to remotely operate the camera, pressing the "1" and "2" keys to zoom in and zoom out, the "3" key to capture a picture, and the "4" and "5" keys to answer "Yes" and "no" to questions output by the camera. One advantage of having a second device implement a large number of controls for the camera is that the camera can have a very small form factor, but still be operable by a large number of controls because all of these controls are on the second device.

1.1. Computing Device

Figure 3:
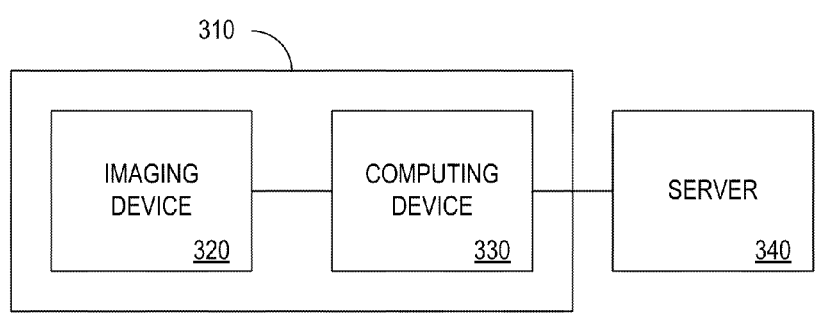
FIG. 3 shows a block diagram of a camera in communication with a computing device that is consistent with at least one embodiment of the present invention.
Figure 4:
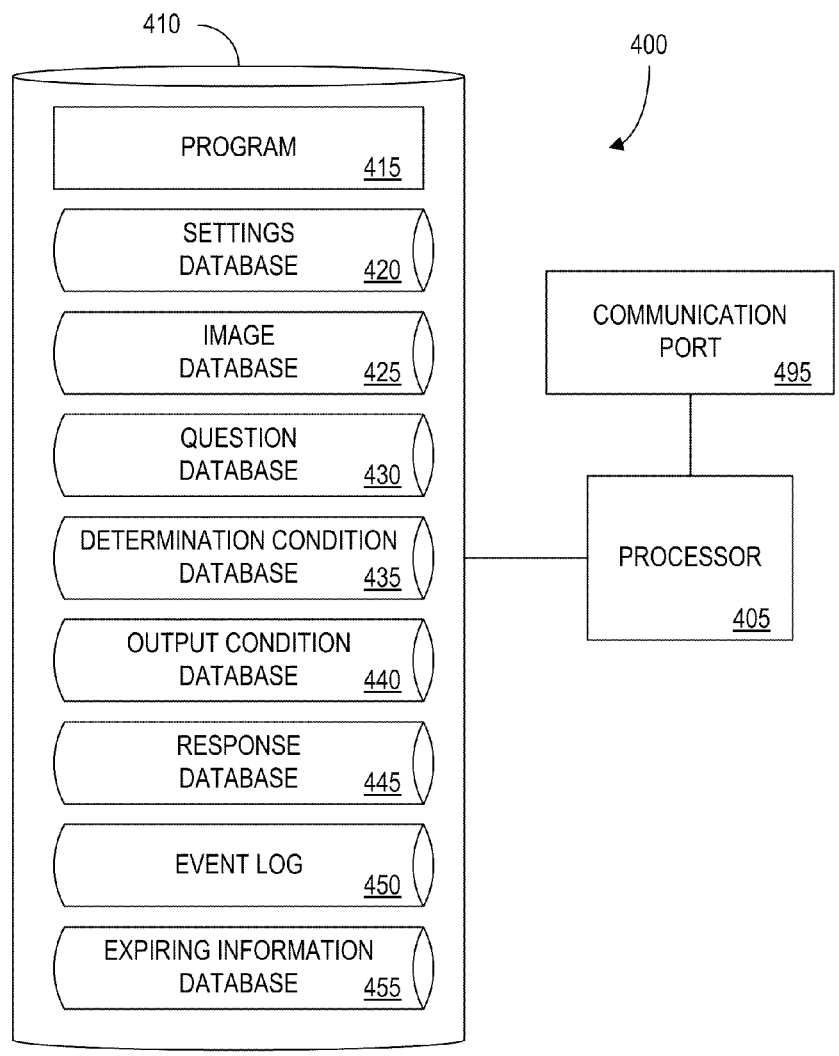
FIG. 4 shows a block diagram of a computing device that is consistent with at least one embodiment of the present invention.

Referring now to FIG. 4, illustrated therein is a block diagram of an embodiment 400 of computing device 220 (FIG. 2) or computing device 330 (FIG. 3). The computing device 400 may be implemented as a system controller, a dedicated hardware circuit, an appropriately programmed general-purpose computer, or any other equivalent electronic, mechanical or electro-mechanical device. The computing device 400 may comprise, for example, a server computer operable to communicate with one or more client devices, such as an imaging device 210. The computing device 400 may be operative to manage the system 100, the system 200, the system 300, and/or the camera 310 and to execute various methods of the present invention.

In operation, the computing device 400 may function under the control of a user, remote operator, image storage service provider, or other entity that may also control use of an imaging device 210 and/or computing device 220. For example, the computing device 400 may be a Web server maintained by an Internet services provider, or may be a computer embodied in a camera 310 or camera 130. In some embodiments, the computing device 400 and an imaging device 210 may be different devices. In some embodiments, the computing device 400 and the imaging device 210 may be the same device. In some embodiments, the computing device 400 may comprise more than one computer operating together.

The computing device 400 comprises a processor 405, such as one or more Intel Pentium® processors. The processor 405 is in communication with a memory 410 and with a communication port 495 (e.g., for communicating with one or more other devices).

The memory 410 may comprise an appropriate combination of magnetic, optical and/or semiconductor memory, and may include, for example, Random Access Memory (RAM), Read-Only Memory (ROM), a compact disc and/or a hard disk. The processor 405 and the memory 410 may each be, for example: (i) located entirely within a single computer or other device; or (ii) connected to each other by a remote communication medium, such as a serial port cable, telephone line or radio frequency transceiver. In one embodiment, the computing device 400 may comprise one or more devices that are connected to a remote server computer for maintaining databases.

The memory 410 stores a program 415 for controlling the processor 405. The processor 405 performs instructions of the program 415, and thereby operates in accordance with the present invention, and particularly in accordance with the methods described in detail herein. The program 415 may be stored in a compressed, uncompiled and/or encrypted format. The program 415 furthermore includes program elements that may be necessary, such as an operating system, a database management system and "device drivers" for allowing the processor 405 to interface with computer peripheral devices. Appropriate program elements are known to those skilled in the art, and need not be described in detail herein.

The term "computer-readable medium" as used herein refers to any medium that participates in providing instructions to processor 405 (or any other processor of a device described herein) for execution. Such a medium may take many forms, including but not limited to, non-volatile media, volatile media, and transmission media. Non-volatile media include, for example, optical or magnetic disks, such as memory 410. Volatile media include dynamic random access memory (DRAM), which typically constitutes the main memory. Transmission media include coaxial cables, copper wire and fiber optics, including the wires that comprise a system bus coupled to the processor 405. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer-readable media may be involved in carrying one or more sequences of one or more instructions to processor 405 (or any other processor of a device described herein) for execution. For example, the instructions may initially be borne on a magnetic disk of a remote computer. The remote computer can load the instructions into its dynamic memory and send the instructions over a telephone line using a modem. A modem local to a computing device 400 (or, e.g., a server 340) can receive the data on the telephone line and use an infrared transmitter to convert the data to an infrared signal. An infrared detector can receive the data carried in the infrared signal and place the data on a system bus for processor 405. The system bus carries the data to main memory, from which processor 405 retrieves and executes the instructions. The instructions received by main memory may optionally be stored in memory 510 either before or after execution by processor 405. In addition, instructions may be received via communication port 495 as electrical, electromagnetic or optical signals, which are exemplary forms of carrier waves that carry data streams representing various types of information. Thus, the computing device 400 may obtain instructions in the form of a carrier wave.

According to an embodiment of the present invention, the instructions of the program 415 may be read into a main memory from another computer-readable medium, such from a ROM to RAM. Execution of sequences of the instructions in program 415 causes processor 405 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 410 also preferably stores a plurality of databases, including a settings database 420, an image database 425, a question database 430, a determination condition database 435, an output condition database 440, a response database 445, an event log 450, and an expiring information database 455. Examples of each of these databases is described in detail below and example structures are depicted with sample entries in the accompanying figures.

As will be understood by those skilled in the art, the schematic illustrations and accompanying descriptions of the sample databases presented herein are exemplary arrangements for stored representations of information. Any number of other arrangements may be employed besides those suggested by the tables shown. For example, even though eight separate databases are illustrated, the invention could be practiced effectively using any number of functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and, likewise, object methods or behaviors can be used to implement the processes of the present invention.

Note that, although these databases are described with respect to FIG. 4 as being stored in one computing device, in other embodiments of the present invention some or all of these databases may be partially or wholly stored in another device, such as one or more imaging devices 210, one or more of the cameras 130, one or more of the servers 110 or 340, another device, or any combination thereof. Further, some or all of the data described as being stored in the databases may be partially or wholly stored (in addition to or in lieu of being stored in the memory 410 of the computing device 400) in a memory of one or more other devices.

1.2. Camera

Figure 5:
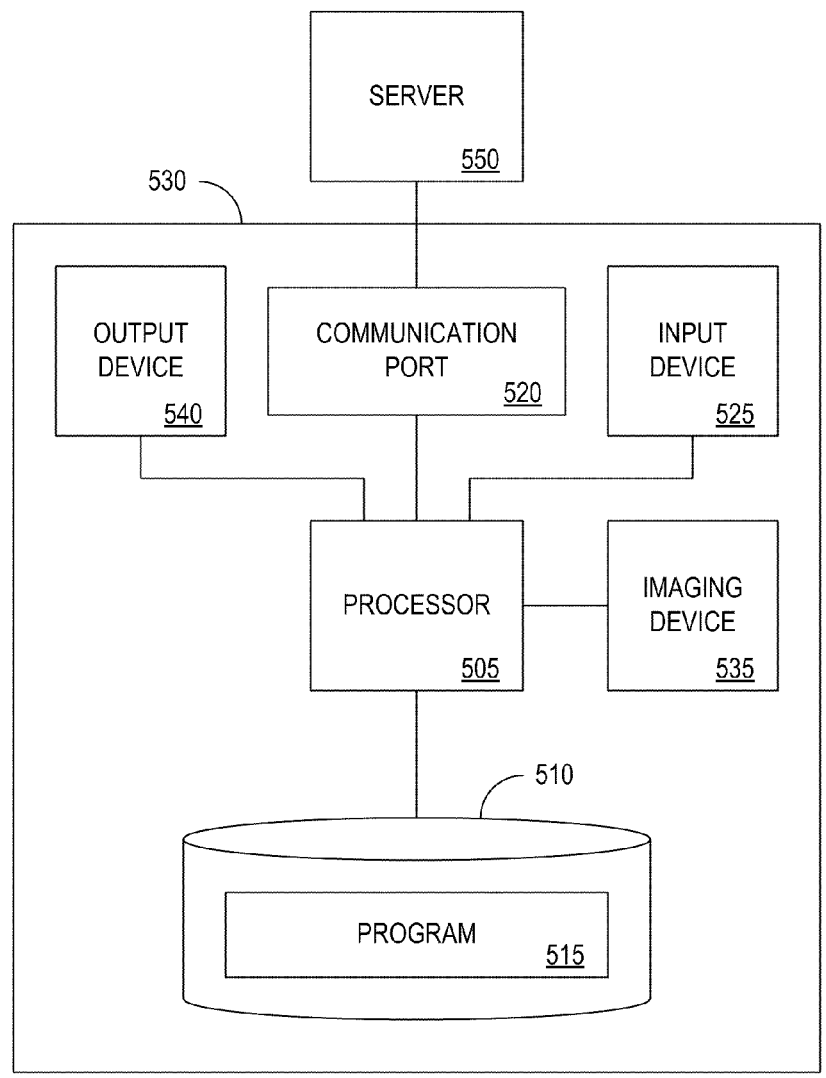
FIG. 5 shows a block diagram of a camera that is consistent with at least one embodiment of the present invention.

Referring now to FIG. 5, illustrated therein is a block diagram of an embodiment 530 of a camera (e.g., camera 130 of FIG. 1, camera 310 of FIG. 3) in communication (e.g., via a communications network) with a server 550. The camera 530 may be implemented as a system controller, a dedicated hardware circuit, an appropriately configured computer, or any other equivalent electronic, mechanical or electro-mechanical device. The camera 530 may comprise, for example, any of various types of cameras well known in the art, including, without limitation, a still camera, a digital camera, an underwater camera, and a video camera. A still camera, for example, typically includes functionality to capture images that may be displayed individually. A single lens reflex (SLR) camera is one example of a still camera. A video camera typically includes functionality to capture movies or video (i.e., one or more sequences of images typically displayed in succession). A still image, movie file or video file may or may not include or be associated with recorded audio. It will be understood by those skilled in the art that some types of cameras, such as the Powershot A40™ by Canon U.S.A., Inc., may include functionality to capture movies and functionality to capture still images.

The camera 530 may comprise any or all of the cameras 130 of system 100 (FIG. 1) or the imaging device 210 (FIG. 2). In some embodiments, a user device such as a PDA or cell phone may be used in place of, or in addition to, some or all of the camera 530 components depicted in FIG. 5. Further, a camera may comprise a computing device or other device operable to communicate with another computing device (e.g., a server 110).

The camera 530 comprises a processor 505, such as one or more Intel Pentium™ processors. The processor 505 is in communication with a memory 510 and a communication port 520 (e.g., for communicating with one or more other devices). The memory 510 may comprise an appropriate combination of magnetic, optical and/or semiconductor memory, and may include, for example, Random Access Memory (RAM), Read-Only Memory (ROM), a programmable read only memory (PROM), a compact disc and/or a hard disk. The memory 510 may comprise or include any type of computer-readable medium. The processor 505 and the memory 510 may each be, for example: (i) located entirely within a single computer or other device; or (ii) connected to each other by a remote communication medium, such as a serial port cable, telephone line or radio frequency transceiver. In one embodiment, the camera 530 may comprise one or more devices that are connected to a remote server computer for maintaining databases.

According to some embodiments, memory 510 of camera 530 may comprise an image buffer (e.g., a high-speed buffer for transferring images from an image sensor) and/or a flash memory (e.g., a high-capacity, removable flash memory card for storing images). A wide variety of different types of memory are possible and are known to those skilled in the art. For example, memory may be volatile or non-volatile; may be electronic, capacitive, inductive, or magnetic in nature; and may be accessed sequentially or randomly.

Memory may or may not be removable from a camera. Many types of cameras may use one or more forms of removable memory, such as chips, cards, and/or discs, to store and/or to transfer images and other data. Some examples of removable media include CompactFlash™ cards, SmartMedia™ cards, Sony Memory Sticks™, MultiMediaCards™ (MMC) memory cards, Secure Digital™ (SD) memory cards, IBM Microdrives™, CD-R and CD-RW recordable compact discs, and DataPlay™ optical media.

The memory 510 stores a program 515 for controlling the processor 505. The program 515 may comprise instructions (e.g., Digital® imaging software, image recognition software) for capturing images and/or for one or more other functions. The processor 505 performs instructions of the program 515, and thereby operates in accordance with the present invention, and particularly in accordance with the methods described in detail herein. The program 515 may be stored in a compressed, uncompiled and/or encrypted format. The program 515 furthermore includes program elements that may be necessary, such as an operating system, a database management system and "device drivers" for allowing the processor 505 to interface with computer peripheral devices. Appropriate program elements are known to those skilled in the art, and need not be described in detail herein.

According to one embodiment of the present invention, the instructions of the program 515 may be read into a main memory from another computer-readable medium, such from a ROM to RAM. Execution of sequences of the instructions in program 515 causes processor 505 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to system 100 of FIG. 1, execution of sequences of the instructions in a program of a server 110 in communication with camera 530 may also cause processor 505 to perform some of the process steps described herein.

The memory 510 optionally also stores one or more databases, such as the exemplary databases described in FIG. 4. An example of a camera memory 510 storing various databases is discussed herein with respect to FIG. 6.

The processor 505 is preferably also be in communication with one or more imaging devices 535 (e.g., a lens, an image sensor) embodied in the camera 530. Various types of imaging devices are discussed herein and in particular with respect to FIG. 6.

The processor 505 is preferably also in communication with one or more input devices 525 (e.g., a button, a touch screen) and output devices 540. Various types of input devices and output devices are described herein and in particular with respect to FIG. 6.

Such one or more output devices 540 may comprise, for example, an audio speaker (e.g., for outputting a question to a user), an infra-red transmitter (e.g., for transmitting a suggested meta-tag to a user's PDA), a display device (e.g., a liquid crystal display (LCD)), a radio transmitter, and a printer (e.g., for printing an image).

An input device 525 is capable of receiving an input (e.g., from a user or another device) and may be a component of camera 530. An input device may communicate with or be part of another device (e.g. a server, a PDA). For cameras, common input devices include a button or dial. Some other examples of input devices include: a keypad, a button, a handle, a keypad, a touch screen, a microphone, an infrared sensor, a voice recognition module, a motion detector, a network card, a universal serial bus (USB) port, a GPS receiver, a radio frequency identification (RFID) receiver, an RF receiver, a thermometer, a pressure sensor, and an infra-red port (e.g., for receiving communications from with a second camera or another device such as a smart card or PDA of a user).

Figure 6:
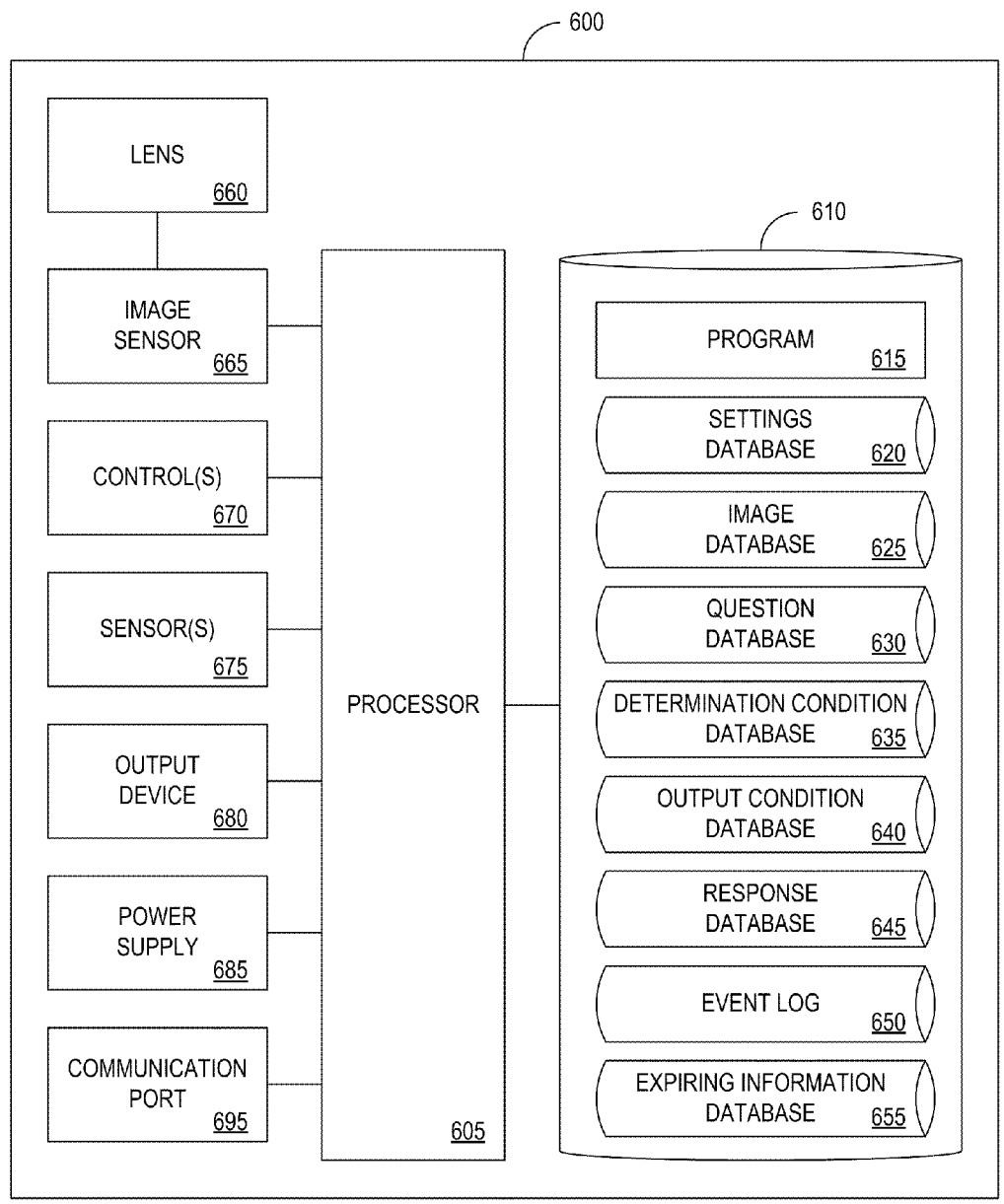
FIG. 6 shows a block diagram of a camera that is consistent with at least one embodiment of the present invention.

Referring now to FIG. 6, illustrated therein is a more detailed block diagram of a embodiment 600 of a camera (e.g., camera 130 of FIG. 1, camera 530 of FIG. 5). The camera 630 comprises a processor 605, such as one or more Intel Pentium™ processors. The processor 605 is in communication with a memory 610 and a communication port 695 (e.g., for communicating with one or more other devices). The memory 610 may comprise or include any type of computer-readable medium, and stores a program 615 for controlling the processor 605. The processor 605 performs instructions of the program 615, and thereby operates in accordance with various processes of the present invention, and particularly in accordance with the methods described in detail herein.

The memory 610 stores a plurality of databases, including a settings database 620, an image database 625, a question database 630, a determination condition database 635, an output condition database 640, a response database 645, an event log 650, and an expiring information database 655. Examples of each of these databases is described in detail below and example structures are depicted with sample entries in the accompanying figures.

The processor 605 is preferably also in communication with a lens 660 (e.g., made of glass), an image sensor 665, one or more controls 670 (e.g., an exposure control), one or more sensors 675, one or more output devices 680 (e.g., a liquid crystal display (LCD)), and a power supply 685 (e.g., a battery, a fuel cell, a solar cell). Various examples of these types of components are described herein.

A processor of a camera 600 may be capable of executing instructions (e.g., stored in memory 610) such as software (e.g., for wireless and/or digital imaging, such as Digital® software from Flashpoint Technology, Inc.).

As indicated in FIG. 6, a camera may include one or more input devices capable of receiving data, signals, and indications from various sources. Lenses, sensors, communication ports and controls are well known types of input devices.

Various types of lenses that may be used with cameras are well known, including telephoto, wide-angle, macro, and zoom lenses.

As will be understood by those of skill in the art, an image sensor may be an area that is responsive to light and may be used to capture an image. An image sensor may or may not be an electronic device. Some examples of image sensors include, without limitation: a CCD (Charge Coupled Device) and a CMOS (Complementary Metal Oxide Semiconductor) image sensor, such as the X3® PRO 10M™ CMOS image sensor by Foveon. An image sensor may comprise software or other means for image identification/recognition. "Image sensor" may be most often used to refer to an electronic image sensor, but those skilled in the art will recognize that various other technologies (e.g., a light sensitive film like that used in analog cameras) may also function as image sensors.

A camera may include one or more output devices. Examples of output devices include, without limitation: a display (e.g., a color or black-and-white liquid crystal display (LCD) screen), an audio speaker (e.g., for outputting questions), a printer (e.g., for printing images), a light emitting diode (LED) (e.g., for indicating that a self-timer is functioning, for indicating that a question for the user is pending), and a touch screen. A display may be useful, for example, for displaying images and/or for displaying camera settings.

The camera may also include one or more communication ports for use in communicating with one or more other devices. For example, a USB (universal serial bus) or Firewire® (IEEE-1394 standard) connection port may be used to exchange images and other types of data with a personal computer or digital wallet (e.g., an Apple iPod™). The camera may be in communication with a cellular telephone, personal digital assistant (PDA) or other wireless communications device. Images and other data may be transmitted to and from the camera using this wireless communications device. For example, the SH251I™ cellular telephone by Sharp Corporation includes a 3.1 megapixel CCD camera, and allows users to receive image files via e-mail. In yet another example, a camera may include a radio antenna for communicating with a radio beacon. For instance, a subject of a photo may carry a radio beacon that may communicate with the camera and provide information that is useful in determining settings for the camera (e.g., information about the light incident on the subject).

As will be understood by those skilled in the art, a camera may include one or more controls or other input devices. Examples of controls include, without limitation: a button (e.g., a shutter button), a switch (e.g., an on/off switch), a dial (e.g., a mode selection dial), a keypad, a touch screen, a microphone, a bar code reader (e.g., such as the one on the 1991 version of the Canon EOS Elan™), a remote control (e.g., such as the one on the Canon Powershot G2™), a sensor, a trackball, a joystick, a slider bar, and a continuity sensor.

Controls on a camera or other type of imaging device may be used to perform a variety of functions. In accordance with various embodiments of the present invention, a control may be used, without limitation, to adjust a setting or other parameter, provide a response to a question, or operate the camera. For example, a user may press the shutter button on the camera to capture an image. Controls may be used to adjust one or more settings on the camera. For example, a user may use "up" and "down" buttons on a camera to adjust the white balance on the camera. In another example, a user may use a mode dial on the camera to select a plurality of settings simultaneously. For example, a user may use a control to indicate to the camera that he would like a question to be output as an audio recording, or to any adjust any of various other types of parameters of how the camera is to operate and/or interact with the user. As discussed herein controls may be used to provide an indication to the camera. For example, a user may use a control to indicate that he would like to have a question output to him. In still another example, a user may use a control to provide a response to a question or to provide other information, such as indicating that the user is in a room with fluorescent lights, at a beach, or capturing images of a football game.

Various types of sensors that may be included in a camera include, without limitation: a light sensor, an image sensor, a range sensor (e.g., for determining the distance to a subject), a microphone (e.g., for recording audio that corresponds to a scene), a global positioning system (GPS) device (e.g., for determining a camera's location), a camera orientation sensor (e.g., an electronic compass, a tilt sensor, an altitude sensor, a humidity sensor, a clock (e.g., indicating the time of day, day of the week, month, year), and a temperature/infrared sensor.

According to some embodiments, a microphone may be useful for allowing a user to control the camera using voice commands. Voice recognition software (e.g., ViaVoice™ from IBM Voice Systems) is known to those skilled in the art and need not be described further herein.

1.3. Databases

As will be understood by those skilled in the art, a setting for a camera may be a parameter that affects how the camera operates (e.g., how the camera captures at least one image). Examples of types of settings on a camera include, without limitation: exposure settings, lens settings, digitization settings, flash settings, multi-frame settings, power settings, output settings, function settings, and mode settings. Some more detailed examples of these types of settings are discussed further below.

Exposure settings may affect the exposure of a captured image. Examples of exposure settings include, without limitation: shutter speed, aperture, image sensor sensitivity (e.g., measured as ISO or ASA), white balance, color hue, and color saturation. Lens settings may affect properties of a lens on the camera. Examples of lens settings include, without limitation: focus (e.g., near or far), optical zoom (e.g., telephoto, wide angle), optical filters (e.g., ultraviolet, prism), an indication of which lens to use (e.g., for a camera that has multiple lenses) or which portion of a lens, field of view, and image stabilization (e.g., active or passive image stabilization).

Digitization settings may affect how the camera creates a digital representation of an image. Examples of digitization settings include, without limitation: resolution (e.g., 1600×1200 or 640×480), compression (e.g., for an image that is stored in JPG format), color depth/quantization, digital zoom, and cropping. For instance, a cropping setting may indicate how the camera should crop an acquired digital image when storing it to memory.

Flash settings may affect how the flash on the camera operates. Examples of flash settings include, without limitation: flash brightness, red-eye reduction, and flash direction (e.g., for a bounce flash). Multi-frame settings may affect how the camera captures a plurality of related images. Examples of multi-frame settings include, without limitation: a burst mode (e.g., taking a plurality of pictures in response to one press of the shutter button), auto-bracketing (e.g., taking a plurality of pictures with different exposure settings), a movie mode (e.g., capturing a movie), and image combination (e.g., using Canon's PhotoStitch™ program to combine a plurality of images into a single image).

Power settings may affect the supply of power to one or more of the camera's electronic components. Examples of power settings include, without limitation: on/off and "Power-Save" mode (e.g., various subsystems on a camera may be put into "Power-Save" mode to prolong battery life).

Output settings may affect how the camera outputs information (e.g., to a user, to a server, to another device). Examples of output settings include, without limitation: language (e.g., what language is used to output prompts, questions, or other information to a user), viewfinder settings (e.g., whether a digital viewfinder on the camera is enabled, how a heads-up-display outputs information to a user), audio output settings (e.g., whether the camera beeps when it captures an image, whether questions may be output audibly), and display screen settings (e.g., how long the camera displays images on its display screen after capturing them).

In accordance with one or more embodiments of the present invention, a camera may be operable to capture images and to perform one or more of a variety of other functions. A function setting may cause one or more functions to be performed (and/or prevent one or more functions from being performed). For example, if an auto-rotate setting on a camera is enabled, then the camera may automatically rotate a captured image so that it is stored and displayed right side up, even if the camera was held at an angle when the image was captured. Other examples of functions that may be performed by a camera include, without limitation: modifying an image (e.g., cropping, filtering, editing, adding meta-tags), cropping an image (e.g., horizontal cropping, vertical cropping, aspect ratio), rotating an image (e.g., 90 degrees clockwise), filtering an image with a digital filter (e.g., emboss, remove red-eye, sharpen, add shadow, increase contrast), adding a meta-tag to an image, displaying an image (e.g., on a LCD screen of the camera), and transmitting an image to another device (e.g., a personal computer, a printer, a television).

One way to adjust a setting on the camera is to change the camera's mode. For example, if the camera were to be set to "Fluorescent Light" mode, then the settings of the camera would be adjusted to the exemplary values listed in this column (i.e., the aperture would be set to automatic, the shutter speed would be set to $1/125$ sec, the film speed would be set to 200 ASA, etc.).

In accordance with some embodiments of the present invention, a mode refers to one or more parameters that may affect the operation of the camera. A setting may be one type of parameter. Indicating a mode to the camera may be a convenient way of adjusting a plurality of settings on the camera (e.g., as opposed to adjusting each setting individually). There are many types of modes. Some types, for example, may affect settings (e.g., how images are captured) and other modes may affect outputting questions. Some exemplary modes are discussed herein, without limitation, and other types of modes will be apparent to those skilled in the art in light of the present disclosure. A "Sports" mode, for example, may describe settings appropriate for capturing images of sporting events (e.g., fast shutter speeds). For instance, a user may operate a control (e.g., a dial) to indicate that the camera should be in "Sports" mode, in which the shutter speed on the camera is faster than $1/250$ sec and burst capturing of three images is enabled. An exemplary "Fluorescent Light" mode may establish settings appropriate for capturing images under fluorescent lights (e.g., white balance). A "Sunny Beach" mode may describe settings appropriate for capturing images on sunny beaches, and a "Sunset" mode may describe settings appropriate for capturing images of sunsets (e.g., neutral density filter). An exemplary "Portrait" mode may establish settings appropriate for capturing close-up images of people (e.g., adjusting for skin tones).

Referring now to FIG. 7, an exemplary tabular representation 700 illustrates one embodiment of settings database 420 (or settings database 620) that may be stored in an imaging device 210 and/or computing device 220. The tabular representation 700 of the settings database includes a number of example records or entries, each defining a setting that may be enabled or adjusted on an imaging device such as camera 130 or camera 600. Those skilled in the art will understand that the settings database may include any number of entries.

The tabular representation 700 also defines fields for each of the entries or records. The exemplary fields specify: (i) a setting 705, (ii) a current value 710 that indicates the present value or state of the corresponding setting, (iii) a value 715 that indicates an appropriate value for when the camera is in a "Fluorescent Light" mode, (iv) a value 720 that indicates an appropriate value for when the camera is in a "Sunny Beach" mode, and (v) a value 725 that indicates an appropriate value for when the camera is in a "Sunset" mode.

The settings database may be useful, for example, for determining the current value 710 of a given setting (e.g., "aperture"). Also, as depicted in tabular representation 700, one or more values may be established for association with a given mode. For example, tabular representation 700 indicates that if the mode of the camera is "Fluorescent Light," the "aperture" setting will be changed to "auto."

Referring now to FIG. 8, an exemplary tabular representation 800 illustrates one embodiment of image database 425 (or image database 625) that may be stored, for example, in a server 110 and/or camera 130. The tabular representation 800 of the image database includes a number of example records or entries, each defining a captured image. Those skilled in the art will understand that the image database may include any number of entries.

The tabular representation 800 also defines fields for each of the entries or records. The exemplary fields specify: (i) an image identifier 805 that uniquely identifies an image, (ii) an image format 810 that indicates the file format of the image, (iii) an image size 815, (iv) a file size 820, (v) a time 825 that indicates when the image was captured, and (vi) meta-data 830 that indicates any of various types of supplemental information (e.g., keyword, category, subject, description, location, camera settings when the image was captured) associated with the image.

It will be understood by those skilled in the art that a variety of different types of meta-data 830 are possible, including position (e.g., GPS), orientation, altitude, exposure settings (aperture/shutter speed), illumination (daylight/tungsten/florescent/IR/flash), lens setting (distance/zoom position/macro), scene data (blue sky/water/grass/faces), subject motion, image content (e.g., subjects), sound annotations, date and time, preferred cropping, and scale. Other types of meta-data are discussed herein.

With respect to the image identifier 805, a camera may automatically assign an identifier to an image, or a user may use a control (e.g., a keypad) on a camera to indicate an identifier for an image.

The image database may be useful for various types of processes described herein.

In accordance with various embodiments of the present invention, a camera and/or server may output various different types of questions to a user.

A question may comprise a request for information from a user. For example, a camera may output a question to a user in order to determine information useful in applying meta-information to an image or in capturing one or more images (e.g., information about lighting, information about subjects, information about a scene).

Examples of different types of questions include, without limitation: questions about lighting, questions about people and subjects of images, questions about focus and depth of field, questions about meta-tagging and sorting, questions about events and locations, questions about the environment, questions about scenes, questions about future plans, questions about priorities, and questions about images.

Some examples of questions about lighting include, without limitation:
- (i) "Are you indoors?"
- (ii) "What kind of light bulb(s) does this room have?" (e.g., with multiple choice answers "tungsten," "fluorescent," "halogen," and "I don't know")
- (iii) "Are we in the shade?"
- (iv) "It's very dark here. Is it nighttime?"

Some examples of questions about people and subjects of images include:
- (i) "Who is in this picture?"
- (ii) "What other pictures is <person> in?"
- (iii) "It looks like you're taking a picture of Alice. Are you taking a picture of Alice?"
- (iv) "Is this the same person that was in picture #42<show picture #42>?"
- (v) "It looks like you're taking a picture of an animal. Are you taking a picture of your pet?"

Examples of questions about focus and depth of field include:
- (i) "What are you trying to focus on?"
- (ii) "The background of this image looks complicated. Do you want the background to be in focus?"
- (iii) "Do you want the background to be sharp or blurred?"
- (iv) "Do you want <object> to be in focus?"
- (v) "Do you want <object> to be sharp or blurred?"
- (vi) "There's a small object in the foreground (left side) of your image. Do you want this object to be in focus?"

Examples of questions about meta-tagging and sorting:
- (i) "Do you want to automatically store images of <subject> in a separate directory?"
- (ii) "Where should I store images of <subject>?"
- (iii) "How would you characterize this image?"

Examples of questions about events and locations include, without limitation:
- (i) "I think I see candles. Are we at a birthday party?"
- (ii) "Are you taking pictures of a sporting event?"
- (iii) "It appears that you're taking lots of pictures of animals. Are you at the zoo?"
- (iv) "I saw a bright flash and heard an explosion. Are you taking pictures of fireworks?"

Examples of questions about the environment include, without limitation:
- (i) "The current humidity level of the air is 90%. Is it raining outside?"
- (ii) "This image seems cloudy. Am I underwater?"
- (iii) "The sky has an orange tint. Is the sun setting?"
- (iv) "Is it cloudy outside?"
- (v) "Are we in the shade?"
- (vi) "The camera is rocking back and forth. Are you on a boat?"
- (vii) "We're traveling at 200 mph. Are you in an airplane?"
- (viii) "Are you in a moving vehicle (e.g., a car)?"
- (ix) "Is the camera on a tripod?"

Some examples of questions about scenes include:
- (i) "I think I see a rainbow. Are you trying to take a picture of a rainbow?"
- (ii) "I think I see running water. Are you trying to take a picture of a waterfall?"
- (iii) "I think I see sand. Are you trying to take a picture of a beach?"
- (iv) "I think I see a body of water. Are you trying to take a picture of an ocean, lake, or pond?"
- (v) "Are you taking a picture through a window?"
- (vi) "I think I see a reflection. Will this picture have a mirror in it?"
- (vii) "Are you taking a picture of a sunset?"
- (viii) "Are you taking a picture of stars in the sky?"
- (ix) "What is the most important element in this scene?"
- (x) "Are you taking a picture of a reflection?"

Examples of questions about future plans include:
- (i) "There are 23 Mb of memory remaining. How many more pictures are you planning on taking today?"
- (ii) "How many pictures are you planning on taking of this scene?"
- (iii) "You've already captured 23 pictures of Alice. How many pictures are you planning on taking of Alice?"
- (iv) How much longer are you planning on using the camera? (e.g., with multiple choice answers "less than 10 minutes," "10-30 minutes," "30-60 minutes," and "more than 60 minutes")
- (v) "This memory card has only 10 Mb of space left. Do you have any blank memory cards with you?"
- (vi) "My batteries will run out in less than 30 minutes. Do you have any more charged batteries with you?"
- (vii) "Are you done taking pictures of this scene?"
- (viii) "Do you need a good picture of every subject?"
- (ix) "Who do you want to capture pictures of today?"
- (x) "Who should receive a copy of this image? (e.g., Grandma, Uncle Joey, Kodak.com's Picture of the Day contest)"
- (xi) "Are you planning on using this image in a slide show?"
- (xii) "Are you planning on emailing this image to somebody?"

Some examples of questions about priorities include, without limitation:
- (i) "Are you more concerned about exposure or sharpness?"
- (ii) "Are you more concerned about framing or resolution?"
- (iii) "I think I see Alice and Bob. Who is the subject of this photo? (e.g., with multiple choice answers "Alice," "Bob," "both Alice and Bob," and "neither Alice nor Bob")"
- (iv) "Do you want to focus on Alice or the mountains?"

Some examples of questions about images include:
- (i) "Who is the subject of this image?"
- (ii) "How would you rate this image on a 1-10 scale?"
- (iii) "How would you rate the exposure of this image on a 1-10 scale?"
- (iv) "Would you prefer the background of this image to be sharper or more blurred?"
- (v) "Is this an image of Alice or Amy?"
- (vi) "Does Alice's skin tone look correct in this image?"
- (vii) "Which is your favorite picture from this group?"
- (viii) "Rank these images from best to worst, starting with your favorite image."
- (ix) "Is this image overexposed?"
- (x) "Should this image be categorized automatically?"

Different types of questions may illicit different types of responses from a user. For example, questions may be classified according to the types of responses they are designed to illicit. Some examples of questions classified in this manner include:
- (i) Yes/No questions (e.g., "Is this a picture of Alice?")
- (ii) open-ended questions (e.g., "Who is in this picture?")
- (iii) multiple-choice questions in which the user is presented with a plurality of options and prompted to choose at least one of the options (e.g., "Who is in this picture? a) Alice b) Bob c) both d) neither.")
- (iv) true/false questions (e.g., "True or False?: This is a picture of Alice.")

(v) graphical response questions (e.g., "Point to Alice in this picture.")
(vi) ratings (e.g., a user may be asked to rate how much he likes an image)

Note that a question may be phrased in the first person. Some types of users may find this personification of the camera appealing. Various exemplary ways that a question may be output to a user are discussed herein.

Referring now to FIG. 9, an exemplary tabular representation 900 illustrates one embodiment of the question database 430 (FIG. 4) that may be stored in the computing device 400. The tabular representation 900 of the question database includes a number of example records or entries, each defining a question that may be output by a server 110 or by a camera 130. Those skilled in the art will understand that the question database may include any number of entries.

The tabular representation 900 also defines fields for each of the entries or records. The exemplary fields specify: (i) a question identifier 905 that uniquely identifies a particular question, (ii) a question to ask 910 that includes an indication (e.g., in text) of a question to output (e.g., to a user, to transmit to a camera 130), and (iii) a potential response 915 that indicates one or more potential responses to the corresponding question (e.g., multiple-choice answers, acceptable answers, answers to suggest).

The question to ask 910 and potential responses 915 may be used, for example, in accordance with various embodiments described herein for outputting a question to a camera user. According to some embodiments of the present invention, if the question is a multiple choice question, then a plurality of potential answers 915 may be presented to the user. The user may then answer the question by selecting one of the potential answers. In another example, question identifier 905 may be used (e.g., in conjunction with a response database) in ensuring that a camera does not repeat the same question.

According to at least one embodiment, a condition may comprise a Boolean expression. This Boolean expression, for example, may reference one or more variables (i.e., factors) and may include Boolean modifiers and conjunctions (e.g. AND, OR, XOR, NOT, NAND), comparators (e.g., >, <, =, >=, <=, !=), mathematical operations (e.g. +, −, *, /, mean, standard deviation, logarithm, derivative, integral), functions (e.g., search_term_in_database( ), autocorrelation( ), dilate( ), fourier_transform( ), template_match( )), and constants (e.g., 10, 20 pixels, 300 milliseconds, 4 lumens, 0.02, 15%, pi, TRUE, yellow, "raining," 5200 K). Some examples of conditions comprising Boolean expressions include, without limitation:

(i) picture_of_football_player (image2394) AND (NOT Date="Halloween")
(ii) (identify_person_in_image (image736234)= "FAILED")
(iii) (subject_of_image (image420378)="dog")
(iv) (average_rate_of_capturing_images>2.1 per minute) OR (empty_memory<10 Mb)
(v) (number_of_images>10) AND (percentage_of_images_captured_using_flash>80%)
(vi) (average_audio_noise_level>=70 dB)
(vii) (average_rating (image45618, image86481, image18974)<5)

A condition may be based on one or more factors. Examples of factors include, without limitation: factors affecting the occurrence of a condition, factors affecting whether a condition is true, factors causing a condition to occur, factors causing a condition to become true, and factors affecting the output of a message.

Some general categories of factors include, without limitation: factors related to images, indications by a user, time-related factors, factors relating to a state of the camera, information from sensors, characteristics of a user, and information from a database.

Examples of factors relating to indications by a user include, without limitation: usage of controls (e.g., a shutter button, an aperture setting, an on/off setting), voice commands (e.g., recorded by a microphone), movement of the camera (e.g., observed using an orientation sensor), ratings provided (e.g., a user may rate the quality of an image or how much he like an image), and responses to previous questions. For example, the camera may use feedback to determine the next question in a series of questions to ask a user.

Examples of time-related factors include, without limitation: the duration of a condition (e.g., for the last ten seconds, for a total of fifteen minutes), the current time of day, week, month, or year (e.g., 12:23 pm Sep. 6, 2002), a duration of time after a condition occurs (e.g., two seconds after a previous image is captured), an estimated amount of time until a condition occurs (e.g., ten minutes until the camera's batteries run out, twenty minutes before the sun goes down).

Some examples of factors relating to the state of the camera include, without limitation: current and past settings (e.g., shutter speed, aperture, mode), parameters that affect the operation of the camera, current and past modes (e.g., "Sports" mode, "Manual" mode, "Macro" mode, "Twilight" mode, "Fluorescent Light" mode, "Silent" mode, "Portrait" mode, "Output Upon Request" mode, "Power-Save" mode), images stored in memory (e.g., total images stored, amount of memory remaining), current mode (e.g., "Sports" mode), and battery charge level.

Examples of factors relating to information from sensors include, without limitation: location of the camera (e.g., determined with a GPS sensor), orientation of the camera (e.g., determined with an electronic compass), ambient light (e.g., determined with a light sensor), sounds and audio (e.g., determined with a microphone), the range to a subject (e.g., as determined using a range sensor), a lack of movement of the camera (e.g., indicating that the user is aiming the camera), signals from other devices (e.g., a radio beacon carried by a subject, a second camera), and temperature (e.g., determined by a temperature/infrared sensor).

The camera may ask different questions to different types of users. Some examples of factors relating to characteristics of a user include, without limitation: preferences for capturing images (e.g., likes high contrast pictures, likes softening filters, saves images at best quality JPG compression), habits when operating camera (e.g., forgets to take off the lens cap, turns camera on and off a lot), appearance (e.g., is the user of the camera in an image captured using a self-timer?), characteristics of users other than the current user of the camera (e.g., past users, family members), family and friends, and skill level. For example, a skilled user may tend to capture images that are well-composed, correctly exposed, and not blurry. In contrast, a less-experienced user may tend to have trouble capturing high-quality images.

As discussed variously herein, various embodiments of the present invention provide for information to be stored in one or more databases. Some examples of factors relating to information stored in a database include, without limitation:

(i) templates or other information useful in recognizing or processing images
(ii) images stored in the camera's memory (e.g., an image database such as the one shown in FIG. 8)
(iii) indications by a user (e.g., previous answers to questions)

(iv) predicted weather conditions (v) current weather conditions (vi) topography, vegetation (vii) locations of landmarks (viii) light sources (e.g., all of the lights in this building are fluorescent)

(ix) anticipated events (e.g., Old Faithful at Yellowstone National Park erupting)

Figure 10:
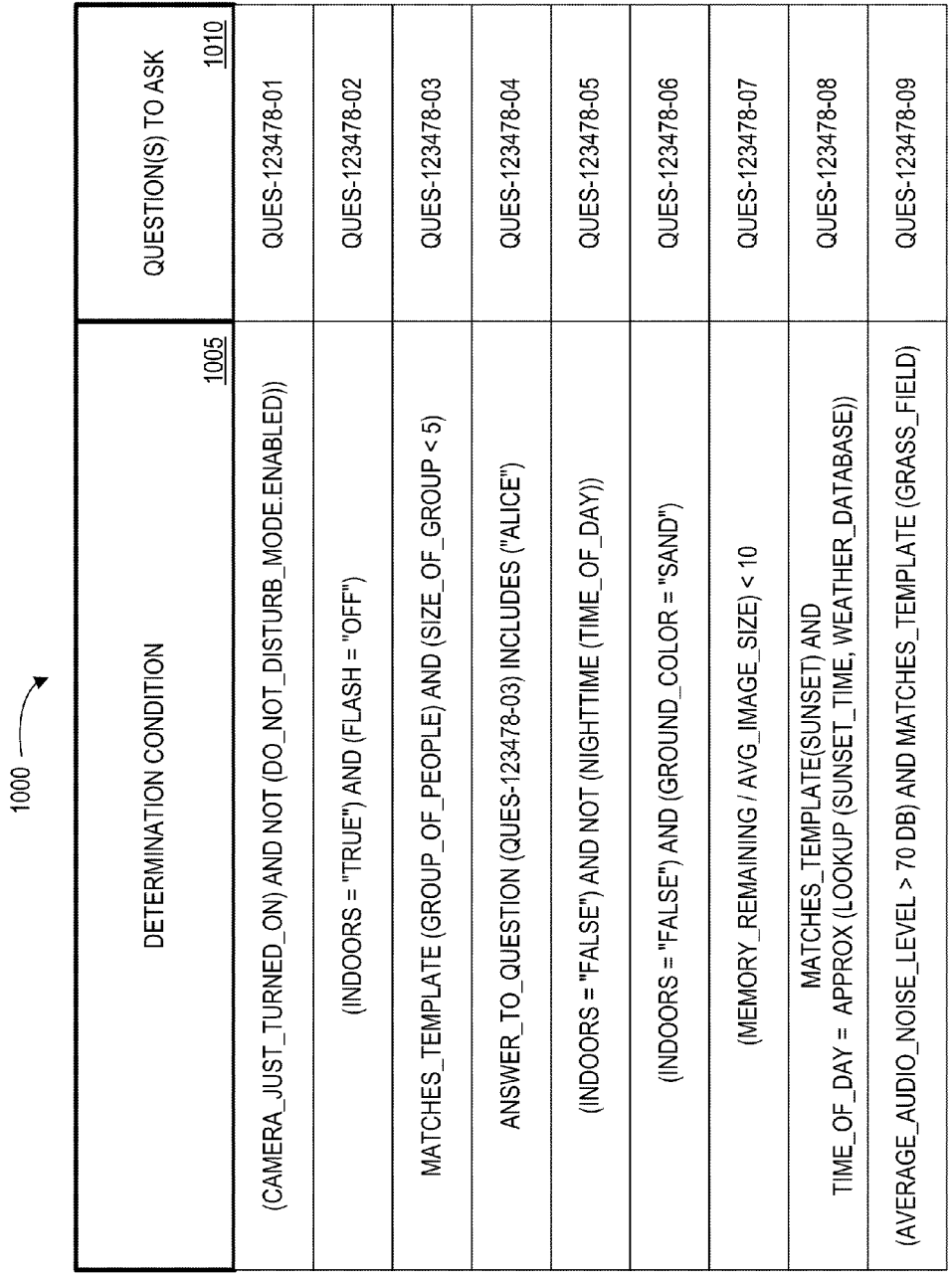
FIG. 10 is a table illustrating an exemplary data structure of a determination condition database consistent with at least one embodiment of the present invention.

(x) the current score of a baseball game (xi) sunrise and sunset times (xii) high and low tide times The camera may store a determination condition database for storing information related to such conditions, such as the one shown in FIG. 10. For each determination condition stored in the condition database, a corresponding question may be output if the determination condition is true. For example, QUES-123478-02 ("What kind of light bulbs does this room have?") may be output to a user if the camera is indoors and the flash is turned off.

Referring now to FIG. 10, an exemplary tabular representation 1000 illustrates one embodiment of the determination condition database 435 (FIG. 4) that may be stored in the computing device 400. The tabular representation 1000 of the determination condition database includes a number of example records or entries, each defining a determination condition that may be useful in determining one or more questions to ask a user of a camera. Those skilled in the art will understand that the determination condition database may include any number of entries.

The tabular representation 1000 also defines fields for each of the entries or records. The exemplary fields specify: (i) a determination condition 1005 that defines a particular determination condition, and (ii) a question to ask 1010 that includes an identifier of a question corresponding to the determination condition.

Question to ask 1010 preferably contains a unique reference to a question (e.g., as stored in a corresponding record of a question database). Of course, a determination condition database may include the actual text of a question and thus may not require a question identifier. For each condition, the determination condition database preferably stores a condition for asking at least one question and at least one question to ask if the condition is true. As depicted in tabular representation 1000, for example, "QUES-123478-02" may be output to a user if the user is indoors and the camera's flash is turned off. According to another example, a question may be output to a user if a condition is true. For example, "QUES-123478-02" of FIG. 9 ("What kind of light bulbs does this room have?") may be output to a user if the camera is indoors and the flash is turned off. Note that the question identifier listed in the exemplary question to ask field 1010 may correspond to a question identifier in the question database shown in FIG. 9. For example, "QUES-123478-01" refers to the question "Are you indoors or outdoors?" in tabular representation 900.

Referring now to FIG. 11, an exemplary tabular representation 1100 illustrates one embodiment of the output condition database 440 (FIG. 4) that may be stored in the computing device 400. The tabular representation 1100 of the output condition database includes a number of example records or entries, each defining a output condition that may be useful in determining when and/or how to output a question to a user. Those skilled in the art will understand that the output condition database may include any number of entries.

The tabular representation 1100 also defines fields for each of the entries or records. The exemplary fields specify: (i) a camera mode 1105, (ii) a question ready indication 1110, (iii) an output condition 1115 that indicates a condition for outputting a question, (iv) a method 1120 that indicates a preferred method for outputting a question, and (v) an enabled field 1130 that indicates whether the corresponding camera mode (e.g., "Fully Automatic" mode) is presently enabled.

The output condition database stores information that may be useful in determining when and/or how to output at least one question to a user, as discussed herein. For example, an audio recording of a question may be output when a user presses the camera's shutter button halfway down.

As discussed herein, a mode of a camera may include a collection of one or more parameters that affect when and/or how at least one question is output to a user. For example, the camera may have an "Output Upon Request" mode in which one or more questions may be output to a user when the user presses an "Ask Me a Question" button on the camera. Prior to outputting a question to a user, the camera may output an indication that a question is ready to be output. The question ready indication 1110 thus describes what indication (if any) may be output to a user to indicate that the camera has a question for the user. For example, as depicted in tabular representation 1100 of FIG. 11, if the camera is in "Sports" mode, then the camera may "beep" when it determines a question to be output to a user. The question itself may then be output at a later time (e.g., when an output condition occurs).

As described variously herein, a question may be output to a user upon the occurrence of one or more output conditions. For example, when the camera is in "Manual" mode, the camera may output a question when the viewfinder is in use (i.e., the user is looking through the viewfinder). In a second example, the camera may output a question after thirty seconds of inactivity if the camera is in "Silent" mode. The method of output field indicates how a question may be output. As described herein, a question may be output to a user in a variety of different ways. For example, a text representation of a question may be displayed on the camera's LCD screen, or an audio recording of a question may be output using an audio speaker.

The currently enabled field 1130 indicates whether the associated mode (i.e., the mode indicated in the "camera mode" field) is currently enabled. If a mode is enabled, then a question or question ready indication may be output according to the output condition and/or method of output corresponding to that mode. If a mode is disabled, then a question may be output in a different manner (or may not be output at all). It is anticipated that a user may enable and disable modes based on his preferences. For example, if a user is capturing pictures of a musical, then the user may enable "Silent" mode on the camera, so as not to disturb audience members or actors.

Of course, while the exemplary data shown in FIG. 11 indicates that only one mode is enabled ("Manual"), it will be understood that any number of modes (including no modes at all) may be enabled.

The exemplary embodiment of the output condition database shown in FIG. 11 describes one example of a camera communicating with an electronic device. For example, when the camera is in "PDA Assisted" mode, the camera may output a question by transmitting the question to a user's PDA. The user may then respond to this question using the PDA (e.g., by selecting a response using the PDA's stylus) and the PDA may transmit the user's response back to the camera.

Figure 12A:
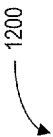

Referring now to FIG. 12A and FIG. 12B, an exemplary tabular representation 1200 illustrates one embodiment of the response database 445 (FIG. 4) that may be stored in the computing device 400. The tabular representation 1200 of the response database includes a number of example records or entries, each defining a response that may be useful in recording responses provided by a user (e.g., in response to a question). Those skilled in the art will understand that the response database may include any number of entries.

The tabular representation 1200 also defines fields for each of the entries or records. The exemplary fields specify: (i) a question 1205 that indicates a question that was output (e.g., to a user), (ii) a time 1210 that indicates when the question was output, (iii) a response to the question 1215 that includes an indication of the response to the question (e.g., text, an audio file), and (iv) an action 1220 that indicates what (if any) actions were taken based on the corresponding response.

For example, the first record in the response database shown in FIG. 12A indicates that a user responded "Indoors" to "QUES-123478-01." An indication of what question was output to a user may comprise a question identifier, for example, which may correspond to a question identifier in the question database (e.g., as represented in FIG. 9). For example, "QUES-123478-01" refers to the question "Are you indoors or outdoors?" in the question database shown in FIG. 4. As indicated in the exemplary table, a question may be output multiple times (e.g., in different situations). For example, "QUES-123478-01" was output to a user at 1:34 p.m. on Aug. 3, 2002 and also at 11:36 p.m. on Aug. 3, 2002.

The response database may indicate that a user has not responded to a question (e.g., for "QUES-123478-01" at 4:10 p.m. on Aug. 17, 2002). In another example, a user may have provided a response that is not an answer to the question (e.g., for "QUES-123478-08" at 7:21 p.m. on Aug. 11, 2002). Thus, in some instances, the camera may determine to output the question again. As discussed herein, camera may perform one or more actions based on a user's response to a question. For example, the camera may meta-tag at least one image or adjust one or more settings on the camera based on a user's response to a question.

Figure 13A:
FIG. 13A is a table illustrating an exemplary data structure of an event log corresponding to capturing images at a wedding, in accordance with at least one embodiment of the present invention.

Referring now to FIG. 13A and FIG. 13B, exemplary tabular representations 1300 and 1350 illustrate two embodiments of an event log database 450 (FIG. 4) that may be stored in the computing device 400. An event log may store a list of events that occurred at one or more cameras and/or servers, for example. FIGS. 13A and 13B show two examples of event logs that may be stored by the camera and/or a server. FIG. 13A shows an exemplary event log for events that occurred on Aug. 3, 2002, generally relating to a user capturing images at a wedding. FIG. 13B shows an exemplary event log for events that occurred on Aug. 10, 2002, generally relating to a user capturing images at a beach. As depicted in the figures, event logs preferably store an indication of a time when an event occurred and a description of the event.

Each tabular representation of the event log includes a number of example records or entries, each defining an event. Those skilled in the art will understand that the response database may include any number of entries.

The tabular representation 1300 also defines fields for each of the entries or records. The exemplary fields specify: (i) a time of event 1305 that indicates a time that the corresponding event occurred, and (ii) a description of the event 1310 that includes (e.g., in text) a description of what the event was. Tabular representation 1350 defines similar fields time of event 1355 and description 1360.

For convenience of discussion, each of the exemplary events logged has been depicted as occurring at a different time. Of course, two or more events may be logged as occurring at the same time. Note that the event times in the exemplary tables are examples only and do not necessarily represent delays that may be associated with processes on the camera. For example, while the event log in FIG. 13A shows that the camera received a user's response to question "QUES-123478-01" at 1:35 pm on Aug. 3, 2002 and then output "QUES-123478-02" at 1:36 PM on Aug. 3, 2002, this does not necessarily mean that there is a one minute delay between receiving a user's response to question "QUES-123478-01" and outputting "QUES-123478-02."

The event logs depicted in FIGS. 13A and 13B may not include one or more events that occur at the camera. For example, the event log shown in FIG. 13A does not include an event of meta-tagging the image "WEDDING-01" as being captured indoors.

Figure 14:
FIG. 14 is a table illustrating an exemplary data structure of an expiring information database consistent with at least one embodiment of the present invention.

FIG. 14 shows an example of an expiring information database that may be stored by a camera, server, or other computing device. This database preferably stores data about information that is useful to a camera as well as an indication of one more conditions under which this information expires (e.g., and should no longer be used by the camera.) The expiring information database may also indicate one or more actions to perform in response to information expiring.

Referring now to FIG. 14, an exemplary tabular representation 1400 illustrates one embodiment of the expiring information database 455 (FIG. 4) that may be stored in the computing device 400. The tabular representation 1100 of the expiring information database includes a number of example records or entries, each defining expiring information that may be useful in determining when information (e.g., as collected by a camera and/or server) should expire. Those skilled in the art will understand that the expiring information database may include any number of entries.

The tabular representation 1400 also defines fields for each of the entries or records. The exemplary fields specify: (i) the information 1405 whose expiration is being monitored, (ii) an expiration condition 1410 that indicates when or under what circumstances the piece of information should expire, and (iii) an action 1415 that indicates an action (if any) to be performed (e.g., by a camera, by a server) in response to the information expiring.

For example, the first record in the tabular representation 1400 of the expiring information database shown in FIG. 14 indicates that the camera will disregard the information that the camera is outdoors and output the question, "Are we outdoors?" if the camera is turned off for more than sixty minutes.

The information field 1405 preferably includes the piece of information (e.g., determined based on a user's response to a question). For example, the camera may store the information "Camera is Outdoors" based on a user responding "outdoors" to the question "Are you indoors or outdoors?" QUES-123478—The expiration condition 1410 preferably indicates one or more conditions under which the information will expire. For example, the information that the weather outside is sunny may be set to expire if the sun goes down or if the camera is taken indoors.

When an expiration condition 1410 occurs, the camera may perform one or more actions. Exemplary actions include outputting a question, adjusting a setting, or ceasing to perform an action (e.g., an action that was performed based on the information being current). For instance, the camera may cancel "Sunny Beach Mode" (e.g., automatically or after prompting the user) in response to the expiration of the information that a user is on a beach.

2. Processes

Methods consistent with one or more embodiments of the present invention may include one or more of the following steps, which are described in further detail herein:

(i) capturing an image,
(ii) determining a question, (iii) outputting a question,
(iv) receiving a response to a question,
(v) performing an action based on a response, and
(vi) expiring information.

Figure 15:
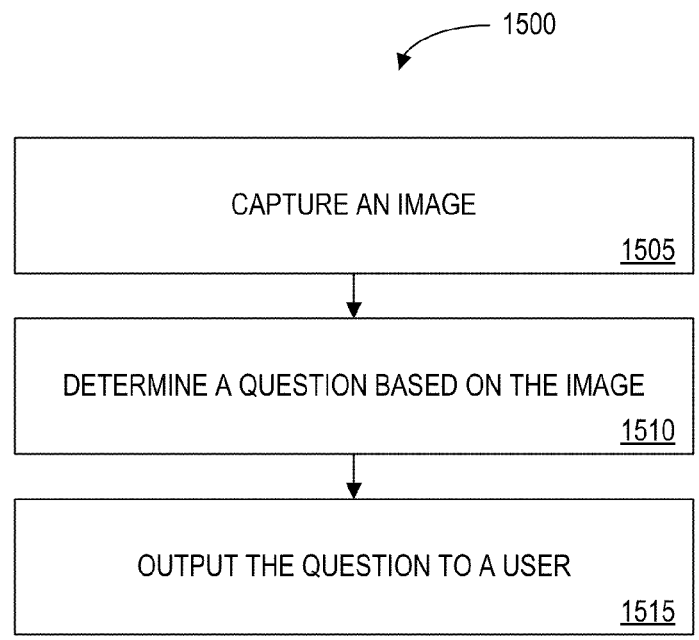
FIG. 15 is a flowchart illustrating a process consistent with at least one embodiment of the present invention.

Referring now to FIG. 15, a flowchart illustrates a process 1500 that is consistent with one or more embodiments of the present invention. The process 1500 is a method for outputting a question to a user of a camera. The process 1500, and all other processes described herein unless expressly specified otherwise, may be performed by an imaging device (e.g., a camera), a computing device (e.g., a server) in communication with an imaging device, and/or a combination thereof. Each of these devices is described in detail herein. Further, the process 1500, and all other processes described herein unless expressly specified otherwise, may include steps in addition to those expressly depicted in the Figures or described in the specification, without departing from the spirit and scope of the present invention. Similarly, the steps of process 1500 and any other process described herein, unless expressly specified otherwise, may be performed in an order other than depicted in the Figures or described in the specification, as appropriate.

Referring to step 1505, an image is captured. Various ways of capturing an image, including by use of a camera, are well known to those skilled in the art and some examples are provided herein. In step 1510, a question is determined based on the captured image (e.g., using a determination condition database of a camera). In step 1515, the determined question is output to a user (e.g., via an output device of a camera). Various ways of determining and of outputting questions are described in detail herein.

Figure 16:
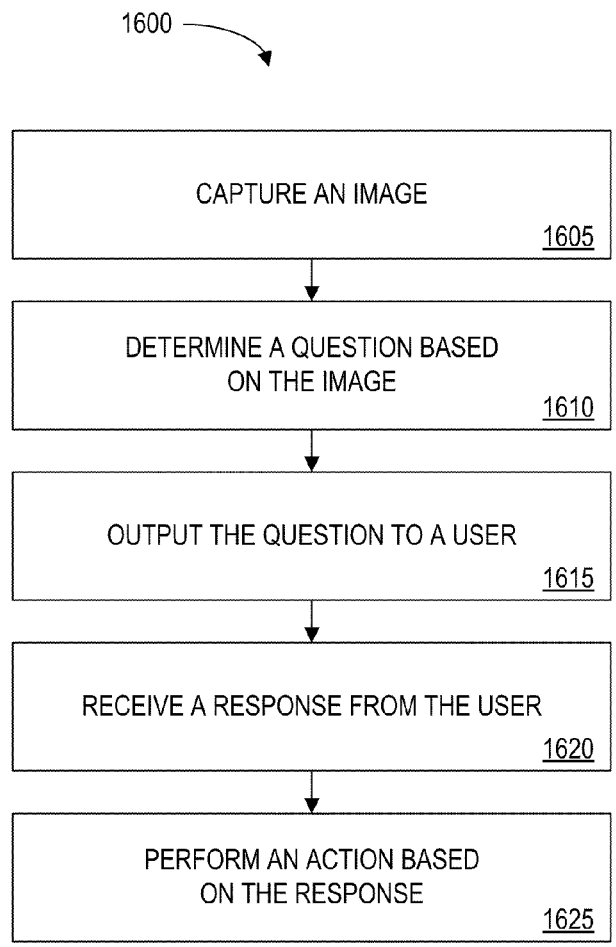
FIG. 16 is a flowchart illustrating a process consistent with at least one embodiment of the present invention for performing an action based on a response.

Referring now to FIG. 16, a flowchart illustrates a process 1600 that is consistent with one or more embodiments of the present invention. The process 1600 is a method for performing an action based on a response from a user. For illustrative purposes only, the process 1600 is described as being performed by a camera 130. Of course, the process 1600 may be performed by any type of imaging device 210, or an imaging device 210 in conjunction with a computing device 220.

Referring to step 1605, a camera 130 captures an image. For example, a user presses a shutter button to record an image of a scene. In another example, the camera 130 automatically captures an image of a scene (e.g., in order to make suggestions that the user adjust one or more settings). In step 1610, the camera determines a question based on the image. For example, the camera 130 may determine that the image is underexposed and may determine that it is appropriate to ask the user if the user intended the image to be underexposed. In another example, the camera 130 may transfer the image or information about the image to a server 110 for determination of a question. Determining the question may thus include receiving an indication of a question from the server 110.

In step 1615, the camera 130 outputs the question to a user (e.g., via an LCD device). In step 1620, the camera 130 receives a response from the user. As discussed herein, the user may provide a response by any of a variety of means, including by making a selection on a displayed menu of possible responses to the question. In step 1625, the camera 130 performs one or more actions based on the received response. For example, based on a response that the user intends the image to be overexposed, the camera 130 may store an indication (e.g., in a response database) that questions about exposure should not be output for images of this scene. Various steps of exemplary processes 1500 and 1600 are described in detail below.

Images may be captured (e.g., using an imaging device 210) in a variety of ways. For example, an image may be captured based on an indication from a user. For instance, a user may operate a control on a camera (e.g., a shutter button) to capture an image. An image may be captured based one or more settings. For example, an image that is captured by a camera may depend on the current aperture, shutter speed, zoom, focus, resolution, and compression settings. Similarly, an image may be captured based on a current mode of the camera (e.g., "Sunset" mode, "Sunny Beach" mode). For example, the camera may have a "Sunset" mode, which describes settings that appropriate for capturing images of sunsets.

Alternatively, an image may be captured automatically (e.g., without any indication from a user). For example, the camera may capture images and store them in a buffer even if a user has not pressed the shutter button on the camera. In order to save memory space, images that are captured automatically may be automatically deleted or overwritten. Capturing an image automatically may be particularly helpful in some embodiments for determining the subject(s) of an image the user wishes to record or how a user is composing a photograph. For example, before a user presses the shutter button on the camera, he may aim the camera at a scene (e.g., his girlfriend in front of the Golden Gate Bridge). The camera may capture an image of this scene and then output a question to the user based on the image. In this manner, an image may be captured and a question may be output to a user prior to the user actually taking a picture.

Capturing an image may include capturing an image based on a condition. This condition may be referred to herein as a capture condition to differentiate it from other described conditions.

Those skilled in the art will readily understand that capturing an image may include storing the image in memory. As discussed herein, various different forms of memory may be used to store an image, including, without limitation: non-volatile memory (e.g., a CompactFlash™ card), volatile memory (e.g., dynamic random access memory (DRAM) for processing by an image recognition process), removable memory (e.g., a SmartMedia™ or CompactFlash™ card), and non-removable memory (e.g., an internal hard drive). Images may be stored in an image database, such as the one shown in FIG. 8.

Other methods and aspects of capturing an image (e.g., using a digital camera) are known to those skilled in the art and need not be described in detail herein.

In accordance with various embodiments of the present invention, a camera and/or server may output various different types of questions to a user. Such questions to ask a user may be determined (e.g., by a server) in many different ways, as discussed variously herein by way of example and without limitation. For instance, questions may be determined based on a condition, based on an image, and/or based on a template. A camera may determine a question to ask a user based on a variety of different factors, including images stored in the camera's memory, the state of the camera (e.g., the camera's current settings), indications by a user (e.g., responses to previous questions), and information from sensors (e.g., information captured by an image sensor).

For example, if a user captured an image of a group of people, then the camera may use image recognition software to determine that this image corresponds to a group of people and ask the user a question about this group of people (e.g., "Who's in this picture?"). According to one embodiment, the camera may determine a question based on an image that was captured automatically (i.e., without the user pressing the shutter button on the camera).

According to one or more embodiments of the present invention, a camera may communicate with a server in order to determine a question to output to a user. For example, the camera may transmit any of various information (e.g., images, GPS coordinates) to a computer server. The server may then determine one or more questions based on this information. The server may then transmit an indication of at least one question to the camera, and the camera may output the question to a user.

Various types of information that may be collected by a camera are described herein. Some examples of information that a camera may transmit to a server include, without limitation: one or more images captured by the camera, indications by a user (e.g., responses to questions, usage of controls), a state of the camera (e.g., current mode, images stored in memory), and information from sensors (e.g., location, orientation, sound and audio).

A server may determine a question to output in accordance with one or more of the exemplary processes discussed herein. It is worthwhile to note that the computer server may have significantly greater processing power, memory, power consumption (e.g., no batteries), and physical size (e.g., not portable) than the camera. This may allow the computer server to perform computations and analysis that are more complex or extensive than could those that could be performed quickly using the camera's processor. For example, the computer server could run complicated image analysis and pattern matching algorithms to determine an appropriate question to ask a user.

After a question is determined, a computer server may transmit an indication of the question to the camera. Examples of indications of questions include, without limitation, a question and a question identifier. For example, the computer server may transmit an audio clip or text messages corresponding to the question. The question may be compressed (e.g., as an MP3) to reduce the bandwidth necessary to transmit the question. In another example, the camera may store a database of questions, with each question in the database being identified by a question identifier. In order to indicate a question to the camera, the computer server may transmit a question identifier corresponding to the question. The camera may then retrieve the question from the database.

After receiving an indication of a question from the computer server, the camera may output this question to a user as discussed variously herein.

According to some embodiments, a camera may determine a question to ask a user based on a condition. This type of condition may also be referred to as a determination condition to differentiate it from other conditions described elsewhere in this disclosure.

Some examples of determining a question based on a condition are discussed herein, without limitation. For instance, if the batteries in the camera are running low (i.e., a condition), then the camera may ask the user, "How many more pictures are you planning on taking?" In one example, if a captured image includes an image of a football player (i.e., a condition), the user is to be asked, "Are you taking pictures of a football game?" In another example, if a captured image includes an image of a candle (i.e., a condition), the user may be asked, "Are you taking pictures of a birthday party?" In one example, if a captured image includes an image of two or more people (i.e., a condition), then the question, "Who are the people in the photo?" is to be output to the user.

As discussed variously herein, in accordance with some embodiments of the present invention, a camera or server may determine a question to ask a user based on one or more images that have been captured. That is, an image may be captured and then the camera may determine a question to ask a user based on this image.

As discussed herein, determining a question based on an image may include processing the image using image recognition software. A wide variety of image recognition programs are known to those skilled in the art and need not be described in detail herein.

In one example of determining a question based on an image, a user captures an image using the camera. The camera may determine, based on an analysis of the image, that this image shows a person sitting under a tree. Based on this determination, the camera may ask the user a question such as, "Who is the person sitting under the tree in this picture?" The user's response to this question (e.g., "Alice") may be used, for example, to meta-tag the image.

In another example, the camera may automatically capture a plurality of images of an exciting series of plays during a basketball game. Based on these images, the camera may ask the user, "Are you interested in pictures of any of the following players (check all that apply)?" The camera may then save or delete some or all of the captured images based on the user's response to this question.

In another example of determining a question based on an image, a user may capture an image of a child with a present. Based on this image, the camera may ask the user, "Are you taking pictures of a birthday party?" If the user indicates that he is indeed taking pictures of a birthday party, the camera may adjust the shutter speed to be at least $1/125$ sec, so as to capture the children who are moving quickly.

The camera may determine a question based on one or more properties of an image, including, without limitation: exposure (e.g., including brightness, contrast, hue, saturation), framing (e.g., organization of subjects within the image, background), focus (e.g., sharpness, depth of field), digitization (e.g., resolution, quantization, compression), meta-information associated with an image (e.g., camera settings, identities of people in an image, a rating provided by a user), subject(s) (e.g., people, animals, inanimate objects), scenery (e.g., background), and motion relating to an image (e.g., movement of a subject, movement of the camera).

The camera may determine a question based on exposure of an image. For example, the camera may determine that the background of an image is brighter than the foreground of the image. Based on this, the camera may ask a user, "Would you like to use a fill flash to brighten your subject?" In another example, the camera may determine that an image is too bright. Based on this, the camera may ask a user, "Are you trying to take a picture of a sunrise or sunset?"

The camera may determine a question based on framing of an image. For example, the camera may determine that an image includes two objects, one in the foreground and one in the background. Based on this, the camera may ask a user, "Which object do you want to focus on, the one in the foreground or the one in the background?" If the objects have been identified (e.g., by the camera using an image recognition program), the different objects may be named in the question.

In an example of how camera may determine a question based on focus of an image, the camera may determine that a portion of an image is blurred (e.g., as if by movement). Based on this, the camera may ask a user, "Are you taking pictures of a sporting event?" Based on the user's response, the camera may then adjust a setting on the camera (e.g., increase the shutter speed to at least $1/250$ sec) as described herein.

The camera may determine a question based on meta-information associated with an image (e.g., camera settings, identities of people in an image). In one example, the camera recognizes that an image has been meta-tagged as being taken at 7:06 p.m. Based on this information, the camera may ask a user, "Is the sun about to go down?" or "How long will it be until the sun goes down?" In another example, an image may include a meta-tag that indicates that it shows Alice and Bob in a canoe. Based on this tag, the camera may ask a user, "Are you taking pictures at a lake or river?" In another example, an image may include a meta-tag that indicates the preferred cropping or scale for the image. Based on this, the camera may ask a user, "When your subject is off-center, do you want the background to be in focus?" In still another example, meta-data associated with an image may include a rating of the quality of the image (e.g., a rating provided by the user or determined by the camera). The camera may determine a question based on this rating (e.g., "This image appears to be overexposed. Are you trying to create an artistic effect?").

As discussed herein, the use of image recognition software may allow for one or more subjects of a captured image to be determined. Examples of subjects include, without limitation: people, animals, buildings, vehicles, trees, the sky, a ceiling, a landscape, etc. Determining a question may comprise determining a type of scenery (e.g., natural landscape) in the image. Scenery may include one or more subjects, which may or may not be identified individually. Further, according to some embodiments, one or more questions may be determined based on whether the image matches a template.

In one example of determining a question based on a subject in an image, the camera may identify a candle in an image. Based on this determination, the camera may ask a user, "Are you taking pictures at a birthday party?" In another example, the camera may identify a large body of water in an image. Based on this, the camera may ask a user, "Are you on a boat?" Based on a determination that an image includes a building, for example, the camera may ask a user, "Are you outside?" If it is determined that an image includes a mountain, for example, the camera may ask a user, "What mountain is this?"

It will be readily understood that at least one subject of an image may be a person. In some embodiments, determining a question may include one or more of the following steps: determining that an image includes at least one person, identifying at least one person in an image, and determining one or more characteristics of at least one person in image. One or more of the above steps may be performed by a server and/or camera.

In one example of determining a question based on a subject in an image, the camera may identify a person in an image (e.g. based on information received from a server). Based on this identification, the camera may ask a user, "Is this a picture of Alice?" The camera may determine a question based on a person in an image. In another example, the camera may ask a user, "Do you already have any pictures of this person?" A camera may ask a user, "What color skin does Bob have?" The user's answer to this question may be useful in determining how to set exposure settings on the camera when taking a picture of Bob. The subject of an image may be identified as a football player and thus may indicate that a user is capturing images of a football game. Accordingly, the camera may ask the user, "Are you taking pictures of a football game?"

The camera may determine a question based on motion relating to an image (e.g., based on blurring of an image or comparison of a plurality of images). For example, the camera may determine a question based on motion of a subject in an image. For instance, if a subject in an image is moving quickly, the camera may ask a user, "Are you taking sports pictures?" In another example, the camera may determine that the ground plane in an image is moving slightly (e.g., shimmering like water). Based on this, the camera may ask a user, "Are you taking pictures of water (e.g., the ocean, a fountain, a creek)?" An imaging device may determine that it is moving (e.g., using a GPS sensor). Based on this determination, a digital camera may ask a user, "Are you in a vehicle (e.g., a car, a boat, an airplane)?"

Various embodiments of the present invention allow for a question to be determined based on a plurality of images. For example, the camera may capture two images in close succession (e.g., 1/10 of a second apart). The camera may compare these images and may determine that a subject (e.g., a person, an animal) is moving. Based on this determination, the camera may ask a user, "Are you taking pictures of a sporting event?" In some embodiments related to multiple images, a camera may determine a question based on at least one difference among a plurality of images. For example, the camera may capture a plurality of images in bright light conditions (e.g., outdoors on a sunny day). Then the camera may capture an image in low light conditions (e.g., so little light that a flash in necessary). Based on this, the camera may ask a user a question, "Did you just go inside a building?"

The camera may also be configured so as to determine a question based on at least one similarity among a plurality of images. For example, the camera may determine that two images have the same person wearing a red shirt in them. Based on this, the camera may ask a user, "Who is the person in the red shirt?" In another example, the camera may determine that a first image is of a tiger and a second image is of a polar bear. Since a tiger and a polar bear are both animals, the camera may ask a user, "Are you at the zoo?"

A question may refer to an image (and thereby be based on the image). Examples include, without limitation:
 (i) "Is this picture bright enough?"
 (ii) "Who is the person wearing the yellow jacket in this image?"
 (iii) "Do you mind if I delete this image? You have two others just like it."
 (iv) "Where was this picture taken?<show the picture>?"
 (v) "Please highlight Alice's face in this image."

According to at least one embodiment of the present invention, one way of determining a question based on an image is to determine if an image matches a template. For example, a camera and/or server may store a plurality of templates. Each template may correspond to a different type of image, category of image, or one or more properties of an image. After an image is captured, this image may be compared to one or more of the templates to see if there is a match. If the image matches a template, then an appropriate question may be determined (e.g., to verify that the image does in fact match the template and/or to verify information useful in determining a setting on the camera).

Some examples of templates include, without limitation:
 (i) An "indoors" template. If an image matches with the indoors template, then the camera may determine that there is a significant probability that the user is capturing images inside a building. The camera may then determine an appropriate question to ask the user (e.g., "Are you indoors?").
 (ii) A "sandy beach" template. If an image matches with the "sandy beach" template, then the image may have been captured on a sandy beach (e.g., in bright sunlight, where water may be nearby). The camera may then determine an appropriate question to ask the user (e.g., "Are you at the beach?").
 (iii) A "football player" template. If an image matches the "football player" template, then the image may include a football player. The camera may then determine to ask the user, "Are you taking pictures of a football game?"

Note that in a preferred embodiment a football player template may match with any picture of a football player, whether the player is facing the camera, facing away from the camera, or lying on the ground. Alternatively, there may multiple "football player" templates, with some corresponding to a football player in a different position, with different lighting, etc.

(iv) A "candle" template. If an image matches the "candle" template, then the image may include a candle or other point light source (e.g., light bulb, flashlight). Based on this, the camera may determine a question to ask a user (e.g., "Are you taking pictures at a birthday party?").

(v) A "Bob Jones" template. In an image matches the "Bob Jones" template, then the image may include a picture of Bob Jones (e.g., who may be a friend of the user of the camera). Based on this, the camera may determine a question to ask a user (e.g., "What is Bob doing in this picture?").

(vi) A "fluorescent light bulb" template. If an image matches with this template, then the scene in the image may have been illuminated with a fluorescent light bulb. The camera may ask a user an appropriate question based on the image and the determined template.

In accordance with various embodiments of the present invention, a camera and/or a server may perform one or more of the following steps in matching an image to a template:

(i) determining an image
(ii) storing one or more templates (e.g., in a template database)
(iii) determining that the image matches at least one template
(iv) determining a correspondence between the image and at least one template
(v) determining a question based on the image and the at least one template
(vi) determining a correlation between the image and at least one template
(vii) determining a degree to which the image matches at least one template Note that the matching of an image to a template may be a condition. That is, if an image matches a template, then a condition may be true and a question may be determined based on this condition, as described herein.

It will be understood that an image may match with multiple templates. For example, a picture of Bob Jones on a beach may match with both the "Bob Jones" template and the "sandy beach" template. In this circumstance, a question may be determined based on one or both of the templates.

Also, it may be possible for an image to partially match a template. For example, matching an image to a template may include determining how much the image matches the template. Some examples of partial matches include, without limitation:

(i) An image of a light bulb may only be a 65% match for the "candle template."
(ii) An image may match a first template to a first degree and a second template to a second degree. For example, an image of Steve Jones (who looks similar to his bother Tom Jones) may be a 95% match with the "Steve Jones" template and a 80% match with the "Tom Jones" template.
(iii) An image that was taken indoors may be a 5% match for the "sandy beach" template.
(iv) An image may only be considered a match for a template if the amount that the image matches the template is greater than a threshold value (e.g., 95% certainty).

According to some embodiments, the camera may determine and/or create a template based on a user's response to a question. For example, the camera may create an "Alice Jones" template based on an indication by a user that an image is of Alice Jones.

After a question is determined, a camera may output the question to a user. Various different ways that a question may be output to a user of a camera are discussed herein.

A question may be output to a user of a camera in a variety of different ways. For example, a question may be output using one or more of a variety of different output devices. Examples of output devices that may output questions to a user include, without limitation:

(i) An LCD screen. For example, the camera may include a color LCD screen on its back. This LCD screen may display questions to a user (e.g., as text).
(ii) An audio speaker. For example, the camera may use an audio speaker to output a audio clip of a question to a user.
(iii) An LED screen. For example, the camera may include a LED screen that displays questions to users as scrolling text.
(iv) A heads-up viewfinder display. For example, a question may be displayed on the viewfinder of the camera so that a user can view the question while composing a shot (i.e., which the user is preparing to capture an image).
(v) A printer. For example, the camera may include thermal printer that may print out a list of questions for a user to answer.

Other examples of output devices that may be used to output a question are discussed herein.

A question may be represented in or more of a variety of different media formats, including text, audio, images, video, and any combination thereof. Examples of questions being output as text include a question displayed as text on an LCD screen on the back of the camera and a question displayed as text overlaid on the camera's viewfinder. In another example, a text question may repeatedly scroll across a header bar on the camera's LCD screen. It will be understood that various visual cues may be used to draw a user's attention to a message that is output in text, including different fonts, font sizes, colors, text boxes, and backgrounds.

Examples of questions being output as audio include an audio recording of a question. In another example, speech synthesis software may be used to generate an audio representation of a question. In another example, a "BEEP" sound may be output when a question is displayed on a video screen. Examples of outputting questions using images and video include, without limitation, displaying a sequence of images (e.g., a movie) to a camera user using a video screen. In another example, a video of an animated cartoon character may indicate a question to user.

Note that a message may be presented in a plurality of ways. For example, a question may include both a text component and an audio component (e.g., the camera may beep and then display a question on an LCD screen). In a second example, the camera may display an image on its color LCD screen and then play an audio recording of a question.

Note that a question may be phrased in the first person. For example, a question may use the word "I" to refer to itself or the word "we" to refer to the camera and the user. Examples include, without limitation:

(i) "Are we at the beach?"
(ii) "It seems to me that we're indoors right now. Is this correct?"
(iii) "Am I underwater?

(iv) "How many more pictures should I plan on taking today?"

(v) "Should I use the red-eye reduction flash?"

A question may be output in different languages (e.g., depending on who is using the camera). For example, if the current user of the camera speaks English, then a question may be output to the user in English. However, if the current user of the camera speaks Chinese, then the question may be output the to the user in Chinese.

According to some embodiments of the present invention, a question may be output by a presenter (e.g., a character that presents the question to a user). Examples of presenters include, without limitation (i) A speaker. For example, the camera may store two recordings of a question—one with a female speaker and one with a male speaker.

(ii) An animated character in a video message. For example, an avatar, virtual assistant, or other on-screen character may be displayed to a user in conjunction with a question. For example, an animated rabbit may be displayed on the camera's LCD screen and "talk" to a user, thereby outputting one or more questions to the user. Indications from the rabbit may be provided as text (e.g., displayed using a speech bubble as a partition) and/or audio (e.g., an audio recording may be played, allowing the rabbit to "speak" to the camera user.)

(iii) An actor. For example, a video of an actor presenting a question may be displayed to a user on the camera's LCD screen. The camera may store a database of video clips representing different questions.

(iv) A celebrity. For example, an audio or video recording of a celebrity (e.g., William Shatner) reciting a question may be output to a user.

It is anticipated that some types of camera users may pay more attention to representations of message that include certain presenters. For example, a user may pay extra attention to a message that is presented by his favorite celebrity.

In order to accommodate a variety of different formats and languages for the same question, the camera may store one or more representations of a question in memory. For example, for a given question (e.g., "Are you at a ski resort?"), the camera may store the following representations: a text version of the question in English, an audio version of the question in English, a text version of the question in Spanish, and an audio version of the question in Spanish.

As discussed variously herein, a question may be output to a user at a variety of different times. For example, the camera may delay outputting a question until an appropriate time. In another example, the camera may output a questions based on a condition.

In addition to outputting a question, the camera may output other information that may be helpful to the user. Examples of additional information may include, without limitation: at least one image that relates to the question, potential answers to the question (e.g., for a multiple choice question), a reason for asking the question, current settings on the camera, a default answer to the question, and a category for the question.

As discussed herein, the camera may output a question to a user that relates to at least one image. To assist the user in answering the question, the camera may display at least one image to the user. For example, the camera may display a picture of a person on the beach to a user and ask the user, "Is this a picture of Alice or Bob?" In another example, the camera may display a set of four pictures to a user and ask the user, "All of these pictures are of Alice, right?"

In another example, the camera may display a plurality pictures to a user and ask the user, "Pick your favorite picture from this group." A camera may display an image to a user and ask the user, "Is this picture underexposed?" or may highlight a portion of an image ask a user, "Is this the subject of the image?" In yet another example, the camera may automatically crop an image and ask a user, "I'm going to automatically crop this image. Is this a good way to crop the image?"

Indicating potential answers to a question may be helpful in describing to a user how he should answer a question, indicating acceptable answers to a question, and/or reducing the time or effort required for a user to answer a question. Examples of potential answers to questions include, without limitation:

(i) "Yes"/"No"/"I'm not sure"

(ii) "Alice"/"Bob"/"both Alice and Bob"/"neither Alice nor Bob"

(iii) "tungsten"/"fluorescent"/"I'm not indoors"/"I don't know"

(iv) "overexposed"/"underexposed"/"just right"

Indicating at least one reason for asking a question may be helpful in explaining the purpose of a question to a user, or in explaining to a user why it would be beneficial for him to answer a question. Some examples of the camera indicating one or more reasons for asking a question include:

(i) "I thought I saw a football player in that last photo you took. Are you taking pictures of a sporting event?"

(ii) "Based on the last picture you took, it looks to me like you're on a beach. Are you taking picture on a beach?"

(iii) "It looks like you're taking a lot of pictures outdoors with white backgrounds. Are you at a ski resort?"

(iv) "The camera seems to be rocking back and forth. Are you on a boat?"

(v) "It looks like there was a reflection in the last picture you took. Are you trying to take pictures through a glass window?"

(vi) "How many more pictures are you planning on taking? If you continue storing your pictures at high resolution, you only have space for 12 more pictures."

Indicating at least one setting on the camera may help the user to understand the context of a question, or to make a decision on how to respond to a question. In one example, the camera indicates: "The flash is currently off. Are we indoors?" In another example, the camera displays: "Pictures are currently being captured at 1600×1200 resolution, meaning that I have enough memory left to hold 15 more pictures at this resolution. How many more pictures are you planning on taking?" Providing such additional information may be beneficial to some types of users.

Some embodiments of the present invention provide for a default or predetermined answer to a question output to a user. In some cases, the default answer may be indicated to the user. Some examples of output including default answers to questions include:

(i) "We're indoors, right? If you don't answer in 5 seconds, I'll assume that we're indoors . . . "

(ii) "Let me know if any of this information is incorrect: You're taking pictures at a birthday party. There are 8 children at the birthday party. So far you've taken pictures of 3 children: Alice, Bob, and Carly."

(iii) "The girl wearing the blue sweater is Alice, right? Press the "no" button if this is incorrect."

Questions may be categorized, allowing the camera to output an indication of at least one category corresponding to a question. Categorizing a question may be helpful to some users, for example, if there are a plurality of questions that may be output to a user and the user would like to sort these questions. Questions may be categorized based on a variety of different factors, including, without limitation:
- (i) topic (e.g., "Lighting Questions," "Focus Questions," "Meta-Tagging Questions," "Situational Questions," "Questions about Future Plans," "Questions About Past Images")
- (ii) image (e.g., "Questions About Image #1," "Questions About The Last 8 Images Captured," "Questions about Images Captured Yesterday")
- (iii) priority (e.g., "High-Priority Questions," "Questions to Answer in the Next 5 Minutes," "Questions to Answer During Your Free Time," "Questions to Answer Before Capturing More Images")
- (iv) type of response (e.g., "Yes/No Questions," "Free Answer Questions," "Multiple Choice Questions")
- (v) potential actions based on a user's response (e.g., "Meta-Tagging Questions," "Settings Questions," "Image Storage Questions")

As discussed herein, the camera may determine a question to output to a user (e.g., based on a determination condition). Alternatively, or in addition, the camera may determine when and/or how to output a question to a user based on one or more conditions. For example, a question may be output as an audio recording while a user is looking through the viewfinder of the camera. In another example, the camera may delay outputting a question to a user until there is a pause in the user's activities.

The camera thus may output a question based on a condition. This condition may also be referred to as an output condition to differentiate it from other types of conditions (e.g., determination conditions) described elsewhere in this disclosure.

According to some examples, without limitation, a question may be output: when a condition occurs, when a condition is true, when a condition becomes true, in response to a condition, in response to a condition occurring, in response to a condition being true, because of a condition, because a condition occurred, because a condition is true, according to a condition, at substantially the same time that a condition occurs, and/or at substantially the same time that a condition becomes true.

Note that conditions may be useful in enabling a variety of different functions. For example, as discussed herein, a condition may be used in determining what question(s) to output and/or for determining an order in which to output a plurality of questions.

In another example, a condition may be useful for determining when to output a question (e.g., determining an appropriate time to output a question). According to some embodiments, output of a question may be delayed until a condition occurs. For example, it may be annoying to output a question to a user when the user is busy taking photographs at a birthday party or busy talking with a friend. Therefore, outputting a question to the user may be delayed until an appropriate time.

In some embodiments, as described herein, a condition may be used in determining how to output a question. For example, a condition may be used to determine whether a question should be output in text on the camera's LCD display or as audio through the camera's audio speaker. In a second example, the camera may select which personality should be used in outputting a question to a user.

In light of the present disclosure, one skilled in the art will understand that conditions for outputting a question may be similar to conditions for determining a question. For example, it should be clear to the reader that an output condition may be a Boolean expression and/or may be based on one or more factors Many types of factors are discussed herein as being potentially useful in making one or more of various types of determinations. For example, any of the factors described herein as potentially useful in determining a question to ask a user (e.g., images, indications by a user, movement of the camera, time-related factors, state of the camera, information from sensors, characteristics of a user, information from a database) may also be used for determining when and/or how to output a question to a user. Still other factors will be readily apparent to those skilled in the art in light of the present disclosure.

Some moments may be particularly appropriate for outputting a question to a user. Some general examples of appropriate times to output a question include, without limitation: when a user is composing a shot (e.g., is about to capture an image), when a user is inactive, when a user indicates that he is interested in receiving at least one question, when a user is viewing an image, when a user is answering one or more questions, when the camera's resources are running low, and when a user starts to capture images of a scene. Some of these general examples are discussed in further detail herein.

According to some embodiments, a question may be output when it is determined (e.g., by the camera) that a user is composing a shot. Some exemplary scenarios include, without limitation:
- (i) Operation of a control. For example, if the user presses the shutter button halfway down, then this may indicate that he is composing a shot. This may be an appropriate time to ask him a question about the shot. In a second example, the camera may output a question to a user when the user switches the camera from manual exposure mode to auto-exposure mode.
- (ii) Use of the optical viewfinder on the camera. For example, the camera may include a sensor that determines when the user is looking through the optical viewfinder on the camera.
- (iii) Use of the digital viewfinder on the camera. For example, if a user turns on the digital viewfinder on his camera, this may be a sign that he is about to start capturing images.
- (iv) When the camera is being held steadily (e.g., in a horizontal position). If a user is holding the camera steady in a horizontal position, for example, it may be likely that he is about to capture an image.
- (v) Holding of the camera in two hands. For example, the camera may include one or more touch sensors (e.g., heat, continuity, electric field, pressure) that may determine when a user places both of his hands on the camera. This may be considered an indication that the user is composing a shot.

Some factors may be related to an indication by a user. For example, the camera may include a button or menu option labeled "Ask Me a Question." Whenever a user has free time, he may press this button to answer any questions that the camera has. An indication that the user has pressed the button may trigger the camera to provide one or more questions. In another example, whenever the camera has a question to ask a user, it may output an indication of this (e.g., by beeping once or illuminating an LED). The user may then respond to this indication at his leisure (e.g., once he finishes capturing a sequence of action photos) by providing an indication (e.g., pressing a button on the camera) when he is ready to answer the question.

In some embodiments, a user may provide an indication of what question he would like to answer. For example, a user may select a question or question topic from a list of questions or question topics. In a second example, a user may use the camera to view images that he has already captured. Some images may have questions associated with them, and to indicate this, these images may be highlighted by the camera, for example, with green borders. To indicate what question he would like to answer, the user may select (e.g., using a touch screen, using a dial) one or more of the highlighted images.

A user may provide an indication of how a question should be output. For example, the camera may normally output questions in an audio format. A user who is operating the camera in an opera house, however, may prefer to avoid disturbing other audience members. Therefore, the user may operate a control on the camera to indicate that he would prefer that the camera output the question in text form (e.g., via the camera's LCD display).

Some factors relating to inactivity by a user may be used in determining how and/or when to output a question. Such factors may include, without limitation:

(i) Duration since activity by a user. For example, the camera may include a timer that monitors the period of time that has elapsed since a user performed an activity (e.g., operated a control on the camera). If a threshold amount of time has elapsed (e.g., sixty seconds), then the camera may determine that a question should be output to the user.

(ii) Measurements relating to images captured by a user. For example, the camera may monitor a duration since an image has been captured (e.g., sixty-five seconds) or an average rate of capturing images (e.g., one picture every thirty-two seconds).

(iii) Lack of sound. For example, the camera may include a microphone that monitors the level of audible background noise around the camera. If the level of background noise falls below a threshold level, the camera may determine that this is an appropriate time to output a question to a user.

(iv) Movement of the user and/or the camera. For example, the camera may include one or more motion sensors that may be helpful in determining whether the user is currently composing a shot, moving to a new location, or otherwise engaged in an activity. If the camera determines that the user is not moving the camera, a question may be output the user.

(v) Power down. For example, if the camera determines (or a user indicates) that the camera should enter power-save mode, then the camera may determine that this is an appropriate time to output a question to a user. In a second example, the camera may output an indication that one or more questions are ready any time the user turns the camera on or off.

Examples of factors relating to the camera outputting an image include, without limitation:

(i) Viewing an image using the camera. For example, the camera may include a color LCD display that allows a user to view images that are stored in the camera's memory (e.g., images that he has already captured using the camera). If the user uses the LCD display to view one or more images, this may indicate that the user is no longer busy with other activities and it may be an appropriate time to output a question to the user. For example, the camera may output any questions relating to an image when the user views that image on the camera.

(ii) Printing an image. For example, the camera may include a printer or be connected to a printer. When a user operates the camera to print one or more images, the camera may output one or more questions to the user (e.g., questions relating to the one or more images).

(iii) Transferring an image to another device. For example, the camera may transfer images to one or more various other devices (e.g., a desktop computer using a USB cable, an iPod™ portable wallet, a television set for viewing, a color inkjet printer for printing, a removable flash memory card for storage). One or more questions may be output to a user before, during, and/or after the transfer of an image to another device.

In some embodiments, it may be determined that it is appropriate to ask a question when the user is answering one or more other questions. For example, a plurality of questions may be output to a user simultaneously or in close succession. For example, it may be most convenient for a user to answer all or most of the camera's questions at one time, rather than individually as the camera determines questions to ask the user.

In another example, a second question may be output to a user based on a user's response to a first question. For instance, the camera may ask a user, "Where are you in this picture?" If the user responds, "on a beach," then the camera may ask the user a second, related question: "Are these two pictures taken on the same beach?"

A determination that the camera's resources are running low may be used in determining when or how to provide a question. For example, if a camera's batteries are running low, the camera may output the question, "The batteries are running low. Do you have any more batteries?" In another example, if a memory resource (e.g., a flash memory card) approaches or is below a predetermined threshold of available memory (e.g., ten Mb) the camera may output the question, "You have only 10 Mb of memory left. How many more images are you planning on capturing?"

It may be desirable to output one or more questions when a user is starting to capture images of a scene. Some exemplary related factors and scenarios include, without limitation:

(i) A user turns the camera on. For example, each time a user turns the camera on, this may be a sign that the user is about to capture images of a new scene. Based on this, the camera may ask the user a question (e.g., "Are you indoors or outdoors?").

(ii) A user captures an image. For example, the camera may output a question to a user immediately after the user captures an image of the scene (e.g., in the anticipation that the user will capture additional images of the scene).

(iii) A user presses the shutter button. For example, the camera may output a question to a user when the user presses the shutter button on the camera halfway (e.g., to focus the camera's lens on a subject). This may indicate that the user is about to capture an image of the subject.

(iv) A user moves to a new location. For example, the camera may include a GPS sensor or other location sensor that allows it to determine when a user moves the camera to a new location. Since this may be a sign that the user is now capturing images of a new scene, a question may be output to the user (e.g., "Are you still taking pictures of Alice?").

(v) A user operates a control. For example, the camera may output a question to a user when the user adjusts a setting on the camera, since this may be an indication that some aspect of the camera's settings need to be adjusted (e.g., because the user is capturing images of a different subject).

The camera may store an output condition database such as the one shown in FIG. 11. Note that the output condition database shown in FIG. 11 specifies how one or more questions should be output to a user. For example, if the camera is currently in manual mode, the camera will output a question to a user by beeping and displaying the question as text along the bottom of the camera's viewfinder. Note that this exemplary version of the output condition database may be used by the camera to output a question based on a current mode of the camera and possibly one or more other factors. For example, according to the output condition database shown in FIG. 11, the camera is currently in "Manual" mode, so questions may be output to a user when the user looks through the camera's viewfinder. An alternate version of the output condition database might be used to output a question based on other factors.

There may be times when a user would prefer not to have a question output to him (e.g., when he is busy with another activity, or when outputting a question would be disturbing to the user or other people). In circumstances like these, output of a question may be suppressed (e.g., by the camera) based on one or more conditions. Suppressing a question may include, without limitation: preventing a question from being output, not outputting a question, canceling output of a question, and delaying output of the question.

It will be readily understood that a question may be determined, as discussed variously understood, but that its output is suppressed, delayed, or cancelled. Also, suppression of a question does not necessarily mean that no questions are output at all. Suppression may include suppressing one or more questions (or types of questions) while one or more other questions are output. For example, two questions may be identified at about the same time for output to a user, with one being output immediately and output of the second question being delayed until a more appropriate time.

Conditions for suppressing questions may be similar to those described above for outputting questions. For example, a question may be suppressed based on an indication from a user or because a time limit expires.

In some embodiments, a question may be suppressed because it comes at an inappropriate time. For example, it may be determined that a user may currently be busy with another activity. In another example, if a user is busy adjusting the camera's settings, then the camera may delay outputting a question until the user finishes adjusting the camera's settings and captures the image that he was busing composing.

According to some embodiments, one or more questions may be suppressed because of inappropriate content. For example, a determined question may be a duplicate of a recently-asked question. Since the user has already answered the question, it may be bothersome to ask the user the same question again. In another example, the answer to (or purpose of) a question may no longer be relevant. For instance, while a user is indoors, the camera may determine a question to ask the user: "What type of light bulb does this room have, tungsten or fluorescent?" However, the camera may have delayed outputting this question, because the user is in the middle of a conversation with a friend, for example. If the user then moves outside before the question is output, that question is no longer relevant.

A user may indicate that one or more messages (or types of messages) should be suppressed. For example, a user who is capturing images at a golf tournament may indicate that no audio message should be output (e.g., so that the user does not disturb the golfers).

Suppressing a question may include removing the question from an output queue or other list of questions to be output to a user.

The output condition database shown in FIG. 11 shows an example of delaying output of a question if the camera is in "Sports" mode In this exemplary mode, the camera may delay outputting a question to a user until the camera is held still for a period of time. Another example of FIG. 11 relates to canceling output of a question. For example, the camera may refrain from outputting any questions when it is in "Do Not Disturb" mode.

According to some embodiments of the present invention, a camera may output an indication of a question before outputting the question itself. For instance, rather than outputting a determined question immediately, the camera may output an indication that the question is ready to be output. In some embodiments, the camera will then wait for a user to indicate that he is ready for the question itself to be output. For example, the camera may beep when it determines a question and then wait for the user to respond to this beep before outputting the question. In a second example, an LED on the camera may flash whenever the camera has a question ready to output to a user.

According to some embodiments, outputting a question to a user may include one or more of the following steps: outputting an indication that a question is ready, receiving a response to the indication from the user, and outputting the question based on the response. Examples of each of these steps are provided below.

Some examples of outputting an indication that a question is ready include, without limitation: outputting an indication that a question has been determined, outputting an indication that a question has been queued for output, outputting an indication that a question has been retrieved from memory, outputting an indication that a question is ready to be output, outputting a request for the user's attention, and outputting a request for the user's attention regarding a question. Some of these examples are discussed in more detail herein.

It will be readily understood that there are many ways of indicating to a user that a question is ready, such as by use of the various output devices discussed herein. For example, outputting an indication may comprise illuminating an LED on a camera. A user may understand that whenever this LED is illuminated, the camera has a question queued to ask the user. In another example, an audible "BEEP" or bell sound may be output that a user may hear. A user may understand that whenever this beep sounds, the camera has a question queued to ask the user. A message may be displayed on an LCD screen. For example, an LCD screen on the back of the camera may display a text, "I've got a question. Press the 'Ask Me a Question' button to have this question output to you."

In still another example, a portion of an image may be highlighted (e.g., in the camera's viewfinder). For instance, if the camera has a question about a particular subject in an image, the camera may highlight that subject in red when the image is displayed on the camera's LCD viewfinder. Different types of visual indicators may be used to alert a user that at least one question is pending. In one example, when a user views an image using the camera, the camera may place a green border around the image to indicate that there is a question associated with the image. In another example, a red question mark may be overlaid on the corner of a displayed image to indicate that the camera has a question related to the image.

It will be readily understood that various methods described herein for outputting a question may also be used to output an indication that a question is ready. For example, an indication that a question is ready may include a presenter (e.g., an animated character, a celebrity voice).

The camera may output an indication that a question is ready based on one or more conditions. Note that the various output conditions described herein for outputting a question may also be used to control the output of an indication that a question is ready.

According to some embodiments, a user may respond at his leisure to an indication that a question is ready. For example, at 2:12 p.m. the camera may beep to indicate that it has a question to ask a user. The user may be busy with some other activity at this time (e.g., capturing an important sequence of images of a sporting event) and so ignores this beep until 2:17 p.m., when he is free to pay attention to the question that the camera outputs. To indicate that he would like to answer a question, the user may operate a control on the camera (e.g., press a button).

Receiving a response to an indication that a question is ready may include, without limitation: receiving an indication from a user, receiving an indication that a user would like to view a question, and receiving an indication that a user is inactive. A user may provide a response by operating a control or other input device on the camera. Various types of input devices are discussed herein, and others may be readily apparent to one skilled in the art in light of the present disclosure.

A user's response may include an indication of which question should be output. For example, a user may indicate that he is ready to answer questions about lighting, scenes, and future plans, but not about meta-tagging. In a second example, a user may select a question to answer from a list of questions that have been determined.

A user's response may include an indication of how to output a question. For example, a user may prefer to have a question output to him with both audio (e.g., through a speaker on the camera) and text (e.g., through a LCD display on the camera).

Some types of users may prefer to have the camera output an indication that a question is ready before outputting the question. Other users may prefer to have the camera determine the best time(s) to output a question. For example, allowing the user to control when and how a question is output may be preferred by users because of the control and simplicity such a system offers. For instance, a user may wish to have control over the outputting of questions that he finds annoying.

The output condition database in FIG. 11 shows a number of examples of how the camera may output an indication that a question is ready before outputting the question itself. According to one example, when the camera is in "Output Upon Request" mode, the camera will beep when a question is ready to be output and then wait until a user presses the camera's "Ask Me a Question" button before outputting a question. In another example, when the camera is in "Silent" mode, the camera will cause an LED to blink to indicate that a question is ready.

According to various embodiments of the present invention, a user may indicate a response to a question that is output to him. For example, the camera may output a question to a user, "Are we on a beach?" and the user may reply "No."

A user may operate one or more controls or other input devices of the camera to indicate a response to a question. Various types of input devices and controls that the camera may include are described herein, and other types may be readily apparent to those skilled in the art in light of the present disclosure. For example, a user may use one or more buttons on the camera to select a response from a plurality of response (e.g., an answer to a multiple-choice question). For instance, a user may select a response from the list of choices: "sunny," "partly cloudy," "light rain," "heavy rain," "light snow," "heavy snow." In another example, a user may press a button on the camera to indicate "Yes" in response to a question of whether he is capturing images of a sporting event. In another example, the camera may include a microphone that allows a user to respond to a question verbally (e.g., a user may indicate the weather outside is sunny by saying the word "Sunny"). In some embodiments, a user may use a stylus or other device to spell out a response on a touch screen on the camera. For example, a user may use the Graffiti™ alphabet to spell out a textual response to a question.

Some embodiments of the present invention allow for a user to speak a response to a question. Such a response may be recorded using a microphone on the camera. The camera may then process the response using voice recognition software. For example, a user may indicate that he is at a "birthday party" and the weather is "raining."

In another example, a user may use any of a plurality of input devices (e.g., buttons) on the camera to highlight a portion of an image displayed (e.g., on the camera's color LCD display). For example, the camera may ask a user to indicate where a subject's face is in an image. Based on the user's response, the camera and/or a server may determine that this area of the image is properly exposed.

It will be readily understood that a user's response to a question may take a variety of different forms (e.g., depending on the type of question). Some examples of forms of answers include, without limitation:

(i) Yes/No (e.g., an answer to the question "Is this a picture of Alice?").
(ii) Open-ended. For example, a user may respond to the question by speaking freely (e.g., by speaking "Alice" in response to a question about who is in a displayed image).
(iii) A selection from a plurality of choices. For example, a user may respond to the question, "Who is in this picture?" by selecting one of the offered choices: "a) Alice b) Bob c) both d) neither."
(iv) Graphical response. For example, a user may highlight a portion of an image or point to an object in an image displayed on a LCD display on a camera.

The camera may also receive or otherwise determine a default response from a user. For example, if a user does not respond to a question in a certain period of time, the camera may assume that the user answered the question in a certain way (e.g., in accordance with a default answer, as discussed herein). For example, the camera may ask a user the question "You're at a ski resort, aren't you?" If the user does not respond to this question within ten seconds, then the camera may assume that the user answered "Yes" to this question.

According to some embodiments, a camera and/or server may verify a response from a user. Verifying a response may include outputting an indication of the response that the user provided, or asking the same question or a similar question. The camera may verify a response to ensure that it did not misunderstand the user's response. For example, a user may respond "Yeah" or "Nah" to a Yes/No question, making it difficult for the camera to use voice recognition software to determine the user's response. In order to verify the user's response, the camera may output an indication of the user's response by displaying the camera's best guess as to the response (e.g., "Yes") on the camera's LCD display. In some embodiments, the camera may verify a response to ensure that a user did not make a mistake in responding to a question. For example, the camera may output a second question to verify that a user did not accidentally press the wrong button on the camera when indicating his response (e.g., "Are you sure that this room has fluorescent light bulbs?").

The camera may verify a response to confirm that the user understands the ramifications of his response. For example, a user may indicate that he only plans to capture five more images on the camera's current memory card. Based on this, the camera may output a warning or reminder: "Are you sure that you only want to capture 5 more images? If you capture 5 more images at high resolution, then the camera will be out of memory and will not be able to store any more images." According to some embodiments, the camera may verify a response by displaying an image to a user. For example, a user may respond to a question by indicating that he is at a beach. Based on this, the camera may display an image to a user along with the message, "This is what the picture would look like in Beach Mode. Is this correct?" The user may then respond to the verification by indicating whether the displayed image is correct.

In some cases a user may not respond to a question. For example, a user may ignore a question that is output by the camera. For instance, the camera may output a question when a user is busy with another activity (e.g., capturing an important sequence of action shots at a sporting event). Instead of responding to the question, the user may ignore the question. In another example, a user may not know that the camera output a question. For instance, a user may not be looking at the camera's LCD screen when a question is displayed on the LCD screen. Since the user does not know that the camera has output a question, he will not know to respond to the question.

Determining that a user has not responded to a question may include determining that a period of time has elapsed since the question was output. For example, if a user does not respond within twenty seconds of when a question is output, then the camera may determine that the user has not responded. The camera may then perform an action (e.g., output the question again). In some embodiments, determining that a user has not responded to a question may comprise determining that a condition has occurred (e.g., a user presses a button on the camera, the camera is held motionless for a period of time, a user provides a response to a different question). For example, the camera may stop displaying a question when a user captures an image.

If a user does not respond to a question output by the camera, then the camera take one or more of the following actions:
  (i) Continue outputting the question. For example, the camera may display a question on an LCD screen until the user responds to the question.
  (ii) Stop outputting the question. For example, the camera may display a question on an LCD screen until either (a) a user responds to the question, or (b) thirty seconds have elapsed.
  (iii) Output the question again. For example, the camera may output an audio recording of a question. If a user does not respond, then the camera may output the question again (perhaps in a different form).
  (iv) Assume a default response to the question. For example, the camera may output a question to a user, "You're taking a picture of a sunset, aren't you?" If the user does not respond, the camera may assume that the answer to the question is "Yes" (e.g., based on a determined default answer) and perform an appropriate action based on this default response.
  (v) Output a different question. For example, the camera may ask a user a first question, "Are you at the beach?" If the user does not respond to the question, then the camera may ask the user a second question (e.g., based on the same image), "Are you at a ski resort?"

It will be understood that some times a user may provide a response that does not answer a question. For example, a user may indicate that he does not want to answer a question. Accordingly, a user may press a "Cancel Question" button on the camera. In a second example, a user may use a control on the camera to put the camera in "Do Not Disturb" mode, thereby canceling the current question and any future questions. According to some embodiments, a user may indicate that he would prefer to answer a question at a later time. For example, the camera may have a "snooze button" that allows a user to indicate that the camera should stop outputting a question and then output the question again when a condition occurs (e.g., a period of time has elapsed, an output condition occurs).

In at least one embodiment, a user may indicate whether a question is inappropriate or unhelpful. For example, the camera may have a "thumbs down" button or a "stupid question" button that a user may press when the camera outputs a question that the user determines is not worth answering. This may be particularly useful if the camera tends to make mistakes when determining questions to output to users. For example, a user may capture a plurality of images indoors and then move outdoors to capture more images. Based on the plurality of images captured indoors, the camera may ask the user, "What kind of lighting does this room have?" Since the user is currently outdoors, this question is inappropriate, so the user may press the "thumbs down" button to indicate that the camera should discard the question about lighting as being irrelevant to the current situation. Similarly, the camera may have a "reset questions" button that allows a user to indicate that the camera should restart its line of questioning.

In accordance with one or more embodiments of the present invention, if a user does not respond to a question or a user provides a response that does not answer the question, then the camera may output the question again. The second output of the question may be similar to or different from the first output of the question. A question may be output a second time based on a different output condition. For example, a question may be output when a user presses the shutter button halfway down (an output condition). If a user does not respond to this output of the question, then the camera may output the question again in fifteen seconds (a second output condition).

In some embodiments, a question may be output a second time based on the same output condition. For example, a question may be output thirty seconds after a user operates the camera (an output condition). If the user does not respond to this first output of the question, then the camera may output the question a second time in response to a second occurrence of the output condition. That is, the camera may wait until the user operates the camera again, and then output the question thirty seconds after the user stops operating the camera.

Of course, a question may be output in the same manner as it was previously output. For example, a question may be output a first time as an audio prompt. If a user does not respond to the question, then the camera may repeat the audio prompt. In another embodiment, a question may be output in a manner that is different from the one that was previously used for the question. For example, a question may be output a first time as text displayed on the camera's LCD screen. If a user does not respond, then the camera may output the question as holographic text overlaid on the camera's optical viewfinder.

Some embodiments allow for a question to be output with or without additional information. For example, a question may be output a first time as "Are you taking a picture of a sunset?" If a user does not respond to this first output of the question, then the camera may output the question again, this time providing additional information: "Are you taking a picture of a sunset? If so, then let me know now—otherwise your picture will be underexposed."

The camera may store an indication of a user's response to a question. For example, the camera may store an indication of a response in a response database such as the one shown in FIGS. 12A and 12B.

Storing an indication of a user's response to a question may be helpful in a variety of different circumstances, including some exemplary scenarios described herein. Other uses of one or more stored indications of a user's response(s) will be readily apparent to those skilled in the art in light of the present disclosure.

A stored indication of a response may be useful in performing an action based on multiple responses. For example, the camera may ask a user a plurality of questions and receive a plurality of responses from the user. The camera may then perform an action (e.g., adjust a setting, meta-tag an image, guide a user in operating the camera) based on the plurality of responses. For example, a user may indicate in a first response that he is capturing a picture of at a ski resort, and this first response may be stored in a database (such as the response database). Later, in a second response, the user may indicate that the weather is cloudy. Based on these two responses, the camera may adjust the settings on the camera to appropriate values for capturing images at a ski resort during cloudy weather.

Indications of responses may be beneficial in determining future questions to ask a user. For example, the camera may ask a user a first question (e.g., "Are you indoors or outdoors?"). The user may then respond to this question (e.g., "Indoors") and the camera may store this response. Based on the stored response, the camera may ask the user a second question (e.g., "What kind of lightbulbs does this room have?").

Storing an indication of a user's response may assist a computing device (e.g., a camera, a server) in avoiding repeating questions or asking unnecessary questions. For example, the camera may avoid asking a user the same question twice in close succession by checking to see if the user has already answered the question recently. If the user has answered the question recently, then the camera may assume that the user's answer is unchanged. For example, the camera may ask user if he is on a beach and store the user's response (e.g., "Yes"). Ten minutes later, the camera may refrain from again asking the user if he is on a beach and instead assume that the answer from ten minutes before is still valid and that the user is still on the beach. In at least one embodiment, as discussed further herein, information provided by a user may expire after a certain period of time or based on some other condition. For example, a camera may store an indication of a user's response in an expiring information database, such as the one depicted in FIG. 14.

A camera and/or a server may perform various actions based on a response from a user, including one or more of: meta-tagging an image, adjusting a setting, guiding a user in operating a camera, outputting a second question, and determining a template.

A computer server may assist the camera in processing a user's response to a question. Examples include, without limitation:
(i) The camera may receive a user's response to a question and transmit an indication of this response to the computer server. The computer server may then process this response (e.g., using voice recognition software) to determine an appropriate action based on the response (e.g., adjusting a setting on the camera). An indication of the action may then be transmitted to the camera and performed by the camera.
(ii) The computer server may transmit instructions to the camera describing how to process a response by a user. For example, in addition to transmitting an indication of a question to the camera (as described above), the computer server may transmit one or more sets of instructions describing how to process a user's potential responses to the question. For example, the computer server may indicate that if the user responds "Yes" to a question, then the camera should put the flash in slow-syncro mode; if the user responds "No" to the question, then the camera should ask the user whether he is outdoors. Note that instructions may be transmitted to a camera in a variety of different forms, including a computer program (e.g., in C or Java), script (e.g., in Javascript or VSscript), or machine code (e.g., x86 assembly).

Meta-tagging may be used herein to refer generally to a process of associating supplementary information with an image (e.g., that is captured by a camera or by some other imaging device). The supplementary information associated with an image may be referred to as meta-data, meta-information, or a meta-tag. Some examples of meta-data include, without limitation:
(i) A time and date when an image was captured (e.g., Oct. 10, 2002)
(ii) A location where an image was captured (e.g., latitude and longitude coordinates obtained from a GPS sensor, an indication of a city, state, park, or other region provided by a user, an altitude determined using an altimeter). For example, a user may indicate that an image was captured in the SoHo area of New York City.
(iii) An orientation of the camera when an image was captured (e.g., determined using tilt sensor or an electronic compass)
(iv) One or more subjects of an image (e.g., people, objects, locations, animals, etc.). Note that a subject may be uniquely identified (e.g., "Alice Jones," "Grand Canyon") and/or categorized (e.g., "a squirrel," "national park").
(v) A scene in an image (e.g., a rainbow next to a waterfall, a group of friends at a restaurant, a baby and a dog, a family portrait, a reflection in a mirror)
(vi) Motion relating to an image (e.g., movement of a subject, movement of the camera)
(vii) The environment in which an image was captured (e.g., weather conditions, sunlight, altitude, temperature)
(viii) Lighting (e.g., daylight/a tungsten light bulb, a florescent light bulb, flash intensity, locations of light sources)
(ix) One or more settings on the camera (e.g., aperture, shutter speed, flash, mode). For example, meta-data associated with an image may indicate that the image was captured at f/2.8 with a CCD sensitivity of 100 ISO and a shutter speed of 1/250 sec.
(x) Information about how an image was captured. For example, an image may be meta-tagged as being part of an auto-bracketed group.
(xi) Information about a user (e.g., the user's name, preferences, priorities)
(xii) Preferred cropping or scale. For example, meta-data associated with an image may indicate what portion of the image should be printed and/or how large the image should be printed.

(xiii) A category for an image. For example, an image may be categorized based on its intended usage (e.g., part of a slide show), based on its subject (e.g., images of Alice), and/or based on how or when it was captured (e.g., captured during a ski trip on Dec. 7, 2002).

(xiv) A user's intentions (or other notes from a user). For example, a user may indicate, "I'm trying to get a picture of the baby with its eyes open" or, "I want to capture the reflection of the mountain in the water of the lake" or, "Getting the exposure right for the subject's face is most important; I don't care whether the background is in focus."

(xv) An audio clip. For example, the camera may record a ten second audio clip when capturing an image and stored this audio clip as meta-data associated with the image.

(xvi) Acceptable to delete. For example, in his response to question a user may indicate to the camera that it is acceptable to delete one or more images from the camera's memory in order to make room for images that may be captured in the future. Based on this response, the camera may meta-tag one or more images for "deletion," meaning that these images may be deleted if the camera begins to run out of memory.

(xvii) Protection. For example, the camera may meta-tag one or more images as being "protected," meaning that these images should not be deleted or altered in any way. The "protected" meta-tag may be helpful in ensuring that the user or the camera does not inadvertently delete one of the protected images.

(xviii) A rating. For example, the camera may determine a rating of an image and store this rating with the image. A rating may be an indication of the quality of the image and may be based one a variety of different factors, including: exposure, sharpness, composition, subject, and indications from a user. Ratings may be helpful in allowing the camera to sort images.

Note that meta-data that is associated with an image may be determined based on one or more responses indicated by a user. For example, a user may indicate in a first response that he is in Maui. In a second response, the user may indicate that he is at the beach. Based on these two responses, the camera may meta-tag an image as being taken "On the beach in Maui."

According to various embodiments of the present invention, a camera may meta-tag an image based on a user's response to a question. For example, a server may transmit to a camera a signal indicating that a recorded image is most likely of Alice (e.g., based on an image recognition program). The camera may then ask a user to verify that the image is of Alice. If the user indicates that the image is of Alice, then the camera may meta-tag the image as "Subject of Image: Alice." In another example, if a user indicates that an image shows "Alice and Bob in Yosemite," then the camera may meta-tag the image as "Subjects: Alice, Bob// Location: Yosemite National Park."

In another example, an image database may be used by a server 110 in performing an image recognition process on a captured image. According to some embodiments of the present invention, if the recognition process matches a stored image (e.g., "YOSEMITE-08") to a new image, the server 110 may suggest some or all of the meta-data 830 associated with the stored image to a user (e.g., by transmitting an indication of the meta-data 830 to the camera 130). The user may then conveniently agree (e.g., by pressing an "Ok" button) to have the suggested meta-data associated with the new image. In this manner, a user may avoid some of the tedium of creating meta-tags.

Further, any new images may be stored in the image database and thus may be made available to an image recognition process. In this way, an image recognition process and/or a process for meta-tagging images may be refined or customized in accordance with the stored meta-information associated with a particular user's images. For example, a first user may have captured an image of a particular scene, associated meta-data including the description "Grand Canyon" with the image, and stored the image on his personal computer. A second user may have captured and stored a very similar (or identical) image, but associated with the image (e.g., as meta-data 830) the description, "Arizona, Grand Canyon, March 1999." If the first user transmits a second image similar to the stored image to his personal computer (e.g., from the camera 130 via communications network 120) for image recognition, the computer may identify the same scene or subject based on the stored image, and suggest "Grand Canyon" to the first user. The second user's server 110, however, might suggest, for example, one or more of "Arizona," "Grand Canyon," and "March 1999" for the same second image. Thus, an image database may be useful in accordance with some embodiments of the present invention for generating and/or suggesting personalized meta-information for a particular user (or group of users).

A plurality of images may be meta-tagged based on at least one response from a user. For example, a user may indicate that he is at the beach. Base on this, all images captured by the camera may be meta-tagged as being captured "At the Beach." In another example, a user may indicate in a response to a question that Alice is the only blonde woman who he has captured any images of today. Based on this, the camera may automatically meta-tag all images of blonde women taken today as being images of Alice.

It will be readily understood by those skilled in the art that a variety of different forms of meta-data are possible, including, without limitation: text (e.g., a current date, a GPS location, the name of a subject, a current lighting condition), audio (e.g., an audio recording of a user's response to a question), images (e.g., a user's response may be a highlighted portion of an image), binary or other machine-readable formats (e.g., a 100 bytes of information at the start of an image file), and any combination thereof.

Meta-data may also be stored in a variety of different ways. For example, meta-data may be stored in a file that is separate from an image file to which it pertains. For example, a "BOB23.TXT" file may store meta-data that pertains to a "BOB23.JPG" image that is stored by the camera. In some embodiments, meta-data may be stored in an image file. For example, the start of an image file may include a plurality of meta-tags that provide information based on a user's responses to one or more questions. In one or more embodiments, a single meta-data file may store information for a plurality of images. For example, the camera may store a response database that includes meta-data for a plurality of images (see below for further details). According to some embodiments of the present invention, a camera may store an audio clip of the user's response to a question and associate this audio clip with an image as meta-data. In another exemplary embodiment, a camera may set the file name of an image based on a user's response to a question. For instance, if a user indicates that an images is of Alice, then the camera may store this image with the filename "ALICE-01.JPG."

A wide variety of methods of meta-tagging an image and of different types of meta-data are known to those skilled in the art and need not be described in further detail herein. For additional reference, the reader may refer to U.S. Pat. No. 6,408,301 to Patton, et al., entitled "Interactive image storage, indexing and retrieval system"; U.S. Pat. No. 5,633,678 to Parulski et al., entitled "Electronic still camera for capturing and categorizing images"; and U.S. Patent Application No. 20010012062 by Anderson et al., entitled "System and method for automatic analysis and categorization of images in an electronic imaging device."

The response database shown in FIG. 7 and the image database shown in FIG. 8 depict a few examples of a camera meta-tagging an image based on a user's response to a question. For instance, the image "WEDDING-02" was meta-tagged as including "Alice" and "Bob" (e.g., based on a user's response to question "QUES-123478-03"). The exemplary images "BEACHTRIP-05" and "BEACHTRIP-06" were meta-tagged as images of a beach (e.g., based on a user's response to "QUES-123478-06").

Figure 17:
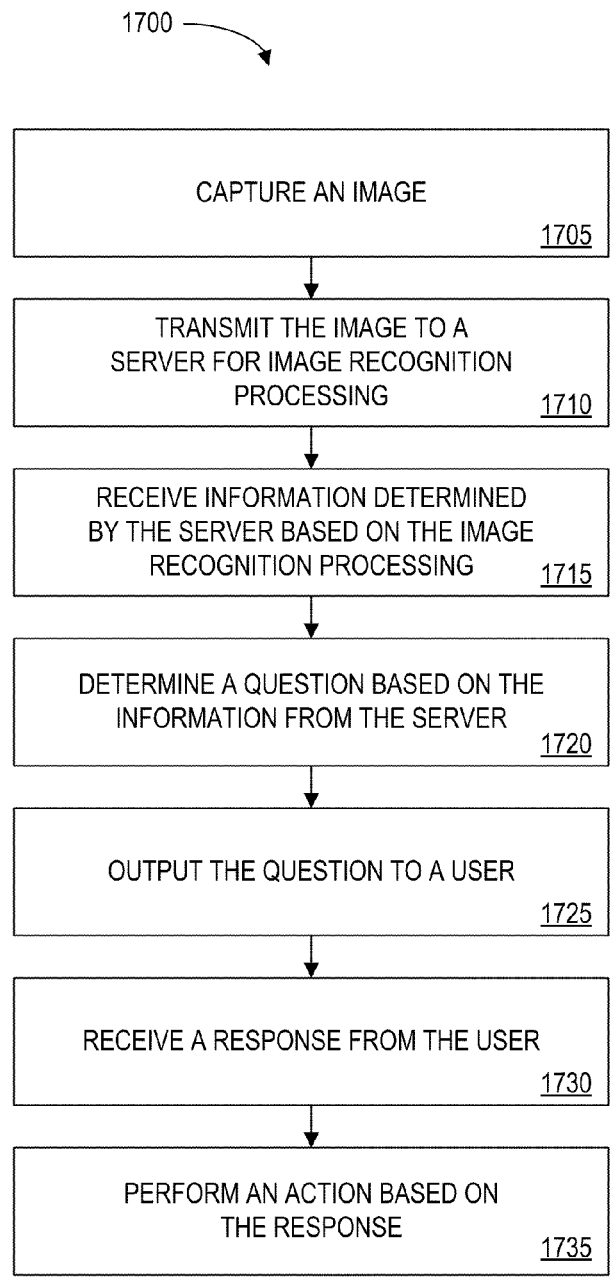
FIG. 17 is a flowchart illustrating a process consistent with at least one embodiment of the present invention for performing an action based on a response.

Referring to FIG. 17, a flowchart illustrates a process 1700 that is consistent with one or more embodiments of the present invention. The process 1700 is a method for determining a question based on information determined based on an image recognition process performed by a server. For illustrative purposes only, the process 1700 is described as being performed by a camera 130 in communication with a server 110. Of course, the process 1700 may be performed by any type of imaging device 210 in communication with a computing 220.

In step 1705, the camera 130 captures an image. In step 1710, the camera 130 transmits the image to the server 110 for image recognition processing. For example, as discussed herein, the server 110 may compare the captured image to a database of images stored for the user in a database. In step 1715 the camera receives information determined by the server 110 based on the image recognition process. For example, the server 110 may have matched the captured image to a stored image, retrieved the meta-information associated with the stored image, and forwarded the meta-information to the camera 130. In another example, the server 110 may have been unable to identify a match and may have transmitted a signal to the camera 130 directing the camera 130 to ask the user if the user would like to apply the same camera settings in the future to any similar images.

In step 1720, the camera 130 determines a question based on the information from the server. For example, the camera may generate a question asking if the user would like to associate meta-information received from the server 110 with the newly-captured image. The question is output to the user in step 1725. In step 1730 the camera 130 receives a response from the user and the camera performs an action based on the response (step 1735). For example, the camera may associate meta-data with the captured image based on the response.

Figure 18:
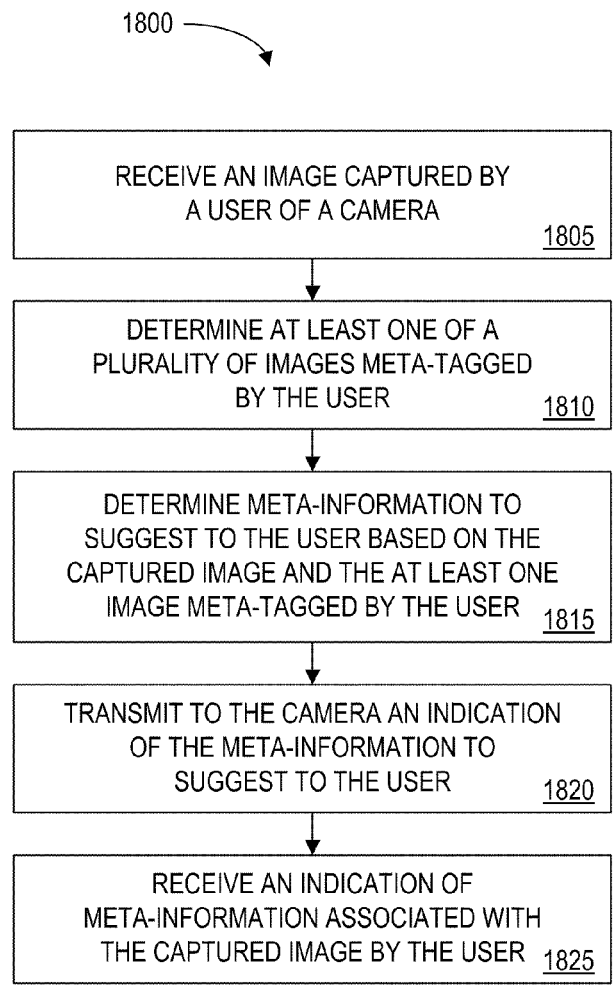
FIG. 18 is a flowchart illustrating a process consistent with at least one embodiment of the present invention for suggesting meta-information.

Referring to FIG. 18, a flowchart illustrates a process 1800 that is consistent with one or more embodiments of the present invention. The process 1800 is a method for determining meta-information. For illustrative purposes only, the process 1800 is described as being performed by a server 110 in communication with a camera 130. Of course, the process 1800 may be performed by any type of imaging device 210 in communication with a computing 220.

In step 1805, the server 110 receives an image captured by a user of a camera 130. In step 1810, the server 110 determines at least one of a plurality of images meta-tagged by the user. For example, the server 110 may access the user's personal images database that contains images previously meta-tagged by the user. In step 1815, the server 110 determines meta-information to suggest to the user based on the captured image and the at least one image meta-tagged by the user. For example, using an image recognition program, the server 110 identifies one or more matches for the captured image in the user's database of images and retrieves some or all of the meta-information associated with those matching images.

In step 1820, the server 110 transmits an indication of the meta-information to be suggested to the user. In an optional step 1830, the server 110 receives an indication from the camera 130 of meta-information associated with the captured image by the user. For example, the camera 130 may transmit a signal indicating that the user has accepted the suggested meta-information, or, alternatively, may transmit a signal indicating other meta-information the user has decided to associate with the image (e.g., the user may have rejected all or some of the suggested information and may have provided other supplemental information).

According to various embodiments of the present invention, a camera may automatically adjust one or more of its settings based on a response from a user and/or based on a signal from a server. For example, if a user indicates in his response to a question that the weather is sunny, then the camera may adjust the aperture on the camera to be f/5.6 and the shutter speed to be $1/250$ sec. Various different types of settings on the camera are described in detail herein, and others will be readily understood by those skilled in the art. Some examples of settings on the camera include, without limitation: exposure settings, lens settings, digitization settings, flash settings, multi-frame settings, power settings, output settings, function settings, and modes. Adjusting a setting may include, without limitation, one or more of: turning a setting on or off, increasing the value of a setting, decreasing the value of a setting, modifying a setting, changing a setting, revising a setting, and setting the camera to capture an image in a particular manner.

The following are only some examples of how one or more settings may be adjusted based on a user's response to a question in accordance with one or more embodiments of the present invention. Each exemplary scenario comprises an exemplary question asked by a camera, a response from a user, and action(s) performed by the camera:

(i) Question asked by camera: "Is this photo too dark?"
Response from user: "Yes"
Action: Increase the aperture on the camera.

(ii) Question asked by camera: "Are you taking pictures of a sporting event?"
Response from user: "Yes"
Action: Put camera in burst mode to take 3 pictures every time the shutter button is pressed and increase the shutter speed to that it is faster than $1/250$ sec.

(iii) Question asked by camera: "What are the current weather conditions?"
Response from user: "Cloudy and Overcast"
Action: Adjust white balance (color temperature) on camera to 6000 K.

(iv) Question asked by camera: "How far away is the wall behind your subject?"
Response from user: "About 10 ft"
Action: Adjust flash timing and shutter speed for slow synchro.

(v) Question asked by camera: "Which is more important to you, taking more pictures or getting higher resolution pictures?"
Response from user: "Taking more pictures"
Action: Set JPG compression to "medium quality" and resolution to "regular."

(vi) Question asked by camera: "Do you want the building behind your subject to be in focus?"

Response from user: "Yes"
Action: Set aperture on camera to f/8 (or less). Adjust shutter speed or film speed accordingly.
(vii) Question asked by camera: "Are we at a ski resort?"
Response from user: "Yes"
Action: Adjust white balance and exposure metering for subjects on bright white backgrounds.
(viii) Question asked by camera: "Are you taking a group photo?"
Response from user: "Yes"
Action: Crop the image to include everybody in the group.
(ix) Question asked by camera: "Are you on a boat?"
Response from user: "Yes"
Action: Adjust image stabilization setting to "high."

According to some embodiments, a camera may adjust a setting for one or more images. For example, the camera may output a question to a user, "Is this a group photo?" If the user responds "Yes" to the question, then the camera may adjust one or more settings and enable the user to capture one image based on these settings. After capturing the image of the group of people, the camera may revert to its original settings, for example, or determine one or more new settings for capturing images in the future. In some embodiments, settings may be adjusted for a plurality of images. For example, the camera may output a question to a user, "Are we at the beach?" If the user responds "Yes" to the question, then the camera may put the camera in "Beach" mode for the remainder of the user's image-capturing session. The camera may remain in "Beach" mode until the user turns the camera off or until the user begins capturing images of a different scene.

An adjustment to a setting may persist until a condition occurs. Various examples of conditions are described herein, and others may be readily apparent to one skilled in the art in light of the present disclosure.

A camera may not immediately adjust a setting based on a user's response to a question. For example, a camera may ask the user a plurality of questions and then adjust at least one setting based on the user's responses to the plurality of questions. In a second example, the camera may not adjust a setting based on a first question until after a user has answered a second, related question.

According to some embodiments, the camera may indicate to a user an adjustment made to a setting. For example, a user may respond to a question by indicating that he is at the beach. Based on this, the camera may increase the color saturation setting on the camera by 5%. In addition, the camera may output a message to the user "Increasing color saturation 5%."

Indicating an adjustment to a setting may be helpful for a variety of reasons, such as by assuring the user that the camera is in fact making use of his responses to questions. For example, even if a user does not understand what adjustment the camera is making, he may find it comforting to be informed that the camera is making use of his responses to questions. If a user were to feel that his responses to questions were being ignored by the camera, then he might ignore future questions that are output by the camera.

Indication of an adjustment may be helpful to the user in verifying that the camera has not misunderstood or misinterpreted a user's response to a question. For example, a user may respond to a question by indicating that he is at a football game. Based on this indication and the current time of day (e.g., 2 p.m.) the camera may assume that the game is being illuminated by sunlight. However, in fact, this may not be the case (e.g., the football game may be played in a domed stadium). When the camera indicates that it is "Adjusting the camera for sports during daylight conditions," the user may notice this mistake and correct the camera by indicating that the football game is in fact illuminated by halogen light bulbs. Informing the user of any adjustments that are made to the camera may also help the user in composing a shot or in making further adjustments to the camera's settings. For example, informing the user that the "flash brightness has been set for subjects 10-12 feet away" may be helpful to a user if the user decides to move or recompose an image.

Instead of automatically making an adjustment, a camera may ask for a user's permission before making an adjustment to a setting. If the user indicates that it is acceptable to adjust the setting on the camera, then the camera may adjust the setting. If the user indicates that he would rather not adjust the setting on the camera, then the camera may not adjust the setting. For example, based on a user's response, the camera may determine that the camera's flash should be turned on. Before turning on the flash, the camera may output a message to the user, "I'm about to turn on the flash. Is this okay?" If the user responds "Yes," then the camera may turn the flash on. In another example, the camera may determine that a user is capturing an image of a sunset based on the user's responses to one or more questions. Based on this, the camera may output a question to the user, "Would you like to put the camera into Sunset Mode? Sunset Mode is specially designed to make sure that pictures of sunsets are exposed correctly." The user may then press a "Yes" button on the camera to indicate that he would like to put the camera into "Sunset" mode.

Asking for a user's permission to adjust a setting on the camera may be similar to providing advice to a user about adjusting a setting. Various ways of providing advice to a user based on the user's response to a question are discussed herein.

The camera may implement one or more rules based on a user's response to a question. A rule may be a guideline or other indication that may be used to determine a setting on the camera. Implementing a rule may include one or more of: storing an indication of a rule in memory, automatically adjusting a setting of the camera based on a rule, and restricting operation of the camera based on a rule.

In one example of implementing a rule, a user may respond to a question by indicating that he is capturing images of a child's birthday party. Based on this, the camera may store a rule that requires that the camera maintain shutter speed of at least 1/125 sec (because children at a birthday party tend to move quickly), except when the camera determines that an image includes a birthday cake with candles, in which case the camera should set the aperture to be a large as possible and not use a flash. An indication of a rule may be stored, for example, in a rules database (not shown) or a settings database such as the one depicted in FIG. 7.

In another example of use of a rule, a rule may be a required relationship between one or more settings. For example, based on a user's indication that he is taking pictures at the beach, the camera may ensure that the subject of an image is always correctly exposed, even if the background of the image is overexposed. In a related example, the camera may use an automatic neutral density feature to automatically vary the exposure of the subject relative to the exposure of the background. In another example, a user may respond to a question by indicating that he is capturing images at a zoo. Based on this, the camera may implement a rule that, if the user is outdoors, the camera's aperture should be smaller than f/8 (to ensure good depth of field). If the user is indoors, a rule may establish that the camera should increase the CCD sensitivity as much as possible and never use a flash (to avoid frightening the animals).

According to some embodiments, a rule may indicate how a setting on the camera should be adjusted. For example, based on an indication from a user that Alice is standing in front of a tree, the camera may implement a rule to shift the hue of an image by +5% anytime the camera is used to capture an image of Alice wearing her green jacket (e.g., to avoid having Alice's green jacket blend into the background. In another example, a user may respond to a question by indicating that he is at a ski resort. Based on this, the camera may implement a rule that until 5 p.m. that day, all images captured by the camera should be meta-tagged as being "skiing/snowboarding" images. In yet another example, the camera may automatically adjust the white balance setting to 7000K based on an indication by a user.

According to one or more embodiments, a rule may indicate how one or more images of a subject should be captured. For example, the camera may store a rule that all images of Alice should be taken from the left side, since Alice has a birthmark on her right arm that she prefers to have hidden in images of her. Based on the rule, the camera may prevent the capturing of an image of Alice's right side and/or may prompt the user to verify that he wishes to take a picture of Alice's right side.

According to some embodiments, a rule may prevent the camera from performing one or more operations, such as using a flash while the user is capturing images of a sporting event.

The exemplary response database shown in FIGS. 12A and 12B shows a few examples of how a camera may adjust a setting based on a user's response to a question. For example, the camera adjusted its settings to "Fluorescent Light" mode based on a user responding "Fluorescent" to question "QUES-123478-02." In another exemplary adjustment, the camera adjusted the white balance setting to "5200 K" based on a user responding "Sunny" to question "QUES-123478-05." In another exemplary adjustment based on a response, the camera adjusted the image size setting to "1600×1200" and the image compression setting to "Fine" based on a user responding "15" to question "QUES-123478-07."

In accordance with various embodiments of the present invention, a camera may guide a user in operating the camera based on one or more responses from the user. Guiding a user may include, without limitation, one or more of: recommending that a user adjust a setting, prompting a user to adjust a setting, guiding a user in composing a shot, and outputting a message that guides a user in operating the camera.

Recommending an adjustment to a setting may include, without limitation, one or more of: outputting an indication that an adjustment to a setting is recommended, outputting a message describing an adjustment to a setting, outputting an indication of a setting to be adjusted, and outputting an indication of a value of a setting (e.g., a current value, a recommended value). Some different types of settings on the camera are described in detail herein, as are some exemplary types of adjustments that may be made to settings.

According to some embodiments, the camera may guide a user by recommending an adjustment to at least one setting based on at least one response from the user. For example, the camera may recommend that a user increase his shutter speed to at least 1/250 of a second when taking sports pictures. Response database in FIG. 7 also shows an example of outputting a recommendation of a setting to a user based on the user's response to a question. Based on the user's response "Yes" to "QUES-123478-09" at 4:11 p.m. on Aug. 17, 2002, the camera advised the user to adjust the camera's shutter speed to be faster than 1/250 of a second.

As discussed herein, in accordance with some embodiments, the camera may actually change a setting on the camera based on a user's response to a question. In contrast, recommending that a user adjust a setting may include simply outputting a message describing a potential adjustment to a setting, leaving it up to the user to actually adjust the setting. For example, a camera may output a message to a user, "I suggest that you use a smaller aperture to ensure that both the foreground and the background of your photo are in focus. An aperture of f 8 or smaller would be good for this photo." The user may or may not make the suggested adjustment. In another example, the camera may output a message to a user, "If you're taking pictures of animals in the wild, then you should probably put the camera in 'Wildlife' mode."

According to some embodiments, an output device may be used to output an indication of a suggestion of a setting adjustment. For example, a warning LED in the camera's viewfinder may blink to indicate to a user that an image the user is about to capture may be underexposed (e.g., suggesting an adjustment should be made). Note that this recommendation (i.e., the blinking LED) may simply suggest that a user make an adjustment to a setting without indicating any specific adjustment to make. In at least one embodiment, a camera may output a message describing a setting that should not be used. For example, if the camera's flash is currently enabled and the user indicates that he is capturing an image of a mirror, then the camera may output a message to the user, "It is not advisable to use a flash when capturing an image of a mirror. The flash could reflect off the mirror back at the camera, causing the image to be over exposed."

According to some embodiments, a camera may prompt a user to adjust a setting based on at least one response from the user. Prompting a user to adjust a question may include outputting a question to a user asking him if he would like to adjust a setting. For example, a camera may output a message to a user, "Since you're taking pictures at a ski slope, you should probably turn on the camera's Auto-Neutral Density feature." Note that in this example, it is left to the user to determine whether he would like to turn on the Auto-Neutral Density feature and operate the controls of the camera to enable the feature. In another example, a user may respond to a question by indicating that he is in a room with fluorescent lights. Based on this response, the camera may output a message to the user, "Would you like to put the camera in "Fluorescent Light" mode? This mode is specifically designed for rooms with fluorescent lights and will help to ensure that your images are exposed correctly." If the user responds "Yes" to this question, then the camera may be adjusted to "Fluorescent Light" mode.

A camera may assist a user in adjusting a setting (e.g., without the camera actually performing the adjustment of the setting). For example, a camera may output a message to a user, "Since you're on a sunny beach, you should probably put me in 'Sunny Beach' mode. Press 'Ok' to put the camera in 'Sunny Beach' mode." Note that in this example, the camera has adjusted its controls to simplify for the user the process of putting the camera in "Sunny Beach" mode. For instance, instead of selecting "Sunny Beach" mode (e.g., from a menu of modes on the camera), all the user has to do is press the "OK" button on the camera's touch screen.

In another example, a camera may output a message: "You may want to adjust the white balance setting on the camera based on the color of light emitted by the light bulb in this room. Press the 'up' and 'down' buttons to adjust the white balance." In this example, the camera has simplified the process of adjusting the white balance on the camera by automatically enabling the "up" and "down" buttons on the camera to control the white balance.

According to some embodiments of the present invention, a camera and/or a server may guide a user in composing a shot based on at least one response from the user. Various types of software and/or hardware useful in assisting a user in composing a shot are known to those skilled in the art, including systems described in U.S. Pat. No. 5,831,670 to Suzuki, entitled "Camera capable of issuing composition information"; U.S. Pat. No. 5,266,985 to Takagi, entitled "Camera with optimum composition determinator"; U.S. Pat. No. 6,094,215 to Sundahl et al., entitled "Method of determining relative camera orientation position to create 3-D visual images"; and U.S. Pat. No. 5,687,408 to Park, entitled "Camera and method for displaying picture composition point guides."

According to some embodiments of the present invention, a camera may determine an optimum framing for a scene (e.g., with a subject slightly off center and an interesting tree in the background). Based on this determined framing, the camera may provide instructions to a user on how to aim the camera to obtain this framing. For example, the camera may output audio instructions to the use, such as, "Pan the camera a little more to the left . . . . Okay, that's good. Now zoom in a little bit . . . . Whoops, that's too much . . . . Okay, that's good. Now you're set to take the picture."

In some embodiments of the present invention, a camera may include a mechanism that allows the camera to aim itself. For example, a user of the camera may be asked to hold the camera steady, and then the camera may adjust a mirror, lens, light sensor, and/or other optical device(s) so as to capture an image at a certain angle from the camera. For example, the camera may rotate a mirror five degrees to the left to capture an image that is to the left of where a user is aiming the camera.

According to one or more embodiments, the camera may be configured so as to be manipulated remotely (e.g., by a server). For instance, a server may be able to view a representation of the camera's viewpoint over a network connection. The server may instruct a user to hold the camera steady (e.g., via the camera's LCD display) (or direct the camera to provide such an instruction), and then the server may adjust remotely the camera's mirror to obtain an optimal framing of a picture.

The camera may provide directions to one or more subjects of a image. For example, a user may be capturing an image of a group of friends at a restaurant. Based on the user's response to a question and/or based on image recognition (e.g., performed by the camera and/or a server), the camera may provide directions relating to the group, such as, without limitation: "Everybody needs to get closer together"; "Tell Alice to take a step back"; and "Bobby is giving rabbit ears to Alice." Similarly, a camera may output directions addressed to the group rather than the user (e.g., using an audio speaker).

In another example of providing composition assistance to a user, a camera's viewfinder may display a blinking arrow pointing to the left to indicate to a user that he should pan left to capture the best possible image of a particular scene. In still another example, a user may indicate that he is capturing an image through a glass window and would like to use a flash. Based on this, the camera may provide instructions to the user on how to compose the shot so as to avoid having the flash reflect off of the glass window.

As discussed variously herein, one or more questions may be determined based on a user's response to a previous question. For example, the camera may ask a user a first question: "Are you indoors or outdoors?" If the user responds "Indoors" to this question, then the camera may store this response and ask the user a second question based on the response: "What kind of lightbulbs does this room have?"

Some additional examples of determining a second question based on a first question are provided below. Each exemplary scenario describes at least one question output, a response by a user, and a subsequent question determined (e.g., by a camera, by a server) based on the response to at least one previous question:

(i) First question output by camera: "Are we at the beach?"
User's response: "Yes"
Second question determined: "Are you taking pictures of the water?"

(ii) First question output by camera: "Are you taking a picture of a birthday cake or candles?"
User's response: "Yes"
Second question determined: "How many candles are there on the cake?"

(iii) First question output by camera: "Who are you taking a picture of?"
User's response: "Alice, Bob, and Carl"
Second question determined: "Is Bob currently wearing the same shirt as he was in this picture?<display picture of Bob>"

(iv) First question output by camera: "Are we at the beach?"
User's response: "No."
Second question output by camera: "Are we at a ski resort?"
User's response: "No"
Third question determined: "Are you trying to capture the silhouette of an object?"

According to some embodiments, an entire series of questions may be output based on a user's response to a question. For example, in response to a user indicating that he is indoors, the camera may ask the user a number of questions about the lights of the room in order to determine what kind of lights there are, where the lights are located, and what sort of lighting effect the user is hoping to achieve. The user's responses to these questions may then be used to determine one or more settings for the camera, as discussed herein.

In one example, a computing device may use a decision tree to determine one or more questions to ask a user. For example, a camera may ask a user a first question. If the user gives a first response to the first question (e.g., "Yes"), then the camera may ask the user a second question (e.g., the question from the "Yes" branch of the decision tree). If the user gives a second response to the first question (e.g., "No"), then the camera may ask the user a third question (e.g., the question from the "No" branch of the decision tree). This process may repeat until the camera determines enough information to perform one or more actions (e.g., adjust a setting, guide a user in operating the camera).

As discussed variously herein, a user's response to a question may be a factor in determining a question to ask the user. For instance, a determination condition may be satisfied based on a user's response to one or more questions. For example, one determination condition may be: (location="outdoors") AND (image_recognition (beach_template)). The information that a user is outdoors may have been received, for example, from a user as a response to a question. In another example, a determination condition is: (location="zoo") AND (subject_of_image="animal"). The information that a user is at the zoo may have been determined based on a response to a first question, and the information that the user is capturing an image of an animal may be determined based on a response to a second question.

Note that the determination condition database shown in FIG. 10 includes a number of examples of the camera that describe determining a question based on a user's response to a previous question. In one example, if the camera is indoors (e.g., determined by asking "QUES-123478-01") and the flash is turned off, then the camera may determine to output question "QUES-123478-02" (i.e., "What kind of lightbulbs does this room have?") to a user. In another example, if a user answered "Alice" to "QUES-123478-03," then the camera may output "QUES-123478-04" (i.e., "Please use the cursor to point to Alice in this picture.").

Some embodiments of the present invention may be advantageous in that by asking a user a plurality of questions (e.g., a series of related questions), a computing device (e.g., of a camera, a server) may determine enough information about a scene to perform one or more other actions (e.g., adjusting a setting, meta-tagging an image, guiding a user in operating the camera).

As described herein, a camera, server or other computing device may use one or more templates to perform image recognition on captured images. For example, the camera may store a "beach template" that may be used to determine whether an image includes (and thus may have been captured on) a beach. As discussed herein, a wide variety of other templates are possible.

The camera may use information provided by a user (e.g., a user's response to a question) to determine a template. The template may then be stored and used for processing images and/or for asking questions in the future.

For example, a camera may output a question, "Who is the subject of this image?" and a user may respond: "Alice." Based on the user's response and the image, the camera may create a template suitable for recognizing images of Alice (e.g., an "Alice template"). At a later time, the camera may use the "Alice template" to determine that Alice is in an image. A question may then be asked based on this determination (e.g., "Who is standing next to Alice in this picture?").

In another example, a camera may display a plurality of images to a user and ask the user, "Were all of these images captured in a gymnasium?" If the user responds "Yes" to the question, then the camera may create a "gymnasium template" based on similarities among the plurality of images (e.g., the color of the fluorescent lighting, the color of the wood floor, etc.). If the user later returns to the gymnasium to capture more images, the camera may recognize that it is in the gymnasium and ask the user a question based on this (e.g., "You're in a gymnasium, aren't you?").

In another example related to a template, a camera or server may store a "group photo template" that may be used for recognizing images of groups of people and for adjusting the settings of the camera so as to best capture images of groups. However, some group photos may not match the group photo template. For example, an image of a group of people in which people are lying down may not match the group photo template. Based on this, the camera may output a question to a user "Is this a group photo?" If the user responds "Yes," then the camera may determine a new group photo template and use this new group photo template to replace the old group photo template. Optionally, two templates may be retained (e.g., one being for group photos where the subjects are lying down). In the future, the camera may recognize images of people lying down as group photos as well and ask appropriate questions based on these photos.

It will be readily understood that a template may also be determined based on a variety of other factors (i.e., factors other than a user's response to a question). According to some embodiments, a template may be determined based on at least one image. For example, the camera may capture a plurality of images at a ski resort and determine a "ski resort template" based on these images (e.g., based on similarities between the images). This "ski resort template" may be used to recognize images in which people are shown skiing or snowboarding on snow. Note that snow provides a bright white background for such images, which may be helpful in distinguishing images of people at a ski resort, for example, from images of people engaged in other activities.

Some embodiments provide for determining a template based on other indications by a user. For example, a user may use buttons on the back of the camera to select a plurality of images that are stored in the camera and may indicate that the camera should determine a template based on these images. For instance, the user may select a plurality of images captured at a dance party and ask the camera to create a "dance party template" based on the selected images.

As discussed herein, in accordance with various embodiments of the present invention a camera or other imaging device may transfer one or more images to a second device (e.g., a server). According to some embodiments, a camera may determine whether to transmit one or more images to a second electronic device. For example, the camera may determine whether it is running low on memory and therefore should free up some memory by transmitting one or more images to a second electronic device and then deleting them. Such a determination may be based on a variety of factors, including, without limitation:
   (i) an amount of available memory (e.g., an amount of memory on the camera that is free, an amount of memory on the second device that is free)
   (ii) an amount of bandwidth (e.g., an amount of bandwidth available for transmitting images to the second device)
   (iii) factors relating to capturing images
   (iv) a user's preferences
   (v) factors relating to images stored in memory Similarly, according to some embodiments a camera may determine which images to transmit to a second device. For example, the camera may free up some memory by transmitting images of Alice to a second electronic device, but keep all images of Bob stored in the camera's secondary memory for viewing using the camera. Such a determination may be based on a variety of factors, including, without limitation:
   (i) the quality of at least one image (e.g., as measured by a rating)
   (ii) the compressibility of at least one image
   (iii) image content (e.g., the subject of an image)
   (iv) a user's preferences
   (v) meta-data associated with at least one image (e.g., time, location, subject, associated images)
   (vi) an amount of available memory (e.g., an amount of memory on the camera that is free, an amount of memory on the second electronic device that is free)
   (vii) an amount of bandwidth (e.g., an amount of bandwidth available for transmitting images to the second electronic device)

Because the bandwidth of a connection between the camera and a second device may be limited, the camera may compress one or more images when transmitting them to a second device. In addition, the camera may determine whether to compress an image when transmitting it to a second device. For example, low quality images may be compressed before being transmitted to a second device, whereas high quality images may be transmitted at full resolution to the second device. Similarly, the camera may determine how much to compress one or more images when transmitting the one or more images to a second device. Determining whether to compress an image (and/or how much to compress the image) may be based on a variety of factors, including, without limitation:

(i) an amount of available memory (e.g., an amount of memory on the camera that is free, an amount of memory on the second electronic device that is free)
(ii) an amount of bandwidth (e.g., an amount of bandwidth available for transmitting images to the second electronic device)
(iii) the quality of at least one image (e.g., as measured by a rating)
(iv) the compressibility of at least one image
(v) image content (e.g., the subject of an image)
(vi) a user's preferences (e.g., indications by a user)
(vii) meta-data associated with at least one image (e.g., time, location, subject, associated images)
(viii) other images Note that in some embodiments a camera may delete or compress an image after transmitting it to a second electronic device, thereby saving memory. Since a copy of the image may be stored on the second device (e.g., in a server database), there may be no danger of losing or degrading the image by deleting or compressing it on the camera. Of course, in some circumstances it may not be desirable to delete or compress an image after transmitting the image to a second device. For example, a camera may transmit an image to a second electronic device in order to create a backup copy of the image.

Capturing an image manually may include receiving an indication from a user that an image should be captured. Some examples of receiving an indication from a user include, without limitation: a user pressing a shutter button on a camera, thereby manually capturing an image; a user setting a self-timer on a camera, thereby indicating that the camera should capture an image in fifteen seconds; a user holding down the shutter button on a camera, indicating that the camera should capture a series of images (e.g., when taking pictures of a sporting event); a user putting a camera in a burst mode, in which the camera captures a sequence of three images each time the user presses the shutter button; and a user putting a camera into an auto-bracketing mode, in which the camera captures a series of images using different exposure settings each time the user presses the shutter button on the camera.

As discussed herein, a camera or other imaging device may capture an image automatically and then determine a question to ask a user based on that image. For example, the image database in FIG. 8 depicts an example of an image "BEACHTRIP-04" that was captured automatically by a camera. It will be readily understood that capturing an image manually may involve receiving an indication from a user that an image should be captured (e.g., by the user pressing a shutter button). In contrast, automatically capturing an image may not involve receiving any such indication. For example, the camera may capture an image automatically without the user ever pressing the shutter button on the camera. In contrast to capturing an image manually, therefore, capturing an image automatically may include, without limitation, one or more of the following:

(i) capturing an image without a user pressing the shutter button on the camera
(ii) capturing an image without an indication from a user
(iii) capturing an image without a direct indication from the user
(iv) capturing an image without receiving an input from the user
(v) capturing an image without receiving an indication that the user would like to capture the image
(vi) capturing an image without the user's knowledge
(vii) not providing an indication to a user that an image has been captured
(viii) capturing an image without accessing information provided by the user
(ix) capturing an image based on a condition
(x) capturing an image based on a condition that was not set by a user
(xi) capturing an image while the camera is being held by a user
(xii) capturing an image independently of the user pressing the shutter button on the camera
(xiii) determining whether to capture an image
(xiv) determining whether to capture an image automatically According to some embodiments of the present invention, a user may or may not be aware that an image has been captured automatically. For example, the user's camera may not beep, display an image that has been captured, or provide any other indication that it has captured an image, as is typically done by digital cameras that capture images manually. Automatically capturing an image quietly and inconspicuously may help to prevent the camera from distracting a user who is in the midst of composing a shot. For example, a user may find it annoying or distracting to have the camera automatically flash or beep when he is about to capture an important image. In a second example, capturing images without a user's knowledge may allow the camera to give the user a pleasant surprise at the end of the day when the user reviews his captured images and finds that the camera captured sixty-eight images automatically in addition to the nineteen images that he captured manually. In another example, a user may manually capture a plurality of images at a birthday party, but miss capturing an image of the birthday boy opening one of the gifts. Fortunately, the camera may have automatically captured one or more images of this special event without the user's knowledge.

In accordance with at least one embodiment of the present invention, a camera may capture an image automatically while a user is composing a shot. For example, a user may aim the camera at a subject and begin to compose a shot (e.g., adjusting the zoom on the camera, etc.). While the user is still composing the shot (i.e., before the user presses the shutter button on the camera to capture an image), the camera may capture one or more images automatically. For example, the camera may capture images of scenes that the user aims the camera at, even if the user does not press the shutter button on the camera.

In some embodiments, one or more images may be captured based on a condition. For convenience, such a condition may be referred to herein as a capture condition. Capture conditions may be useful in triggering or enabling a variety of different functions, including, without limitation: determining when to capture an image, determining what image to capture, and determining how to capture an image.

Conditions and the performance of one or more actions based on a condition are discussed variously herein. Accordingly, it will be understood that capturing an image based on a condition may include, without limitation, capturing an image when a condition occurs, in response to a condition, when a condition is true, etc. Also, it will be readily understood in light of discussions herein with respect to conditions, that a capture condition may comprise a Boolean expression and/or may be based on one or more factors. Various examples of factors upon which a condition may be based are discussed herein.

In one example of how an image may be captured automatically based on a capture condition, whenever the shutter button on the camera is depressed halfway (i.e., a capture condition), a camera may automatically capture an image and store this image in RAM for further processing. In another example, a camera may include an orientation sensor that determines when the camera is being aimed horizontally and has not moved in the last two seconds. Based on this determination, the camera may capture an image, since a user of the camera may be composing a shot and the captured image may be useful in determining a question to ask the user about the shot. According to another example, a camera may include a microphone. If this microphone senses an increase in the noise level, then this may be a sign that an event is occurring. Based on the increase in noise level, the camera may capture an image, which may be useful in determining the situation and asking the user a question.

Note that automatically capturing one or more images based on a capture condition may be particularly helpful for the camera in determining one or more questions to ask a user. For example, whenever a user raises the camera to a horizontal position and holds it steady, the camera may capture an image. This image may then be used to determine an appropriate question to ask the user (e.g., a question relating to the image that the user is about to capture). Various exemplary ways of determining a question based on an image that has been captured are discussed herein, and may be applied in accordance with some embodiments with respect to images captured automatically.

An image that is captured based on a capture condition may be stored in memory temporarily or permanently. For example, a camera may automatically delete an image that is captured automatically after the camera has determined and output a question based on this image. For instance, the camera may automatically capture one or more images while a user is composing a shot. These images may be stored in memory temporarily and used for determining one or more questions to ask the user. These questions may be output to the user while he is composing the shot. The user's responses to these questions may then be used to adjust one or more settings on the camera, as discussed herein. Finally, the user may finish composing the shot and capture an image (e.g., based on the adjusted settings). Afterwards, the automatically captured images may be deleted from memory to free up space.

Alternatively, an imaging device may capture images semi-continuously (e.g., like a video camera), and a capture condition may be used to select an image for further processing. For example, a camera may continuously capture images and store them temporarily in memory (e.g., in a circular buffer of thirty images). Then, based on a capture condition (e.g., a user pressing the shutter button halfway), the camera may select one of the previously captured images and determine a question to ask the user based on this image.

It will be readily understood that an image that is captured automatically may be meta-tagged. For example, an image that is captured automatically may be meta-tagged to indicate that it can later be deleted (e.g., if the camera starts to run out of memory).

Figure 19:
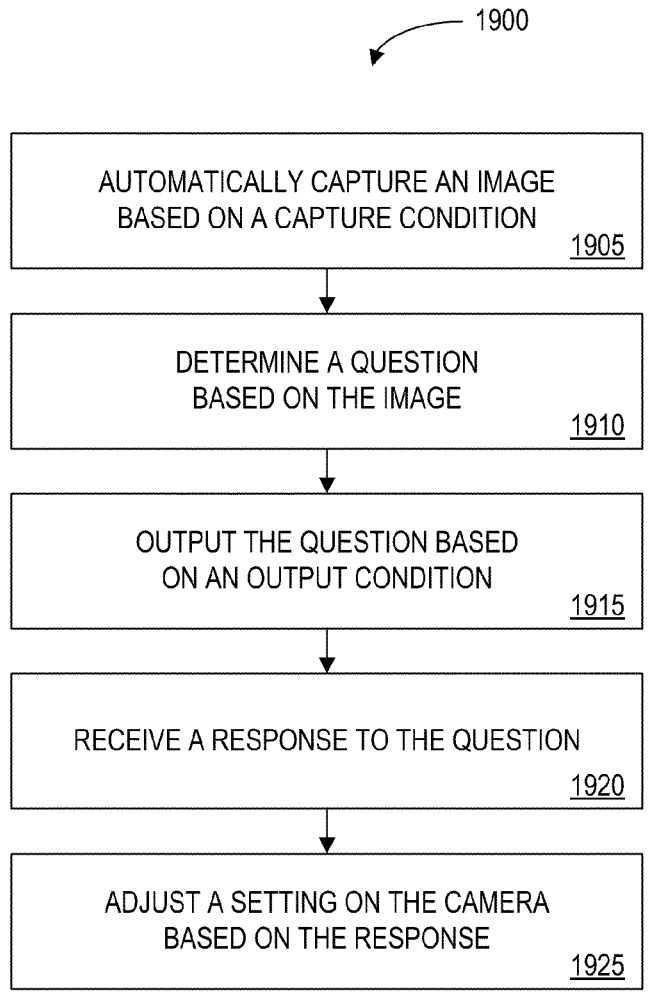
FIG. 19 is a flowchart illustrating a process consistent with at least one embodiment of the present invention.

Referring to FIG. 19, a flowchart illustrates a process 1900 that is consistent with one or more embodiments of the present invention. The process 1900 is a method for automatically capturing an image based on a capture condition. For illustrative purposes only, the process 1900 is described as being performed by a camera 130. Of course, the process 1900 may be performed by any type of imaging device 210.

In step 1905, the camera 130 automatically captures an image based on a capture condition. In step 1910, the camera 130 determines a question based on the image. In step 1915, the camera outputs the question based on an output condition. Various types of output conditions are discussed herein. In step 1920, the camera 130 receives a response to the question, and in step 1925, the camera 130 adjusts a setting based on the response.

As described variously herein, a user may provide information by responding to a question that is output by a camera. This information provided by the user, as well as other information (e.g., information from sensors, information from analyzing images), may be used by the camera to determine one or more actions to perform (e.g., adjusting settings on the camera, guiding a user in operating the camera).

According to some embodiments of the invention, information (e.g., acquired by a camera) may expire. For example, a user may respond to a question by indicating that he is "at the beach." This response may be stored in the response database (e.g., such as the one shown in FIG. 7) and an action may be performed based on the response (e.g., the camera may be adjusted to "Sunny Beach" mode). However, at some point the information that the user is "at the beach" will no longer be valid. For example, the user may go to a restaurant to eat lunch, or go home after visiting the beach all day. In another example, information about the weather outside being sunny may expire at the end of the day when the sun goes down. In response to information expiring, the camera may perform an appropriate action such as adjusting a setting on the camera or outputting an additional question to a user. In accordance with at least one embodiment of the present invention, a server or other computing device may determine that information has expired. In some embodiments, one or more actions may be performed based on the expiration of information.

Information may expire for a variety of different reasons. The information may no longer be correct, for example. For instance, information that the user is at the zoo is no longer correct if the user has left the zoo. In another example, information may no longer be applicable. For instance, information about how to crop an image of a group of people may no longer be applicable if a user is not capturing an image of a group of people. In some cases, more recent information may be available. For example, two hours ago the weather outside may have been cloudy and raining, but now the weather is sunny. In some instances, information may be time-sensitive and/or may be updated periodically, according to a schedule, from time to time, or at any time.

According to at least one embodiment, information should be verified before being used again. For example, a user may indicate that he is interested in capturing an image with a slow shutter speed and maximum depth of field. However, these settings may or may not be appropriate for a new scene that the user is capturing. Thus, if it is determined that a new scene is to be captured, for example, it may be appropriate to verify whether the user is still interested in using the same settings (i.e., determine whether that information has expired, is still valid, and/or is still applicable).

In order to account for the possibility that information provided by a user has a limited lifespan, a computing device may determine when information provided by a user expires and/or perform an action based on the information's expiration. For example, the camera may ask the user another question and/or may adjust a setting based on the expiration of the information.

Different pieces of information may expire at different times (e.g., independently or each other). For example, information about the subject(s) of one or more images that a user is currently capturing (e.g., the identities of people in a group photo) may expire when the user ceases to aim the camera at the group of people. In another example, information about the location of the camera may expire when the camera is moved more than one hundred feet from its original location. Information about the current weather conditions may expire after two hours, for example. In some embodiments, information about a user of the camera may expire when the camera is turned off.

Alternatively, or in addition, different pieces of information may expire at the same time. For example, all information about capturing images of Alice may expire if a user is now capturing an image of Bob. In another example, all information about a scene that a user was capturing may expire if the user turns the camera off for more than thirty minutes. In another example, all information about a user of the camera may expire if a user presses the "Reset User Information" button on the camera.

A computing device may determine when one or more pieces of information expire based on a condition. This condition may also be referred to as an expiration condition to differentiate it from other types of conditions described elsewhere in this disclosure. Conditions are discussed in further detail variously herein. One skilled in the art will understand in light of the present disclosure that some conditions for expiring information may be similar to conditions for determining a question. For example, it will be readily understood that a condition may be a Boolean expression and/or may be based on one or more factors. Any of the factors described herein (e.g., images, indications by a user, movement of the camera, time-related factors, state of the camera, information from sensors, characteristics of a user, information from a database) may also be useful in determining when information expires. Some additional examples of factors are provided below.

According to one example of determining that information has expired based on a condition, if a user turns the camera off (i.e., a condition), then any information about a scene that the user was capturing may be deemed to be expired. The next time the user turns the camera on, for example, the camera may ignore the expired information or, alternatively, ask a user a question to verify that the expired information is still relevant. In another example, if more than two hours have passed since a user provided a response to a question (i.e., a condition), then the camera may determine that the response has expired and perform an action (e.g., ask the question again). In another example, if a user has moved more than one thousand feet from his original location (i.e., a condition), then the camera may determine that information relating to his original location is no longer applicable Information may expire (or not expire) based on one or more indications by a user. For example, a user may respond to a question by indicating that information about a scene is or is not expired. For instance, the camera may ask a user, "Are we still at the beach?" In some exemplary embodiments, information that affects a setting on the camera may expire based on a user adjusting the setting on the camera. For example, information about the lighting in a room may cause the camera to adjust its white balance setting. If the user later adjusts (e.g., using a control) the white balance setting on the camera to "Sunny," then this may indicate that the user is no longer indoors and that the information about the lighting of the room is no longer relevant.

In another example, a user may press a "Reset Scene Information" button on the camera to indicate that information relating to a past scene is expired (e.g., meaning that the camera should disregard the information relating to the past scene). In still another example, a user may use the voice command "Same Scene" to indicate that information about a previous scene has not expired (e.g., even if the camera would otherwise have considered the information to be expired).

According to some embodiments, information related to an image may expire when or after an image is captured (e.g., the information about the scene may only be applicable to that image). In at least one embodiment, information about a current scene that the user is capturing may expire when the camera is turned off.

As mentioned above, some information may expire (or not expire) based on one or more images. For example, a computing device may use a face recognition program to analyze an image and to determine that an image is an image of Bob. Based on this, the camera may determine, for example, that information about capturing images of Alice is expired. In another example, a user may have indicated that he is at the beach. However, thirty minutes later, the camera may determine that one or more images captured recently do not match any of the "beach templates" stored by the camera. Based on this, the camera may determine that the information that the user is on the beach may have expired.

Some types of information may expire (or not) based on the state of the camera. For example, a camera may keep track of how many images have been captured since a piece of information was received. After a threshold number of images (e.g., ten images) have been captured, the information may expire. In another example, information may expire whenever the camera is turned off. Note that the camera may be turned off based on an indication by a user (e.g., the user presses the power button on the camera) and/or based on other conditions (e.g., the camera may automatically turn itself off after five minutes of inactivity).

According to some embodiments, information may expire when the camera's batteries are replaced, when the camera is plugged into a wall outlet to recharge, or when images are downloaded from the camera (e.g., for storage on a personal computer).

Information may expire based on a user. For example, a camera may store information about its current user (e.g., the user's identity, the user's preferences and habits when capturing images, a list of images that have already been captured by the user). If the camera is later given to a new user, information about the previous user may expire, since it is not applicable to the new user. For example, Alice and Bob may share a camera. When Alice is capturing images using the camera, the camera may adjust one or more settings based on Alice's user preferences. If Alice then hands the camera to Bob, the information about Alice's user preferences may expire and be replaced with information about Bob's user preferences.

According to some embodiments of the present invention, information may expire or not expire based on one or more of a variety of time-related factors. Some examples of time-related factors are described herein without limitation. Information may expire, for example, after a duration of time. For instance, information that a user provides about a scene may expire after thirty minutes unless it is reaffirmed by the user (e.g., by indicating the information is still valid, by providing additional information about the scene). In another example, information may expire at a specific time. For instance, information about whether the sky is sunny, partially cloudy, or overcast may expire at 6:34 p.m. (e.g., when the sun goes down). According to at least one embodiment, information may expire based on a condition existing for a duration of time. For example, information about the lighting in a room may expire if the camera's light meter reads bright (outdoors) light for more than thirty seconds.

Examples of information expiring or not expiring based on information from sensors include, without limitation: determining a location, determining an orientation of a camera, and determining information about light. For example, a camera may use GPS device to determine how far it has been moved from a location where a user provided a response to a question. If the camera has been moved more than a threshold distance from the location where the user provided the response, then the information provided by the response may be determined to be expired. In another example, a camera may use an orientation sensor to determine when a user is aiming the camera at a scene. If the user stops aiming the camera at the scene for longer than ten seconds, for instance, then the camera may determine that the user is no longer capturing images of the scene and determine that information about the scene is expired. According to some embodiments, an imaging device may use a light sensor to determine the color of light that is shining on the camera. If the color of light shining on the camera is 5200K (daylight), then the camera may determine that information indicating the camera is under fluorescent light bulbs (4000K) is expired.

According to one or more embodiments of the present invention, information expiring or not expiring may be based on one or more characteristics of a user include. For example, a user may be in the habit of turning his camera off anytime he does not anticipate capturing an image in the next minute. Based on this, the camera may adjust its conditions for expiring information so that information about a scene does not expire unless the user turns the camera off for an extended period of time (e.g., fifteen minutes). In another example, a user may prefer that he not be asked the same question twice in close succession (e.g., within ten minutes). Based on this, the camera may prolong the time that it takes for a piece of information to expire (e.g., to more than ten minutes). In this way, the camera may effectively postpone asking the user a second question relating to the information in accordance with the user's preference.

In some embodiments of the present invention, information may expire or not expire based on information from one or more databases. In one example, a first piece of information may be based on the validity of one or more second pieces of information. If the second pieces of information expire, then the first piece of information may also expire. For example, a camera may store two pieces of information: a) the camera is currently indoors, and b) the room has fluorescent lighting. If the first piece of information (i.e., the camera is indoors) expires because the user moves outdoors, then this may cause the second piece of information (i.e., that the room has fluorescent lighting) to expire also, since it is unlikely that there is also fluorescent lighting outdoors. However, it will be recognized that the inverse may not be true. That is, the expiration of the information that the room has fluorescent lighting may not mean that the information that the camera is indoors has also expired. For example, a user of the camera may have just moved to another room.

In another example, an imaging device (e.g., a PDA with an integrated camera) may determine that information has expired based on a change to an image template stored in a database. For example, the imaging device may determine a revised image template for Alice (e.g., a revised "Alice template") because Alice has put on a blue sweater over her green tank top. Based on this, the imaging device may determine that information about the subject of the image (e.g., a girl in a green tank top) is expired.

In yet another example, a camera may store information about when the sun comes up or goes down. When the sun goes down, the camera may then expire any information about the current weather conditions (e.g., sunny, cloudy, etc.). In another example, a camera may receive weather reports via a radio link (and optionally may store an indication of the received information). For instance, the camera may receive an updated weather report indicating that the weather outside is no longer sunny and is now raining. Based on this updated report, the camera may determine that information indicating that light is shining on subjects sitting outside should be expired.

When a piece of information expires (e.g., as determined using an expiration condition), an imaging device and/or computing device may perform one or more of a variety of different actions, including, without limitation: ceasing to perform an action (e.g., an action that was performed based on the information), outputting a question, adjusting a setting, meta-tagging an image, guiding a user in operating the camera, storing information, and any combination thereof.

If a piece of information expires, then this may mean that an action that a camera was performing based on the information is no longer appropriate. Therefore, in accordance with some embodiments, a camera may cease to perform the action (and may optionally perform a second action instead). Examples of ceasing to perform an action based on expiring information include, without limitation: readjusting a setting, ceasing to meta-tag images, and ceasing to guide a user in operating a camera.

As discussed variously herein, an imaging device such as a camera may adjust a setting (e.g., the mode of the camera) based on a user's response to a question. According to various embodiments of the present invention when the user's response to the question expires (e.g., based on an expiration condition), the camera may adjust the setting again (e.g., returning the setting to its original value or adjusting to a new value). In a more detailed example, the camera may adjust itself to "Ski Slope" mode based on a user's indication that he is on a ski slope. When the ski slope closes (e.g., 4:00 p.m.) the camera may determine that the user's indication that he is on a ski slope has expired. Accordingly, the camera may readjust itself to cancel "Ski Slope" mode and put the camera in "Default" mode instead.

According to some embodiments, a camera may cease to meta-tag images when information expires. In some embodiments, a camera may cease to meta-tag images with information that has expired. For example, the camera may meta-tag one or more images based on a user's response to a question, as described herein. If the information upon which the meta-data is based expires, then the camera may cease to associate that meta-data with images. For example, the camera may receive information from a user that the user is capturing images of a group of people: Alice, Bob, Carly, and Dave. This information may be used to meta-tag the captured images. However, when the user puts his camera down for twenty seconds, the information about the group of people may expire (e.g., based on an expiration condition). Accordingly, future images captured by the camera will not be tagged as images of Alice, Bob, Carly, and Dave.

Expiration of information may cause an imaging device to cease guiding a user in operating the camera. For example, a camera may guide a user in operating the camera based on the user's response to a question, as described herein. For instance, the camera may guide a user in adjusting the shutter speed of the camera based on a user's indication that he is capturing images of wildlife. If an image recognition program running on the camera (or on a server in communication with the camera, as discussed herein) later determines that the user is about to capture an image of a person, then the camera may cease to provide instructions to the user about how to capture images of wildlife (e.g., because the wildlife-related information has effectively expired).

According to at least one embodiment of the present invention, a camera may output a question to a user based on information expiring. For example, in response to a piece of information expiring, the camera may ask a user a question relating to the information that expired. The user's response to this question may be helpful in replacing the information that expired and/or in guiding the camera in performing additional actions to assist the user. The following, without limitation, are some exemplary scenarios related to outputting a question to a user based on information expiring:

(i) A determination condition may be based on information expiring. For example, the camera may determine to output the question, "Are you indoors or outdoors?" based on the determination condition: expired (indoors_or_outdoors_response).

(ii) Information about a scene may expire when a user stops aiming a camera at the scene. The camera may then remain idle, for example, until the user begins to aim the camera at a new scene, at which point the camera may determine that a) the information about the old scene has expired and b) the camera does not have any information about the new scene. Based on this, the camera may determine and output an appropriate question to the user.

(iii) Information about the lighting of a scene (e.g., daylight, tungsten light bulb, fluorescent light bulb) may expire whenever a light sensor on the camera determines that the light color or intensity of a scene has changed dramatically. Accordingly, the camera may output the question, "What type of lighting does this scene have?" whenever the light sensor causes information to expire.

(iv) Information about whether a scene includes running water may expire (e.g., based on image processing). Based on this expiration, the camera may output a question to the user, "Does this image include water?"

Other types of situations in which it may be desirable to output a question based on information expiring may be readily apparent to those skilled in the art in light of the present disclosure.

As discussed herein, according to some embodiments of the present invention, a camera may adjust one or more settings based on information expiring. Some examples, without limitation, are provided below, and various other exemplary ways in which a setting may be adjusted are discussed herein.

In one example, information about the current lighting conditions may expire. Based on this, the camera may adjust its settings to auto-exposure and auto-white balance. In another example, information about who is the current user of the camera may expire. Based on this, the camera may revert to its default user preferences. In another example, information about what object in the field of view (e.g., the foreground, the background) a user would like to focus on may expire. Based on this expiration, the camera may adjust its focus settings (e.g., to five-region, center-weighted auto-focus).

In yet another example, information about a user being on a boat may expire. Based on this, the camera may adjust its digital stabilization setting to "regular." Information about the weather outside being sunny may expire because the current time of day is after sunset, for example. Based on this, the camera may assume that it is indoors or nighttime and turn its flash on.

Various exemplary ways in which a camera, for example, may meta-tag an image are discussed herein. According to at least one embodiment of the present invention, a device such as a camera or server may meta-tag one or more images based on information expiring. For example, information about the subject of an image may expire. Based on this, a camera may meta-tag an image as "Subject: Unknown." According to some embodiments, a user can later review the image and provide meta-data about the subject of the image. In another example, information about a location of the camera may expire. After determining the location information has expired, the camera may omit location information when meta-tagging an image (or may not meta-tag an image at all).

Various exemplary ways in which a camera, for example, may guide a user in operating the camera are discussed herein. In accordance with one or more embodiments of the present invention, a camera may guide a user in operating the camera based on information expiring. For instance, information about whether the subject of an image is in the shade or the sun may expire. Based on this, the camera output a message to guide a user: "If your subject is in the shade, you may want to adjust the white balance setting on the camera to 7000K or use a flash. If your subject is in the sun, you may want to adjust the white balance setting on the camera to 5200K and make sure that your subject is facing towards the sun." In another example, information about the subject of one or more images may expire. In response, the camera may output a message to a user: "You can meta-tag your images with information about their subjects by pressing the 'Meta-Tag' button and saying the name of the subject."

The camera may store information based on information expiring. That is, according to some embodiments of the present invention, the camera may store a first piece of information based on the expiration of a second piece of information. For example, information about the camera being underwater may expire based on a conductivity sensor on the body of the camera. Based on information received via the conductivity sensor, the camera may store an indication that it is not underwater.

If an expiration condition occurs, then related information may be determined to be expired (and optionally the camera may perform one or more actions), as described herein. As also discussed herein, information may expire based on other information expiring. For example, if a camera is turned off for more than sixty minutes, then the information that the camera is outdoors may expire. Based on this, the information that the weather is sunny and that the user is on a beach may also expire. A single condition might cause multiple pieces of information to expire. For example, the information that an image includes a body of water and the piece of information that the user prefers to have no reflections may both expire if an image does not match a water template or if a user presses the "Reset Image Preferences" button on the camera.

Different actions may be performed based on what causes information to expire. For example, if information indicating that the subject of an image is Alice expires because a user is no longer aiming the camera or because thirty seconds have elapsed, then the camera may stop meta-tagging images as "Subject: Alice." However, if that information expires because an image recognition program (e.g., executed by the camera, executed by a server in communication with the camera) does not recognize the subject of an image as being Alice, then the camera may stop meta-tagging the image and ask: "Who are you photographing?" Thus, an action (e.g., determining and/or outputting a question) may be performed based on information expiring and/or based on the particular circumstance(s) that caused the information to expire.

As discussed herein, a camera or other device (e.g., a server) may store an expiring information database that stores information about conditions that may cause information to expire. One example of an expiring information database is shown in FIG. 14. Note that the example of the expiring information database shown in FIG. 14 may store at least one expiration condition for each piece of information that is stored by the camera.

Figure 20:
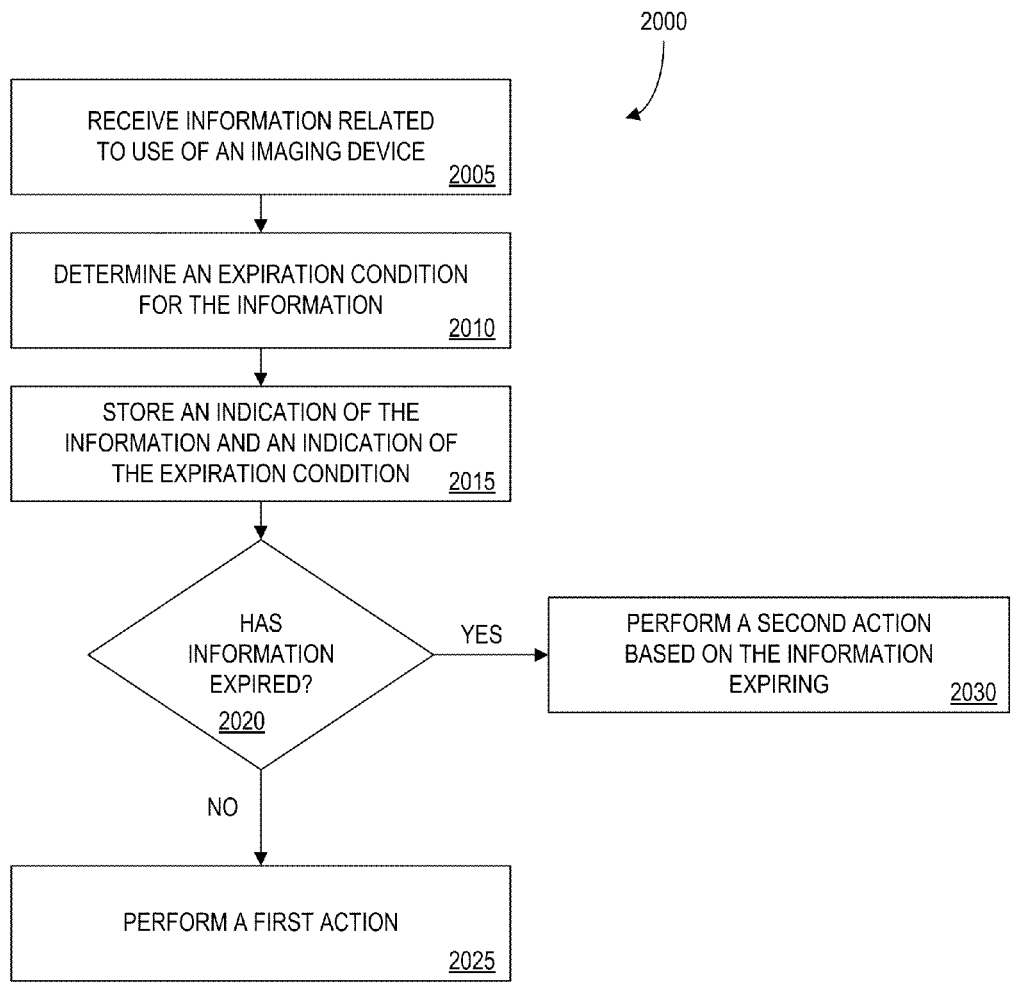
FIG. 20 is a flowchart illustrating a process consistent with at least one embodiment of the present invention.

Referring to FIG. 20, a flowchart illustrates a process 2000 that is consistent with one or more embodiments of the present invention. The process 2000 is a method for performing an action based on information expiring. For illustrative purposes only, the process 2000 is described as being performed by a camera 130. Of course, the process 2000 may be performed by any type of imaging device 210 and/or computing device 220.

In step 2005, the camera 130 receives information related to use of the camera 130. For example, the camera determines or otherwise receives (e.g., from a sensor, from a server 110, from a user) any of the various types of information described herein. For example, the camera 130 receives an indication that it is raining, a user preference, a signal that the memory is low, etc. In step 2010, the camera 130 determines an expiration condition for the information. For example, the camera 130 determines that the piece of information should expire after thirty minutes.

In step 2015, the camera 130 stores an indication of the information and an indication of the expiration condition (e.g., in an expiration condition database). In step 2020, the camera 130 determines if the information has expired (e.g., based on the expiration condition). If the information has not expired, the camera 130 performs a first action in step 2025. If the information has expired, the camera 130 performs a second action based on the information expiring (e.g., a corresponding action indicated in an expiration condition database).

In accordance with various embodiments of the present invention, a camera may output a question to a party other than a user of the camera. For example, a camera may output a question to a human subject (i.e., a person) of one or more images captured (or to be captured) by the camera.

Questions may be output to subjects of images for a variety of different purposes. For example, a question may be output to verify that an image was captured properly. For instance, a camera may be used to capture an image of a group of people (e.g., Alice, Bob, and Carly). Immediately after capturing the image of the group of people, the camera may output a question to the group: "Did anybody blink?" If one or more people in the group answer "Yes" to the question, then the camera may capture one or more additional images of the group, in the hope of capturing at least one image of the group in which nobody is blinking.

According to another example, a preference of a subject may be determined. For example, the camera may output a question to a subject of an image: "Do you want this to be a close-up shot from the waist up, or a full-body shot that includes your feet?" The camera may adjust one or more settings (e.g., a zoom setting) based on the subject's response to this question. Performing one or more actions based on a subject's preferences (e.g., adjusting a setting, meta-tagging an image) may be particularly appropriate for subjects who have strong feelings about how images of them should be captured.

In some embodiments, an imaging device may assist a subject in posing. For example, a camera may output a question to a subject of an image: "It looks like there's a piece of paper sticking to your shoe. Do you want to remove this before the photo is taken?" Based on the user's response, the camera may then pause to allow the subject to remove the piece of paper from his foot.

It will be readily understood that a question may be output to a subject using an output device. Many types of output devices are discussed herein, and others will be readily apparent to those skilled in the art in light of the present disclosure. Some examples include, without limitation, an audio speaker, a video monitor, and a wireless handheld device.

For example, a camera may include an audio speaker to play an audio recording of a question loud enough for a subject of an image to hear the question. In another example, the camera may use a HyperSonic Sound® directional sound system by American Technology Corporation to output a question to a subject that may not be heard by other subjects of the image, the user, or bystanders. In another example, a camera may include an LCD display or other type of video monitor that faces (or may be configurable to face) a subject of the camera (e.g., away from a user of the camera). The camera may use this LCD, for instance, to display a text question to the subject.

In yet another example of an output device, a subject of a camera may carry a wireless handheld device (e.g., a remote control, a cell phone, a PDA) that communicates with the camera (e.g., using a infrared or radio communications link). The camera may output a question to the subject by transmitting the question to the wireless handheld device. The wireless handheld device may then display the question to the subject (e.g., using an audio speaker, LCD display screen, or other output means). Other embodiments operable for outputting a question to a subject of an image may be similar to those described herein for outputting a question to a user of the camera.

According to some embodiments, a subject may respond to a question using an input device, such as, without limitation, a microphone, an image sensor, or a wireless handheld device. For example, a subject of an image may respond to a question by speaking the answer aloud. The camera may use a microphone and voice recognition software to record and determine the user's response to the question. In another example, a subject of an image may respond to a question by making an appropriate hand signal to the camera (e.g., thumbs-up for "Yes," thumbs-down for "No"). The camera may use an image sensor to capture one or more images of the subject making the hand signal and then process the images using an image recognition program to determine the subject's response to the question.

In another example, a subject of an image may respond to a question using a wireless handheld device (e.g., a remote control, a cell phone, a PDA) operable to communicate with a camera. For example, a subject of an image may press a button on his PDA or speak into a microphone on his cell phone to provide a response to a question. The PDA or cell phone may then transmit an indication of the response to the camera (e.g., via a communication network).

A variety of exemplary actions that may be performed based on a user's response to a question are discussed herein (e.g., adjusting a setting, meta-tagging an image, outputting a second question). Other actions are also possible. Additional actions that may be performed by the camera based on a user's response to a question include automatically capturing an image and managing images stored in memory.

As discussed herein, an imaging device may be configured to capture an image automatically. According to some embodiments, a camera may automatically capture one or more images based on a user's response to a question. For example, if the camera asks a user, "Are we at a football game?" and the user responds, "Yes," then the camera may automatically capture one or more images whenever the players on the football field are moving. Various exemplary processes for automatically capturing an image (e.g., based on a condition) are discussed herein.

Automatically capturing one or more images based on a user's response to a question may comprise one or more of, without limitation: determining whether the camera should automatically capture one or more images based on a user's response to a question; determining what images the camera should automatically capture based on a user's response to a question; and determining how the camera should treat the one or more automatically-captured images (e.g., compressing them) based on a user's response to a question.

One way for a user's response to a question to affect a process of automatically capturing images is for the camera to adjust a setting relating to automatically capturing images. One example of a setting on the camera that may relate to automatically capturing images is a condition for automatically capturing images. For example, the camera may automatically capture an image when a condition is true. A user's response to a question may be a factor that affects a condition. In another example, a threshold value for determining whether to store an image may relate to the automatic capturing of images. For example, the camera may capture an image and then determine a rating for the image based on the quality of the image. If the rating of the image is higher than a threshold value, then the camera may store the automatically-captured image. If the rating is worse than the threshold value, then the automatically-captured image may be compressed or deleted. In another example, a parameter that affects how much an automatically-captured image is compressed may be adjusted. For example, the camera may automatically compress an automatically-captured image based on a compression setting. For instance, images with greater compression settings may be compressed more and images will lesser compression settings may be compressed less.

According to one or more embodiments, a camera may manage one or more images stored in memory based on a user's response to a question. Managing images stored in memory may include, without limitation, one or more of:
(i) Uploading an image using a network. For example, a camera may include a radio modem, cell phone, or other wireless network connection that allows the camera to transmit images to a second electronic device (e.g., a computer server, a laptop computer, a cell phone). Uploading an image using a network may be particularly useful in sharing images with other people (e.g., friends of a user) or freeing up memory on the camera (e.g., since an image may not be stored on the second electronic device).
(ii) Modifying one or more images. For example, a camera may use image editing software to modify one or more images that are stored in memory. Examples of modifications that may be made to images include cropping, removing red-eye, color balancing, removing shadows, removing objects from the foreground or background, adding or removing meta-data, and combining images into a panorama.
(iii) Compressing or deleting one or more images. For example, as discussed herein, a camera may automatically compress or delete one or more images stored in memory in order to make room for additional images that may be captured by the camera.

The following, without limitation, are some exemplary scenarios related to managing images stored in memory based on a user's response. Each scenario includes a question (e.g., asked by a camera), a response from a user, and an action:
(i) Question: "How many more images are you planning on capturing?"
Response from a user: "20-30"
Action: Use a wireless network connection (e.g., 3 G cellular network) to upload images from the camera to a central computer. Then delete the images that have been uploaded, thereby freeing up space in the camera's memory for the 20-30 additional images that the user plans on capturing.
(ii) Question: "Are you capturing an image of a group of people?"
Response from a user: "Yes"
Action: Process the captured image to remove shadows that fall across people's faces and red-eye that may have resulted from using a flash.
(iii) Question: "Which images are more important to you: a) images of Alice, or b) images of Bob?"
Response from user: "a) images of Alice"
Action: Sort the images in memory into images of Alice and images of Bob. Re-compress all the images of Alice using a JPEG compression setting of 80%, thereby reducing the file sizes of these images and freeing up memory space in the camera. Do not perform any additional compression on the images of Bob that are stored in memory.

One or more embodiments of the present invention may enable a camera or other imaging device to determine more easily a scene to be captured in an image and a user's intentions for capturing an image. Such determinations will enable some types of users to more easily adjust the settings on their cameras, making capturing images a simpler and more enjoyable process. In addition, some embodiments of the invention may allow a user to capture better images, even if he does not have a detailed knowledge of photography.

Although the methods and apparatus of the present invention have been described herein in terms of particular embodiments, those skilled in the art will recognize that various embodiments of the present invention may be practiced with modification and alteration without departing from the teachings disclosed herein.

What is claimed is:

1. An apparatus operable to facilitate analysis of a digital image, comprising:
a processor;
a memory storing a program for directing the processor, the processor being operable with the program to:
identify a digital image taken by an imaging device, the digital image including an image of a person;
access a database of stored digital images;
compare the digital image to the stored digital images;
identify at least one image of the stored digital images that appears to include an image of the person, thereby identifying at least one previously stored image of the person;
determine, by the processor and based on information stored in the database of stored images in association with the at least one previously stored image of the person, a name for the person;
output to a user the name determined by the processor as a suggestion for a meta-tag for the digital image, along with an opportunity for the user to either agree that the name is appropriate to store in association with the digital image or reject the name as not appropriate to store with the digital image; and store the name determined by the processor as a meta-tag for the digital image after agreement rather than rejection is received from the user that the name is appropriate to store in association with the digital image.

2. The apparatus of claim 1, wherein the imaging device comprises at least one of a camera, a cellular telephone equipped with a camera or a portable computing device equipped with a camera.

3. The apparatus of claim 1 comprising a server computer operable to communicate with the imaging device.

4. The apparatus of claim 3, wherein the processor being operable with the program to output the name as a suggestion comprises the processor being operable with the program to output the name as a suggestion via a display of a computing device operable to communicate with the server computer.

5. The apparatus of claim 4, wherein the computing device comprises the imaging device.

6. The apparatus of claim 1 comprising the imaging device.

7. The apparatus of claim 1, wherein the processor is further operable with the program to:

receive from the user, prior to identifying the digital image, the name of the first person to be associated with the previously stored image.

8. The apparatus of claim 1, wherein accessing the database of stored images comprises accessing a database of stored images stored on the imaging device.

9. The apparatus of claim 1, wherein accessing the database of stored images comprises accessing a database of stored images stored at a server computer remote from the imaging device.

10. The apparatus claim 1 comprising at least one of a desktop personal computing device or a portable personal computing device, either operable to communicate with the imaging device.

11. The apparatus of claim 1, wherein the processor is further operable with the program to:

receive, from the imaging device, the digital image.

12. The apparatus of claim 1, wherein the processor being operable with the program to identify at least one image of the stored digital images that appears to include an image of the person, thereby identifying a previously stored image of the person comprises using facial recognition technology to so identify the previously stored image of the person.

13. The apparatus of claim 1, wherein the database comprises a personal database of the user comprising images uploaded to the database by the user.

14. The apparatus of claim 1, wherein the suggestion is output in the form of a question.

15. The apparatus of claim 14, wherein the question is a multiple-choice question.

16. A method of facilitating analysis of a digital image, the method comprising:

identifying a digital image taken by an imaging device, the digital image including an image of a person;

accessing a database of stored digital images;

comparing, by a processor of a computing device, the digital image to the stored digital images;

identifying, by the processor, at least one image of the stored digital images that appears to include an image of the person, thereby identifying at least one previously stored image of the person;

determining, by the processor and based on information stored in the database of stored images in association with the at least one previously stored imaged of the person, a name for the person;

outputting to a user the name determined by the processor as a suggestion for a meta-tag for the digital image, along with an opportunity for the user to either agree that the name is appropriate to store in association with the digital image or reject the name as not appropriate to store with the digital image; and storing the name determined by the processor as a meta-tag for the digital image after agreement rather than rejection is received from the user that the name is appropriate to store in association with the digital image.

17. A non-transitory computer-readable medium comprising instructions for instructing a processor, the instructions causing the processor to:

identify a digital image taken by an imaging device, the digital image including an image of a person;

access a database of stored digital images;

compare the digital image to the stored digital images;

identify at least one image of the stored digital images that appears to include an image of the person, thereby identifying at least one previously stored image of the person;

determine, by the processor and based on information stored in the database of stored images in association with the at least one previously stored image of the person, a name for the person;

output to a user the name determined by the processor as a suggestion for a meta-tag for the digital image, along with an opportunity for the user to either agree that the name is appropriate to store in association with the digital image or reject the name as not appropriate to store with the digital image; and store the name determined by the processor as a meta-tag for the digital image after agreement rather than rejection is received from the user that the name is appropriate to store in association with the digital image.

* * * * *